United States Patent [19]

Hansen et al.

[11] Patent Number: 4,747,127
[45] Date of Patent: May 24, 1988

[54] CUSTOMER PROGRAMMABLE REAL-TIME SYSTEM

[75] Inventors: Terris L. Hansen, Aurora; Wayne E. Hyatt, Glenview; Deborah D. Kimminau, Aurora; Wu-Hon F. Leung, Downers Grove; Todd C. Morgan, Oak Park; Paul M. Zislis, Northbrook, all of Ill.

[73] Assignee: American Telephone and Telegraph Company, AT&T Bell Laboratories, Murray Hill, N.J.

[21] Appl. No.: 812,941

[22] Filed: Dec. 23, 1985

[51] Int. Cl.$^4$ .......................................... H04M 11/00
[52] U.S. Cl. ...................................... 379/94; 379/93; 364/200
[58] Field of Search .................. 379/94, 90, 93, 96, 379/97, 98; 364/200

[56] References Cited

U.S. PATENT DOCUMENTS

| | | | |
|---|---|---|---|
| 3,972,023 | 7/1976 | Bodner et al. | 364/200 |
| 3,984,817 | 10/1976 | Barbour et al. | 364/200 |
| 4,133,030 | 1/1976 | Huettner et al. | 364/200 |
| 4,291,200 | 9/1981 | Smith | 379/94 |
| 4,447,874 | 5/1984 | Bradley et al. | 364/200 |
| 4,551,581 | 11/1985 | Doughty | 379/94 |
| 4,626,634 | 12/1986 | Brahm et al. | 379/94 |
| 4,653,085 | 3/1987 | Chan et al. | 379/94 |

OTHER PUBLICATIONS

E. R. Jilek, "Implementation of SDL/PR in a Digital Switching System", Proceedings of the IEEE, Global Telecommunications Conference, Nov. 26-29, 1984, Atlanta, Ga., pp. 1004-1007.
John DeTreville, "Phoan: An Intelligent System for Distributed Control Synthesis", Proceedings of ACM, SIGSOFT/SIGPLAN System Engineering Symposium on Practical Software Development Environments, Pittsburgh, Pa., Apr. 23-25, 1984.
S. W. Nielsen, "Exchange Software Development at Jutland Telephone", Fifth International Conf. on Software Engineering for Telecommunication Switching Systems, No. 223, Jul. 4-8, 1983.
G. A. Raack et al., "Customer Control of Network Services", IEEE Communications Magazine, vol. 22, No. 10, Oct., 1984, pp. 8-14.
Jerrold M. Ginsparg et al., "Automatic Programming of Communications Software Via Nonprocedural Descriptions," IEEE Transactions on Communications, vol. Com-30, No. 6, Jun. 1982, pp. 1343-1347.
Anders Rockstrom et al., "SDL-CCITT Specification and Description Language", IEEE Transactions on Communications, vol. COM-30, No. 6, Jun. 1982, pp. 1310-1318.

Primary Examiner—Jin F. Ng
Assistant Examiner—Mathew E. Connors
Attorney, Agent, or Firm—John C. Moran

[57] ABSTRACT

A telecommunication and development system for the switching of voice and data under computer control in a customer programmable environment that allows real-time modification of communication services. The computer program controlling the system is written in a nonprocedural language that allows for the direct control of the telecommunication system on the basis of state definition, event definition, and action definition. Program scripts define a particular feature, and each script consists of a plurality of triples that automatically respond to the system state and signal information to execute the necessary actions to provide part of a feature to the telecommunication system. During provision of telecommunication services, a customer can add new features that not only add new operations to the system, but modify existing operations without interfering with the present operation of the system. This is possible since the nonprocedural language allows for the direct control of interaction between features and provides for the automatic execution of required operations during state transitions. In addition, the nonprocedural language allows a feature or script to control its own deactivation or activation. Also, the software development environment is based on a standard operating system allowing for ease of development. The above features allow a customer to program his or her own individual communication unit to provide desired features without affecting the operation of the telecommunication system or the features provided to other customers.

36 Claims, 35 Drawing Sheets

FIG. 3
SCRIPT: POT

```
301  state:  not idle
     event:  origin ($source)
     action: send ($source, busy)
             stop 302  state:  not idle
     event:  query ($source)
     action: send ($source, notidle)
             stop 303  state:  idle
     event:  origin ($source)
     action: $originator <- $source
             send ($source, ringing)
             $otherparty <- $source
             nextstate (ringing)

304  state:  idle
     event:  query ($source)
     action: send ($source, idle)
             stop 305  state:  ringing
     event:  enter
     action: apply (ringing)
             continue 306  state:  ringing
     event:  leave
     action: remove (ringing)
             continue 307  state:  ringing
     event:  disconnect ($source)
     action: if ($source = $otherparty)
                then nextstate (idle)
                else continue
             endif 308  state:  ringing
     event:  offhook
     action: send ($otherparty, answer)
             nextstate (talking)

309  state:  not (dialing or idle or ringing)
     event:  digits
     action: print ("\gA call is in progress.\n")
             stop 310  state:  outpulsing
     event:  onhook
     action: nextstate (idle)

311  state:  outpulsing
     event:  ringing ($otherparty)
     action: nextstate (audible)

312  state:  outpulsing
     event:  busy ($otherparty)
     action: nextstate (busy)

313  state:  audible
     event:  enter
     action: apply (audible)
             continue 314  state:  audible
     event:  leave
     action: remove (audible)
             continue 315  state:  audible
     event:  onhook
     action: send ($otherparty, disconnect)
             nextstate (idle)
```

```
316 { state:  audible
      event:  answer ($otherparty)
      action: nextstate (talking)

317 { state:  busy
      event:  enter
      action: apply (busytone)
              continue 318 { state:  busy
      event:  leave
      action: remove (busytone)
              continue 319 { state:  busy
      event:  onhook
      action: nextstate (idle)

320 { state:  talking
      event:  enter
      action: engage ($otherparty)
              continue 321 { state:  talking
      event:  leave
      action: disengage
              continue 322 { state:  talking
      event:  onhook
      action: send ($otherparty, disconnect)
              nextstate (idle)

323 { state:  talking
      event:  disconnect ($source)
      action: if ($source = $otherparty)
                then nextstate (disconnect)
                else continue
              endif 324 { state:  disconnect
      event:  onhook
      action: nextstate (idle)

325 { state:  idle
      event:  offhook
      action: nextstate (dialing)

326 { state:  dialing
      event:  enter
      action: apply (dialtone)
              continue 327 { state:  dialing
      event:  leave
      action: remove (dialtone)
              continue 328 { state:  dialing
      event:  onhook
      action: nextstate (idle)

329 { state:  dialing
      event:  digits ($otherparty)
      action: $originator <- $this
              send ($otherparty, origin)
              nextstate (outpulsing)

330 { state:  idle or ringing
      event:  digits
      action: print ("\gThe phone is not offhook.\n")
              stop
```

*FIG. 4*

```
500 ⎰ script: CF
    ⎱ /* Call Forward */
501 ⎰ state:  all
    ⎱ event:  input ("#", $CFnumber)
      action: stop 502 ⎧ state:  all
    ⎪ event:  origin ($source)
    ⎨ action: if ($CFnumber != "" and $CFnumber != $source)
    ⎪         then forward ($CFnumber, $source, origin)
    ⎪              print ("\g$source forwarded to $CFnumber at $time\n")
    ⎪              stop
    ⎪         else continue
    ⎩         endif 503 ⎰ script: CPI
    ⎱ /* Calling party identification */
504 ⎰ state:  all
    ⎱ event:  origin ($source)
      action: print ("Call from $source\n")
              continue 505 ⎰ script: CFA
    ⎱ /* Activate call forwarding at 8:00 on weekdays */
506 ⎧ state:  all
    ⎪ event:  time (8:00)
    ⎨ action: if ($day >= 1 and $day <= 5)
    ⎪         then activate (CF)
    ⎪              print ("callforward activated at $time\n")
    ⎩         endif ⎧ /* Deactivate call forwarding at 17:00 on weekdays */
507 ⎪ state:  all
    ⎨ event:  time (17:00)
    ⎪ action: if ($day >= 1 and $day <= 5)
    ⎪         then deactivate (CF)
    ⎪              print ("callforward deactivated at $time\n")
    ⎩         endif
```

*FIG. 5*

FORMAT OF COMPILED TRIPLE

- 1500 — NUMBER OF BYTES IN COMPILED TRIPLE
- 1501 — NUMBER OF STATES NAMED IN TRIPLE
- 1503 — ID'S OF NAMED STATES
- 1504 — ID OF NAMED EVENT
- 1505 — INSTRUCTIONS (ACTIONS)
- 1506 — HALT INSTRUCTION CODE

GENERAL INSTRUCTION FORMAT

| ARGUMENT CODE | ... | ARGUMENT CODE | INSTRUCTION CODE |

0 OR MORE ARGUMENT CODES

ASSIGN INSTRUCTION

ID OF VARIABLE TO RECEIVE ASSIGNMENT

"SENDMESSAGE" INSTRUCTION

ARGUMENT INSTRUCTION
(LITERALS, VARIABLES:)

SIGNAL ARGUMENT

BRANCH INSTRUCTION

FIG. 40
SCRIPT: PODS

```
4001  state:  all
      event:  activate
      action: $data <- $deactivate <- false 4002  state:  not idle
      event:  deactivate
      action: $deactivate <- true
              stop 4003  state:  idle
      event:  enter
      action: $data <- false
              if ($deactivate = true)
                  then purge
              endif 4004  state:  not (idle or ringing)
      event:  offhook or onhook
      action: if ($data = true)
                  then stop
                  else continue
              endif 4005  state:  not idle
      event:  rcvmessage ($source, "origin")
      action: send ($source, busy)
              stop 4006  state:  idle
      event:  rcvmessage ($source, "origin")
      action: send ($source, ringing)
              $data <- true
              $originator <- $otherparty <- $source
              nextstate (ringing)

4007  state:  ringing
      event:  enter
      action: if ($data = true)
                  then print ("\gcall from $otherparty\n")
                       stop
                  else continue
              endif 4008  state:  ringing or audible or talking
      event:  disconnect ($source)
      action: if ($data = true and $source = $otherparty)
                  then print ("$otherparty disconnected\n")
              endif
              continue
```

```
4009 ⎡ state:  ringing
     ⎢ event:  input ("connect")
     ⎣ action: if ($data = true)
                   then send ($otherparty, answer)
                        nextstate (talking)
               endif 4010 ⎡ state:  talking
     ⎢ event:  enter
     ⎣ action: print ("$otherparty connected\n")
               continue 4011 ⎡ state:  talking
     ⎢ event:  disconnect ($source)
     ⎣ action: if ($data = true and $source = $otherparty)
                   then nextstate (idle)
                   else continue
               endif 4012 ⎡ state:  talking or audible
     ⎢ event:  input ("disconnect")
     ⎣ action: if ($data = true)
                   then send ($otherparty, disconnect)
                        nextstate (idle)
               endif 4013 ⎡ state:  outpulsing
     ⎢ event:  input ("disconnect")
     ⎣ action: if ($data = true)
                   then nextstate (idle)
               endif 4014 ⎡ state:  idle
     ⎢ event:  digits ($otherparty)
     ⎣ action: $data <- true
               $originator <- $this
               sendmessage ($otherparty, "origin")
               nextstate (outpulsing)

4016 ⎡ state:  audible
     ⎢ event:  enter
     ⎣ action: if ($data = true)
                   then print ("$otherparty alerted\n")
                        stop
                   else continue
               endif 4017 ⎡ state:  outpulsing or audible
     ⎢ event:  busy ($source)
     ⎣ action: if ($data = true and $source = $otherparty)
                   then print ("$otherparty busy\n")
                        nextstate (idle)
                   else continue
               endif
```

*FIG. 41*

CUSTOMER PROGRAMMABLE REAL-TIME SYSTEM

CROSS-REFERENCE TO RELATED APPLICATIONS

Concurrently filed herewith and assigned to the same assignee as this application are:

T. L. Hansen, et al., , "Control of Real-Time Systems Utilizing a Nonprocedural Language," U.S. Ser. No. 812,940 now U.S. Pat. No. 4,695,977 and T. L. Hansen, et al., "State Control for a Real-Time System Utilizing a Nonprocedural Language," U.S. Ser. No. 812,941.

TECHNICAL FIELD

This invention relates to control of real-time systems and, in particular, to the control of a telecommunication switching system by utilizing a software development environment and a language that allows a nonprocedural writing of programs enabling a customer to modify the functions performed by the switching system in real time.

BACKGROUND OF THE INVENTION

In real-time systems and, in particular, telecommunication switching systems, a need often arises to modify the operations and services provided by the telecommunication system to a customer. The ability to modify system functions for a given customer is often referred to in telecommunication switching technology as customizing the features or services of the system, and the ability of a customer to make such changes is referred to as customer programmability. The definition of a customer with respect to telecommunication systems includes the residential or business user of such a system and a telecommunication company providing the service, such as a Regional Bell Operating Company, e.g., Ameritech, Inc. or a governmental agency such as the British Post Office. Each of these two types of customers has different requirements with respect to customer programmability.

The problems facing the telecommunication provider in customizing services and features for a telecommunication system stem from two factors which relate to the programming language used by the manufacturer to write the programs that control this system and the software development environment. The first factor relates to the fact that present day telecommunication systems are controlled by a computer executing a program which is normally written in a high-level procedural language, such as C or Pascal, although many systems are still written in assembly language. The problem of the telecommunication systems program being written in a procedural language such as C or Pascal is that the order of execution of actions defined by the program in response to different signals from the telecommunication system is only implicit from the sequence of instructions, and the program response is not directly based on the state of the telecommunication system and the system's signals at any point in time. Because of this problem, only an expert in the program structure of the telecommunication system can make changes or add new services to the telecommunication system because it is necessary to know where in the sequence of the program instructions the changes must be made to modify existing services and to add new services.

The second factor is that the telecommunication control programs are normally developed on a computer system different than the one utilized to control the telecommunication systems. These development systems are not an integral part of the telecommunication system and cannot readily transfer developed programs to the telecommunication system. In addition, these development systems are special purpose and require skilled administration personnel. One such development system is described in the article entitled, "Software Development Tools," *AT&T Technical Journal,* Vol. 64, No. 1, January, 1985, pp. 287–304, by T. J. Pedersen, J. E. Ritacco, and J. A. Santillo.

An example of an existing telecommunication system where the manufacturer has attempted to provide not only the language, but also the development system required to make modifications to an existing telecommunication system, is described in the article entitled, "Exchange Software Development at Jutland Telephone," *Fifth International Conference on Software Engineering for Telecommunication Switching Systems.* Conf. Pub. No. 223, July 4–8, 1983, by S. W. Nielsen. This article describes Jutland Telephone of Denmark's experience with doing customer software development on a manufacturer's development system and the subsequent installation of those programs by the manufacturer's personnel. While this approach, indeed, did allow Jutland Telephone to develop programs, it required that Jutland Telephone develop an in-depth knowledge of not only the programs running the telecommunication system, but also a large amount of knowledge about the development system.

While the above approach is possible, it is not desirable because a telecommunication provider would prefer, for economic reasons, to be able to use a variety of systems from different manufacturers and not become locked in to one particular manufacturer's system because of the high cost of providing custom features.

One approach that allows an operating company or a telecommunication ministry to at least specify to the manufacturer what the services should be for a telecommunication system is the Specification and Description Language, SDL, which is currently being defined by a CCITT committee. The SDL language is described in the article, "SDL-CCITT Specification and Description Language," *IEEE Transactions on Communications,*" Vol. Com-30, No. 6, June, 1982, by A. Rockstrom and R. Saracco, and the CCITT specifications are set forth in Recommendations Z101–104, *CCITT Yellow Book,* International Telecommunication Union, Geneva, Switzerland, 1981. The SDL language allows the telecommunication provider to describe the services and features that a telecommunication system is to provide in terms of state and telecommunication signal information. Once the telecommunication provider uses SDL for the formal description, manufacturers are free to implement that description in the language of their choice, such as CHILL or C. While the SDL approach does allow the telecommunication provider to control and specify the software development, it nevertheless still leaves the telecommunication provider dependent on the manufacturer for implementation of services and does not give the telecommunication provider the flexibility to make changes at its discretion.

One solution to the problem of providing different types of services to the end user of the telecommunication system has been for the manufacturer to program the telecommunication system to provide a large number of services and then to give the telecommunication provider or vendor a mechanism for selecting which of those services is to be provided to a given group of customers. This approach is illustrated in the article by H. K. Woodland, G. A. Reisner, and A. S. Melamed, "System Management, *AT&T Technical Journal,* Vol. 64, No. 1, January, 1985. This solution suffers from many problems, one of which has been the difficulty in anticipating all the different types of services that a customer might desire, and in anticipating the correct manner of providing these different services. Many special services developed at a large cost to a manufacturer have found little utilization by customers resulting in both the manufacturer and the customers being dissatisfied with the telecommunication system's performance.

Because of the procedural program structure and the development systems utilized to develop the programs for these telecommunication systems, customer programmability for the end user simply is not practical even for the largest corporate customers. One approach for end users to obtain special telecommunication services is for a corporate customer to request from the manufacturer certain features. This approach is not a desirable one from either the customer's or the manufacturer's point of view. The manufacturer is required to allocate valuable human resources to develop software that is only used by one customer. From the customer's point of view, the cost of the manufacturer providing such a service is high; and in addition, there is normally a large delay associated with such a request.

Another approach for customer programmability is described in the article entitled, "Customer Control of Network Services," *IEEE Communications Magazine,* Vol. 22, No. 10, October, 1984, by G. A. Raack, E. G. Sable, and R. J. Stewart. The latter article describes a system that allows a business customer to configure existing features so as to customize AT&T's Advanced 800 service. The customer utilizes a user-friendly interface provided by a Service Management System to configure existing features into a desired package of services using a tree structure to define the logical order of the service. This ability to package features in different orders and combinations, allows the customer to tailor the different features to provide a package which fits the customer's requirements. While this capability is extremely useful, the customer is not allowed to directly program the computers controlling the telephone network and is limited in the type of changes which can be made.

From the foregoing, it can be seen that there exists a need for a programming language and software development system that allows end customers and providers of telecommunication services the ability to quickly and economically modify the services provided by telecommunication systems. In addition, the ability to make these modifications should require a minimal understanding of the manner in which the existing services and features have been implemented, even if these existing services are being replaced by new services. Also, the telecommunication system should be capable of making these modifications without disrupting normal operation. In addition, the development system should be a standard, commercial product with which a number of programmers are familiar and which is not coupled to the telecommunication industry. This latter requirement would allow a customer to freely tap a wider base of programming talent than if the customer was restricted only to those programmers who are experts in telecommunication systems.

SUMMARY OF THE INVENTION

The foregoing problems are solved and a technical advance is achieved in accordance with the principles of this invention incorporated in an illustrative method and structural embodiment in which an integral software development and telecommunication system is provided that allows the programming of new telecommunication features with a minimal knowledge of existing control programs and is based on a commercially available software development system and a nonprocedural programming language. Further, the integral software development and telecommunication system allows new features and modifications to existing features to be incorporated into the system during normal operation of the system.

Advantageously, the system can assume a plurality of states and generate a plurality of signals. A computer system executes a first program routine to control the communication functions of the system in order to provide a first set of services. The computer system under control of the first program routine is directly responsive to the system states and system signals. The computer system is responsive to source code instructions that define additional services to compile source code by execution of a second program routine. A third program routine controls the computer system so that the latter is responsive to the compiled source code instructions defining the additional services to update the first program routine. In order to activate the updated portion of the first program routine, a fourth program routine is executed to activate the updated portion.

Advantageously, the computer system updates the first program routine with the compiled source code instructions in such a way as not to interfere with the normal real-time control of the system. Also, the computer system comprises a first processor for executing the first program routine including the updated portion and a second processor for executing the second program routine that performs the compilation.

Advantageously, the fourth program routine comprises a plurality of groups of instructions each of whose execution is actuated by the occurrence of a predefined system state and signal. The activation of the updated portion of the first program routine is accomplished by a group of instructions of the fourth program routine responding to a system time signal for enabling the updated portion. Also, a fifth program routine is provided to deactivate the updated portion of the first program upon the occurrence of a second system time signal by a group of instructions of the latter routine responding to the second time signal to generate a deactivate signal indicating that the updated portion is to be deactivated. The updated portion of the first program routine also contains groups of instructions each actuated by a predefined state and signal. One of the groups of instructions of the updated portion is responsive to the deactivate signal for disabling the updated portion.

Advantageously, in order to facilitate the performance of common operations that are normally performed upon state transitions, the first program routine contains a set of instructions that generates a leave signal when the present state of the system is changed to another state and another set of instructions that generates an enter signal when the other state is entered. These two signals are used in the following manner. A second group of instructions in the first program routine is responsive to the leave signal for performing common exit operations, and a third group of instructions is responsive to the entry signal and the other state for performing common entrance operations.

The illustrative method allows a user to program and control a voice and data telecommunications system that can assume a plurality of states and generate a plurality of signals. A first processor is used to control the system executing sets of instructions each comprising basic groups of instructions, and a second processor is used for the compilation of source code instructions written in a nonprocedural language. The method comprises the steps of: (1) controlling the system by the first processor executing the basic groups of instructions that perform individual operations in response to the present system state and system signal matching the predefined state and signal that actuate each of the groups of instructions, (2) entering a source code program that defines additional services or modifies existing services, (3) compiling the entered code into additional sets of instructions each comprising additional groups of instructions to control the first processor to perform the additional services, (4) transferring the additional sets of instructions to the first processor from the second processor, (5) updating the basic groups of instructions with the additional groups of instructions in a predefined preference relationship by the first processor, and (6) activating the additional groups of the instructions.

Advantageously, the first processor has a plurality of control structures, and the method further comprises the steps of relating individually in each of the plurality of control structures ones of the groups of instructions that respond to identical system state and system signal stimuli in accordance with the predefined preference relationship, identifying one of the control structures in response to the present system state and the occurrence of one of the system signals, executing the group of instructions having the highest preference referenced by the identified control structure to perform a first service operation in the system, allowing the group of instructions having second highest preference referenced by the identified control structure to execute by the execution of one of the highest preference group of instructions, and preventing the group of instructions having the third highest preference from executing by execution of one of the second highest preference group of instructions. Advantageously, the method further provides for the deactivation and activation of the sets of instructions with the deactivation or activation being controlled by a group of instructions responding to defined system state and signal.

In addition, each of the control structures is associated with one of the system states and each of the control structures comprises a plurality of tables each associated with one of the system signals occurring in the system state of the associated control structure and the updating step comprises the steps of: determining the table corresponding to the state and signal that actuates the execution of each additional group of instructions and storing into the determined table a reference for each of the additional groups of instructions. Also, when a set of instructions is deactivated, all references in the tables of the control structures are removed for groups of instructions contained within the deactivated set of instructions.

Advantageously, upon a state transition, the method further comprises the steps of initiating a change from the present system state to another system state by the execution of an instruction of a first group of instructions, generating a leave signal indicating the exiting from the present state, performing common exit operations before leaving the present state by the execution of a second group of instructions in response to the leave signal and the present state, generating another signal indicating the entry into the other state, and performing common entrance operations upon entering said other state by the execution of a third one of the groups of instructions an response to the enter signal and the other state.

BRIEF DESCRIPTION OF THE DRAWING

FIGS. 3 and 4 illustrate a program script, in source code form, for providing basic telephone service for the telecommunication system of FIG. 1;

FIG. 5 illustrates program scripts for providing call forwarding and calling party identification services with call forwarding activation/deactivation service for the telecommunication system of FIG. 1;

FIGS. 40 and 41 illustrate a program script for providing data service for the telecommunication system of FIG. 1.

GENERAL DESCRIPTION

Figure 1:
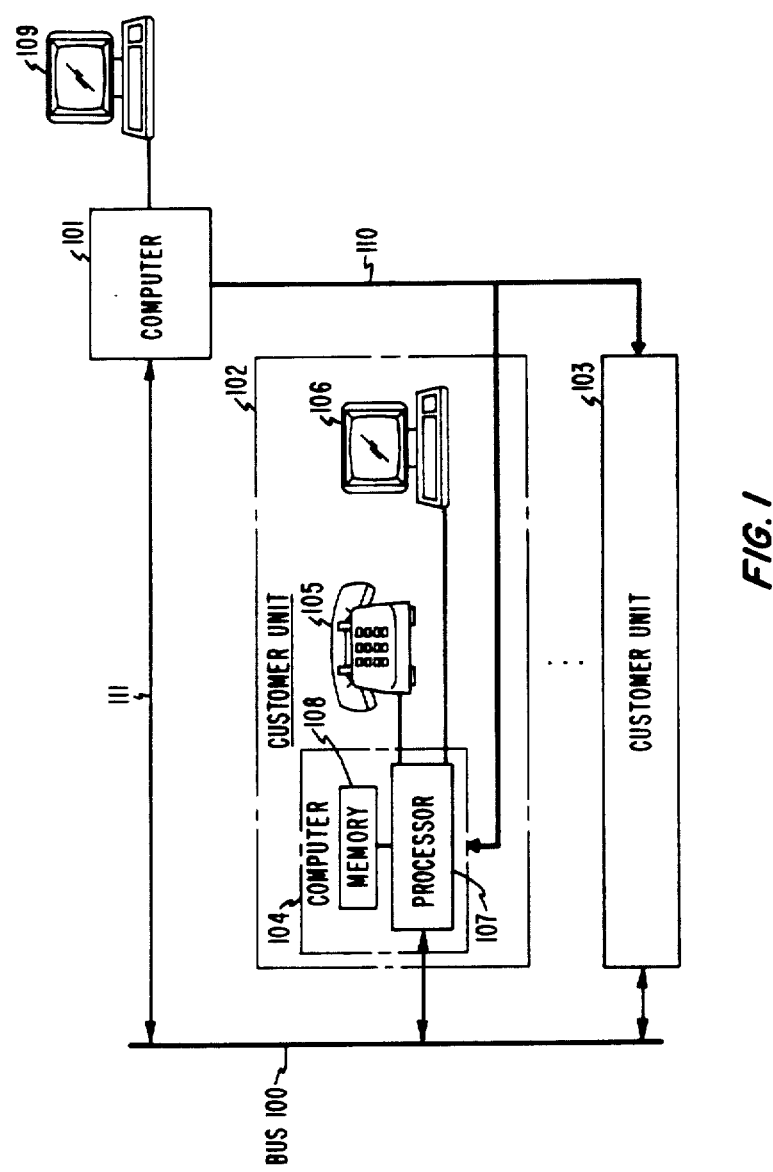
FIG. 1 illustrates, in block diagram form, the telecommunication system that is the subject of this invention.

The telecommunication system which is the subject of this invention is illustrated in FIG. 1. The latter system is capable of switching both packetized voice and data via bus 100. Each customer unit has associated with it, a telephone set for voice communication and a data terminal for data communication. The computer associated with each customer unit provides under program control the control functions for its associated customer unit for either a voice or data call. Each individual customer unit's computer is executing a program that provides customized services for the customer. This program is written in a novel, nonprocedural language that allows the explicit relations between state and telecommunication events to be directly programmed. A customer can customize his or her particular unit by interacting with the UNIX ™ operating system that is controlling computer 101 to write the source code for the new service in the nonprocedural language. The source code is then compiled and downloaded to the customer's computer. By utilizing an interservice precedence mechanism, the new compiled code is stored in the customer unit's computer with priority being determined at activation time. A telecommunication provider company could also use magnetic tape or other medium to directly load computer 101 and to subsequently have the programs transferred to the customer units.

Figure 2:
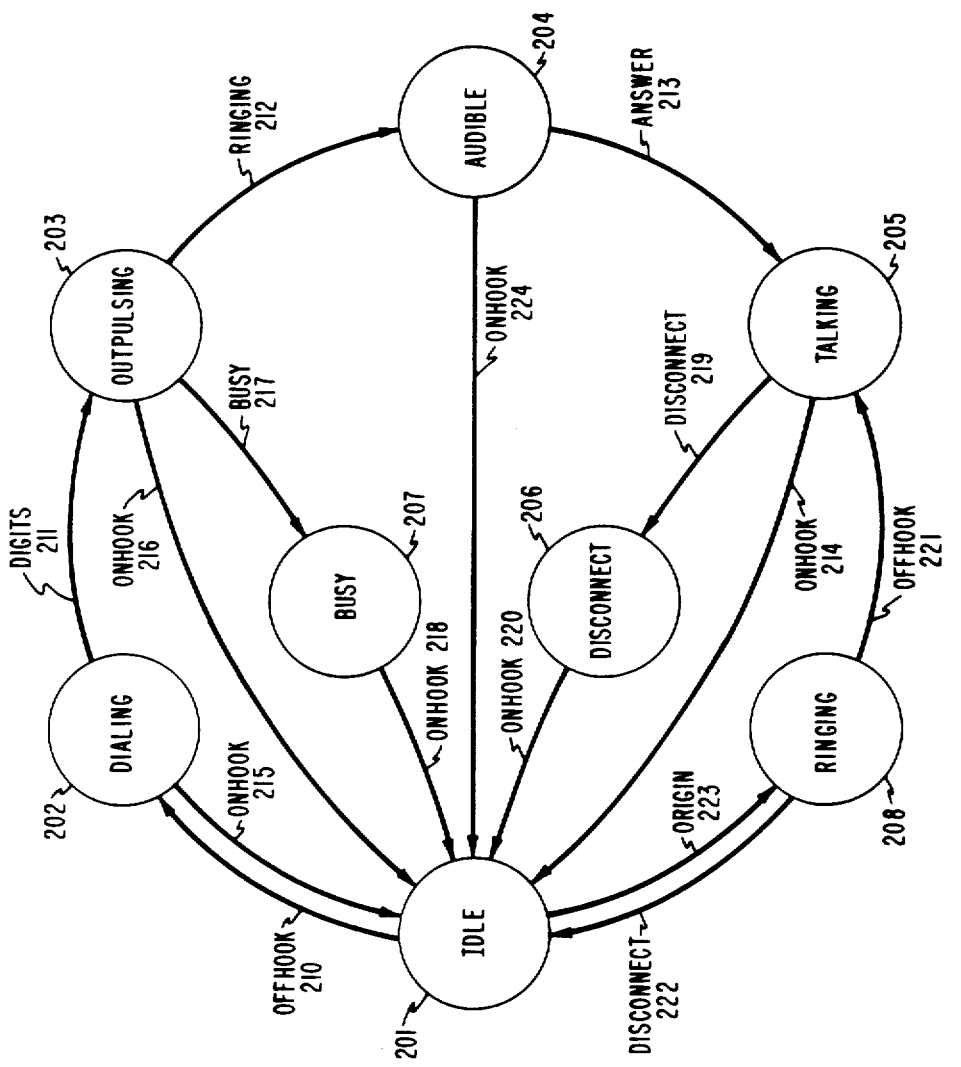
FIG. 2 illustrates, in state diagram form, the states of a customer unit of the telecommunication system of FIG. 1.

The state diagram for basic telephone service provided by the telecommunication system of FIG. 1 is illustrated in FIG. 2 and the accompanying source code program is shown in FIGS. 3 and 4. To add new services to this basic package, a customer, using data terminal, logs on to the UNIX operating system controlling computer 101. Then, using standard editing techniques, the customer enters a program such as illustrated in FIG. 5. As described in detail later, the program illustrated in FIG. 5 provides call forwarding which allows the customer to forward calls from customer unit 102 to any other designated customer unit and allows calling party identification which allows a calling party to customer unit 102 to be identified on terminal 106. In addition, the program illustrated in FIG. 5 also provides for the activation and deactivation of the call forwarding feature so that the feature is activated during the working hours of the week but deactivated during nonworking hours.

To program these new features, the customer only has to be aware of the call states in which these features are to be invoked and the system signals by which they are invoked. In addition, only customer unit 102 is affected by these changes and not a group of customers utilizing the telecommunication system illustrated in FIG. 1.

Figure 8:
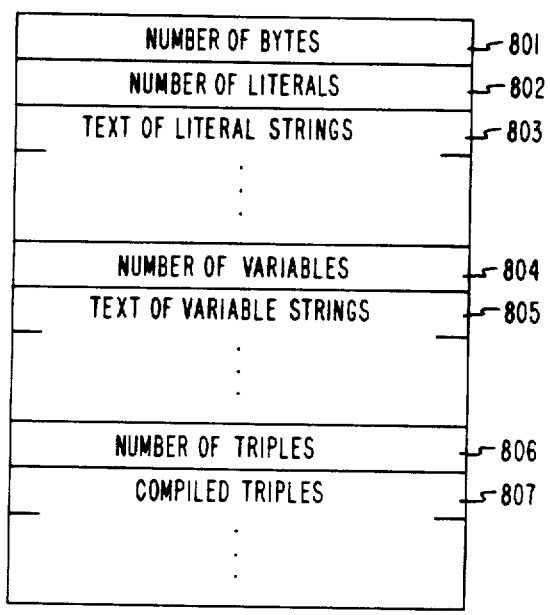
FIG. 8 illustrates the format of a compiled script downloaded from computer 101.

After the customer has prepared the program illustrated in FIG. 5, the customer then executes a compiler under control of the UNIX operating system that compiles the source code illustrated in FIG. 5 into compiled code which has the format illustrated in FIG. 8. The latter compiled code is then transferred to computer 104 via bus 110. The operating system controlling computer 104 is responsive to the information illustrated in FIG. 8 to execute the program illustrated in FIG. 9 on a time-shared basis such that the normal telecommunication service is not interrupted. Hence, the customer can be talking on telephone handset 105 during the course of this operation.

Figure 6:
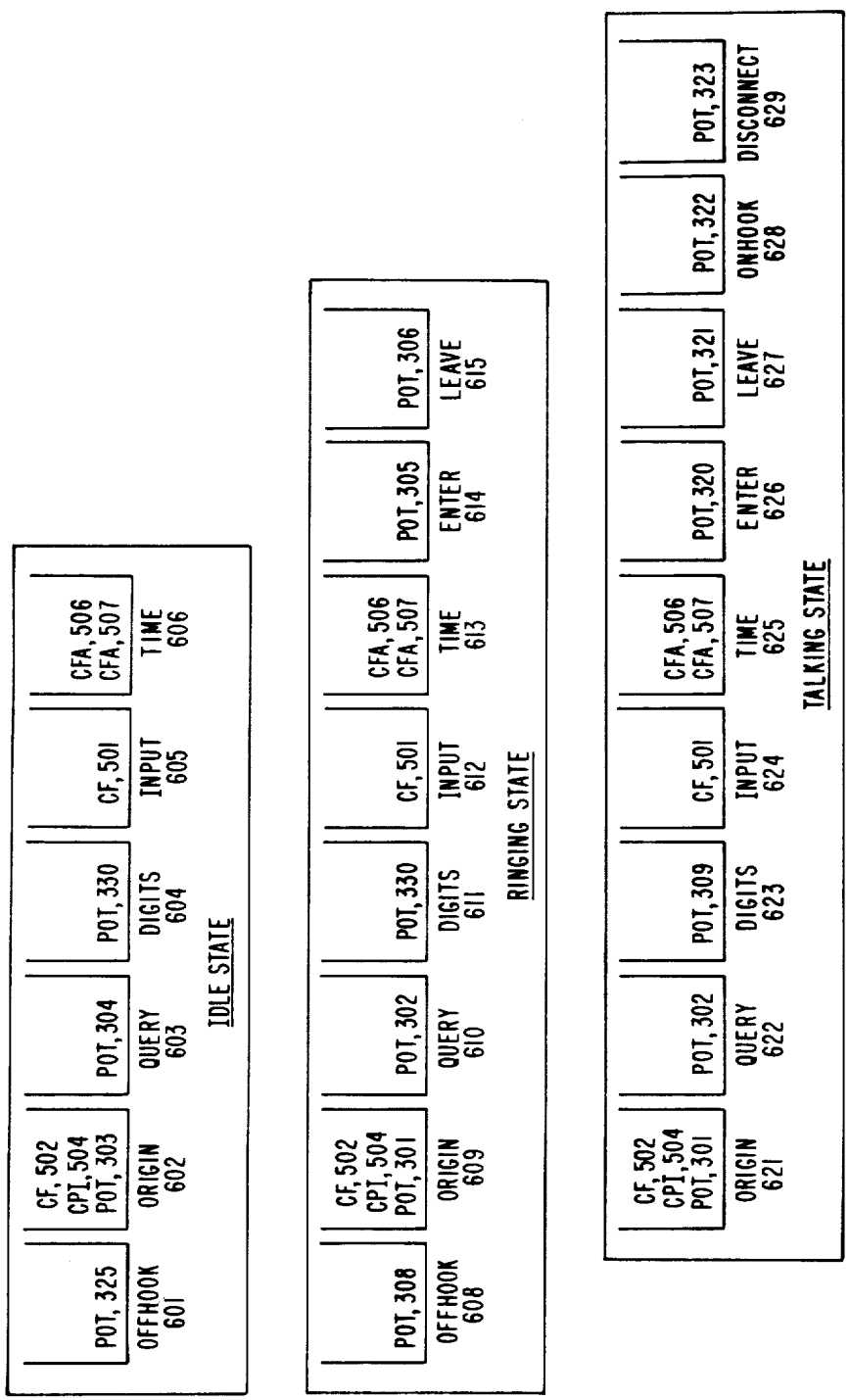
FIG. 6 illustrates logical signal tables with the implementation of call forwarding, calling party identification, and basic telephone services for the telecommunication system of FIG. 1.
Figure 7:
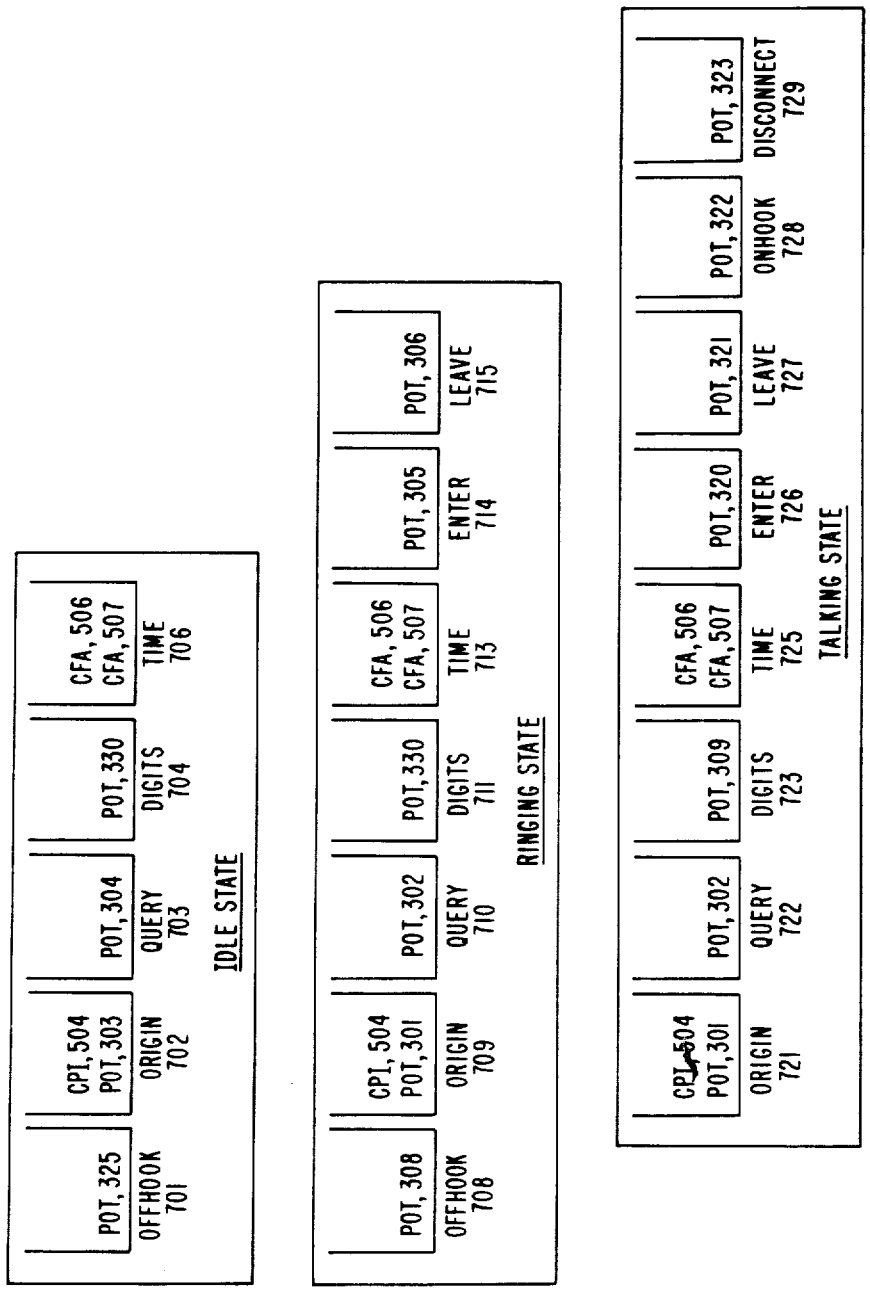
FIG. 7 illustrates the logical signal tables of FIG. 6 upon the call forwarding service having been deactivated.

The compiled code that is downloaded as illustrated in FIG. 8 is stored, upon activation, in logical signal tables such as illustrated in FIGS. 6 and 7. The latter tables relate all signals with the state in which each signal can occur. After the downloading has occurred, the customer can manually activate the new service by the execution of the activation command or it can be done automatically by other code, such as the code illustrated for the activation of the call forwarding feature in FIG. 5.

As will be described in greater detail in the next section, the physical structure of the logical signal tables of FIGS. 6 and 7 coupled with the nonprocedural language primitives of STOP and CONTINUE allow the new services to control whether or not the original basic code is executed or prohibited from execution for each state. In addition, the nonprocedural language event specifiers of ENTER and LEAVE allow the programmer to be unconcerned about the problems of initializing and resetting various aspects of the telecommunication system when a state is entered or left via a plurality of state transitions. The nonprocedural language explicitly defines operations in terms of related state and signal information from the telecommunication system and allows the customer to easily and readily program the customer units to meet the needs of the customer. In addition, since the actual source code is written and compiled on the UNIX operating system which is a commercially available system, the need for programmers specifically skilled in telecommunication type systems is alleviated, to a large extent.

DETAILED DESCRIPTION

The software system which is the subject of this invention is advantageously implemented by the hardware system illustrated in FIG. 1. However, it would be obvious to one skilled in the art that other hardware systems are controllable by the illustrative software system. The hardware of FIG. 1 comprises a plurality of customer units 102 through 103. Each customer unit comprises a computer, a telephone handset, and a data terminal. Voice and data information is communicated in the form of packets via bus 100. Bus 100 may advantageously be of the Ethernet ™ type, or it may be a packet switching system as described in U.S. Pat. No. 4,494,230. Customer unit 102 comprises computer 104 which, advantageously, may be of PDP 11 type manufactured by Digital Equipment Corporation, and terminal 106 may advantageously be a Teletype 5410 terminal manufactured by the AT&T Teletype Corporation. Computer 104 contains units not shown for interfacing to bus 100, telephone handset 105, and terminal 106, and for performing the analog-digital conversions utilized for transmitting voice information from and to handset 105 via bus 100.

During the initialization of the system and as required to implement changes in the operation of the customer units, scripts that are written in the nonprocedural language are entered via a terminal to computer 101. Computer 101 compiles these scripts and then downloads interpretable representations of them via bus 110 to the designated customer unit's memory via that unit's processor. Each script comprises a plurality of triples with each triple comprising a state definition, an event definition, and an action definition. The event definition defines which signal actuates the triple and the action definition defines the action to be taken upon the triple actuation. The action definition is made up of a group of instructions. The states and signals that actuate triples for Plain Old Telephone, POT, service are illustrated in FIG. 2.

FIG. 2 illustrates in state graphic form, the various states 201 through 208 that one of the customer units 102 through 103 may be in at any particular point in time during a line-to-line call. It would be obvious to one skilled in the art to expand the number of illustrated states to meet new system requirements. Signals 210 through 224 represent the events whose individual occurrences causes a transition from one state to another state. Again, it would be obvious to one skilled in the art to expand the number of signals to meet new system requirements.

For example, in order to place a call, the customer unit must be initially in idle state 201 and go off-hook. The event of going off-hook places the customer unit in dialing state 202 via off-hook signal 210. After the digits have been collected from the terminal, the state is changed from dialing state 202 to outpulsing state 203 via digits signal 211.

In outpulsing state 203, the customer unit being called is sent a request for a call termination. If the called customer unit is busy, then busy state 207 is entered via busy signal 217. If the calling customer unit goes on-hook while in outpulsing state 203, or dialing state 202 or busy state 207, then the calling customer unit is returned to idle state 201 via either on-hook signal 216, 215, or 218.

If the called customer unit is not busy, then the calling customer unit enters audible state 204 via ringing signal 212. While in the audible state, the calling customer unit hears the ringback tone. If the calling customer unit goes on-hook during audible state 204, it is transferred back to idle state 201 via on-hook signal 224. Once the called customer unit answers the call, the calling customer unit is transferred to talking state 205 via answer signal 213.

Upon entering talking state 205, the calling and called parties exchange voice packets via bus 100. If the called party hangs up first, the calling party is transferred from talking state 205 to disconnect state 206 via disconnect signal 219. If the calling party hangs up first, the calling party is transferred from talking state 205 to idle state 201 via on-hook signal 214.

Consider the previous example from the point of view of the called station. Upon receipt of a message 223 via bus 100 indicating that another customer unit wants to set up a voice connection, the called customer unit is transferred from idle state 201 to ringing state 208 via origin signal 223. While in ringing state 208, the called customer receives an audible ringing indication. If the called customer unit goes off-hook, it is transferred to talking state 205 via off-hook signal 221. If, instead, the calling unit goes on-hook while the called unit is in the ringing state 208, it transmits a disconnect signal contained in a message communicated via bus 100. In response to the disconnect signal, the called customer unit is transferred from the ringing state 208 to idle state 201 via disconnect signal 222.

Turning now to the invention, a script for implementing the transitions from the various states illustrated in FIG. 2 is illustrated in FIGS. 3 and 4. The script implements plain old telephone (POT) service or basic telephone service in terms of triples. The latter, once compiled, is stored in memory 108 and executed by processor 107. More details of the language utilized in FIGS. 3 and 4 is given in Appendix A. One skilled in the art can observe from FIGS. 3 and 4 that there is no requirement for ordering the triples. The order of execution is explicitly designated by state and event information and an interscript control mechanism that is implemented during the downloading and activation of the scripts and during execution of the triples.

Consider the example where customer unit 103 is calling customer unit 102. Customer unit 102 is in idle state 201 of FIG. 2. Upon receipt of a message from customer unit 103 containing an origin signal 223 which designates that a call is to be set up, the origin event of triple 303 matches and thus the triple is actuated. The $SOURCE variable is set equal to the telephone number of customer unit 103 by the compiled code for the event definition. The operations to be executed are specified by the action definition of triple 303. First, the information in the $SOURCE variable is transferred to the $ORIGINATOR variable for later use, and a message containing ringing signal 212 is transmitted to customer unit 103 via bus 100 by execution of the SEND primitive to inform customer unit 103 that customer 102 is entering the ringing state. The information in $SOURCE variable is then transferred to $OTHERPARTY variable for later use. The last operation performed is the execution of the NEXTSTATE primitive designating that ringing is to be the next state of customer unit 102. When the state is changed to ringing, the enter signal is generated for ringing state 208. Since the enter signal is generated internal to latter state, it is not illustrated in FIG. 2; but it is explained in detail with respect to FIG. 38. The generation of the enter signal causes triple 305 to be executed. The action definition of triple 305 applies the audible ringing "tone" or "indication" to handset 105.

As illustrated in FIG. 2, customer unit 102 leaves ringing state 208 by either going off-hook causing an off-hook signal 221 to be generated or by receiving a disconnect signal 222 from customer unit 103 via bus 100. The disconnect signal 222 from customer unit 103 indicates that unit 103 has gone on-hook. If customer unit 102 goes off-hook, the off-hook signal 221 is generated, and triple 308 is executed. Triple 308 informs customer unit 103 with a message containing answer signal 213 that customer unit 102 has answered. In addition, the state is changed to talking state 205 by the NEXTSTATE primitive. When the state is changed, the leave signal is generated, and triple 306 is executed whose action definition causes the audible ringing "tone" or "indication" to be removed from handset 105. Since the leave signal is generated internal to ringing state 208, it is not illustrated in FIG. 2; but it is explained in detail with respect to FIG. 38.

If customer unit 102 is in ringing state 208 and receives a disconnect signal 222, then triple 307 is executed. This triple indicates the actions performed by customer unit 102 when calling customer unit 103 goes on-hook. However, no connection has been established at this point. If the message is not from the calling customer unit, customer unit 102 simply continues in the ringing state 208. If the disconnect signal 222 was sent by customer unit 103, then the action definition of triple 307 is executed and the NEXTSTATE primitive moves the system back to idle state 201.

If the signal causing the customer unit 102 to leave the ringing state 208 was an off-hook signal 221, triple 308 causes the answer signal 213 to be transmitted to customer unit 103 and causes customer 102 to enter talking state 205. Upon entering talking state 205, triple 320 of FIG. 4 is executed. The latter triple causes the necessary housekeeping to be performed in computer 104 to establish a voice path via bus 100 to customer unit 103.

When customer unit 102 goes on-hook, triple 322 is executed causing a disconnect signal 219 to be transmitted to customer unit 103 indicating that customer unit 102 has disconnected. In addition, the NEXTSTATE primitive is executed causing customer unit 102 to go to idle state 201. The execution of the NEXTSTATE primitive generates a leave signal resulting in the execution of triple 321. The action definition of triple 321 removes the voice connection to bus 100 for customer unit 102 by the execution of the DISENGAGE primitive.

In order to explore in greater detail the interscript control mechanism and the activation and deactivation of scripts for controlling a customer unit's environment, consider the scripts illustrated in FIG. 5. The illustrated scripts provide call forwarding (CF script), calling party identification (CPI script), and the activation and deactivation of the call forwarding (CFA script) feature. These scripts are compiled by computer 101 and then downloaded to computer 104 of customer unit 102. Computer 104 illustratively stores these scripts so that when the different events specified within the scripts occur, the CF script has precedence over the CPI and CFA scripts.

The call forwarding feature functions by transferring calls intended for customer unit 102 to another customer unit previously identified by the customer entering data via terminal 106. The calling party identification feature displays on terminal 106 which customer unit is attempting to place a call to customer unit 102. For the present example, the call forwarding feature has precedence over the calling party identification. Hence, if the call forwarding feature is active, the calling party identification feature does not display the identification of the calling customer unit since the calling party identification feature is not executed. If call forwarding is not active, then the calling party identification feature identifies all calls that have been placed to customer unit 102 even if the latter is not in the idle state.

The CF script for the call forwarding feature consists of triples 501 and 502 as illustrated in FIG. 5 and demonstrates the interscript precedence mechanism using the STOP and CONTINUE primitives. Triple 501 can be executed in any of the states illustrated in FIG. 2. Triple 501 is actuated by an input signal designating that a "#" has been typed on terminal 106. If such an input signal is generated, then triple 501's event definition sets the $CFNUMBER variable equal to the string of characters that the customer types after "#" on terminal 106. Triple 501's action definition executes the STOP primitive which results in no further processing of the input signal by any other triples from any scripts in any states. The purpose of executing the STOP primitive here is to stop any further processing of the input signal rather than to control interscript precedence.

Assuming that triple 501 has been actuated and that the $CFNUMBER has been set equal to the number for the identified customer unit 103, an origin signal 223 received in any state causes triple 502 to be executed. The execution of triple 502 first results in the $SOURCE variable being set equal to the calling customer unit's number by the event definition. The action definition of triple 502 then checks to determine that the $CFNUMBER variable has been set equal to a nonnull value and that this value is not equal to the calling customer unit's number. If these conditions are true, then the "then" statement of triple 502's action definition is executed resulting in the FORWARD, PRINT, and STOP primitives being executed. The FORWARD primitive transfers the value of the $SOURCE variable to the identified customer unit along with the origin signal 223 indicating that call origination is being attempted. In addition, the PRINT primitive prints a message out on terminal 106 indicating the time at which the call was transferred to the identified customer unit. Finally, the STOP primitive is executed which inhibits the execution of triples in the CPI and POT scripts that respond to the origin signal in the current state of customer unit 102. The execution of the STOP primitive allows the CF script to inhibit the normal operations that would occur upon an attempt being made to set up a call. The STOP primitive is part of the interscript control mechanism.

If the conditions defined by the "if" statement of triple 502 are not met, then a CONTINUE primitive is executed. The latter's execution results in control being passed to other triples of lower-precedence scripts. In this case, the origin signal 223 will be handled by the CPI and POT scripts. When the CPI script receives the origin signal 223 in any state, the action definition of triple 504 prints out an indication that a call has been received from the customer unit identified in the origin message and then executes the CONTINUE primitive to invoke the operation of the POT script to set up the call. When control is passed to the POT script, the connection is set up as previously described with respect to FIGS. 3 and 4.

Now, consider how the CFA script illustrated in FIG. 5 activates or deactivates the CF script. When the time reaches 8:00 a.m., a time signal is generated, and triple 506 is executed resulting in the CF script being activated if the day of the week is Monday through Friday which are designated as "1" through "5", respectively. At 5:00 p.m., another time signal is generated; and in response, triple 507 is executed and deactivates the CF script if the day of the week is not Saturday or Sunday. Normally, the CF script would have been deactivated on Friday, at 5:00 p.m., if it was Saturday or Sunday.

The compiler illustrated in Appendix C is executed by computer 101 and is responsive to the scripts illustrated on FIGS. 3, 4, and 5, to compile these scripts prior to the transfer of the compiled triple code to illustratively computer 104. The source code of Appendix C is listed in the copending application of T. L. Hansen, et al., U.S. Ser. No. 812,940 filed concurrently with the present application and which is hereby incorporated by reference into the present application.

As is described later, when the compiled scripts are downloaded, the activation operation performed in computer 104 establishes the following precedence among the scripts: CFA, CPI, and CF with the CFA script having the highest precedence. In addition, the CFA, CPI, and CF scripts could be compiled at a latter point in time and downloaded. A program in computer 104 is responsive to the compiled triples of these scripts to store these triples as logically illustrated in FIG. 6 for idle, ringing, and talking states, and to provide a method for executing these triples. The triples associated with the other states would be similarly stored. The triples are grouped by their event definitions for each state.

Figure 11:
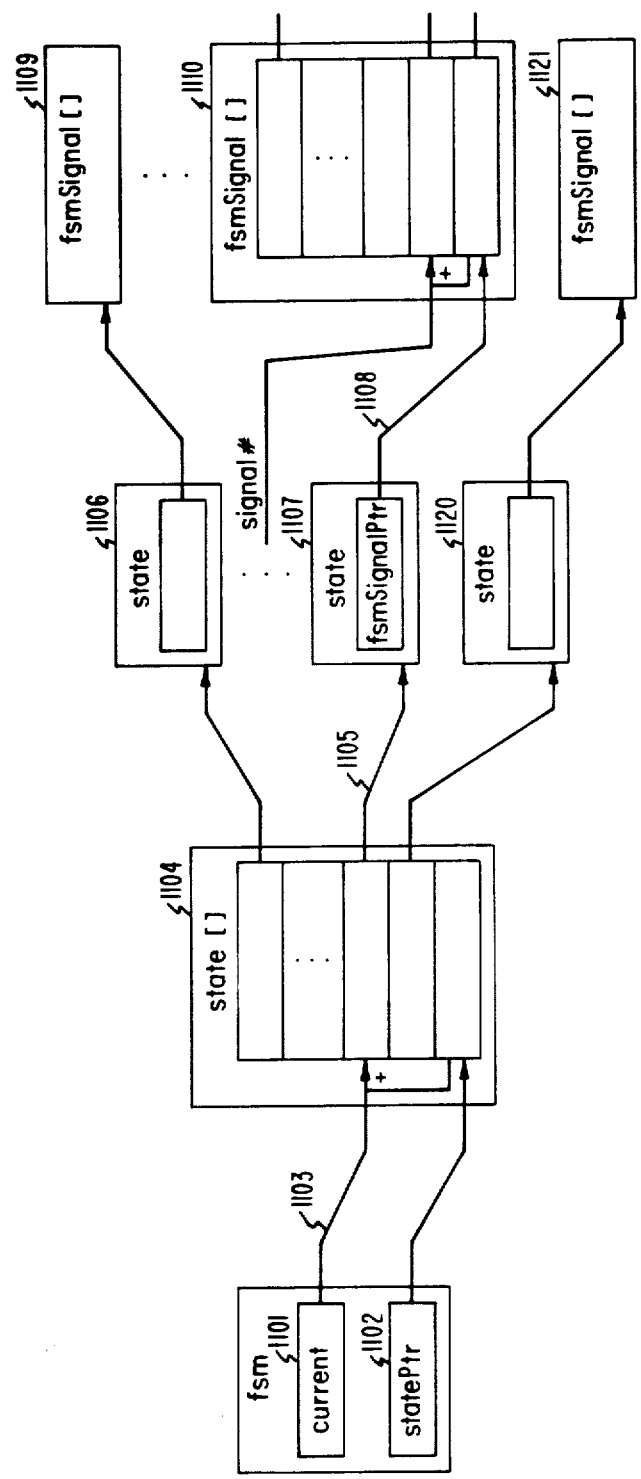
FIGS. 11, 12, and 13 illustrate software structures that are utilized to implement the logical signal tables of FIGS. 6 and 7.
Figure 12:
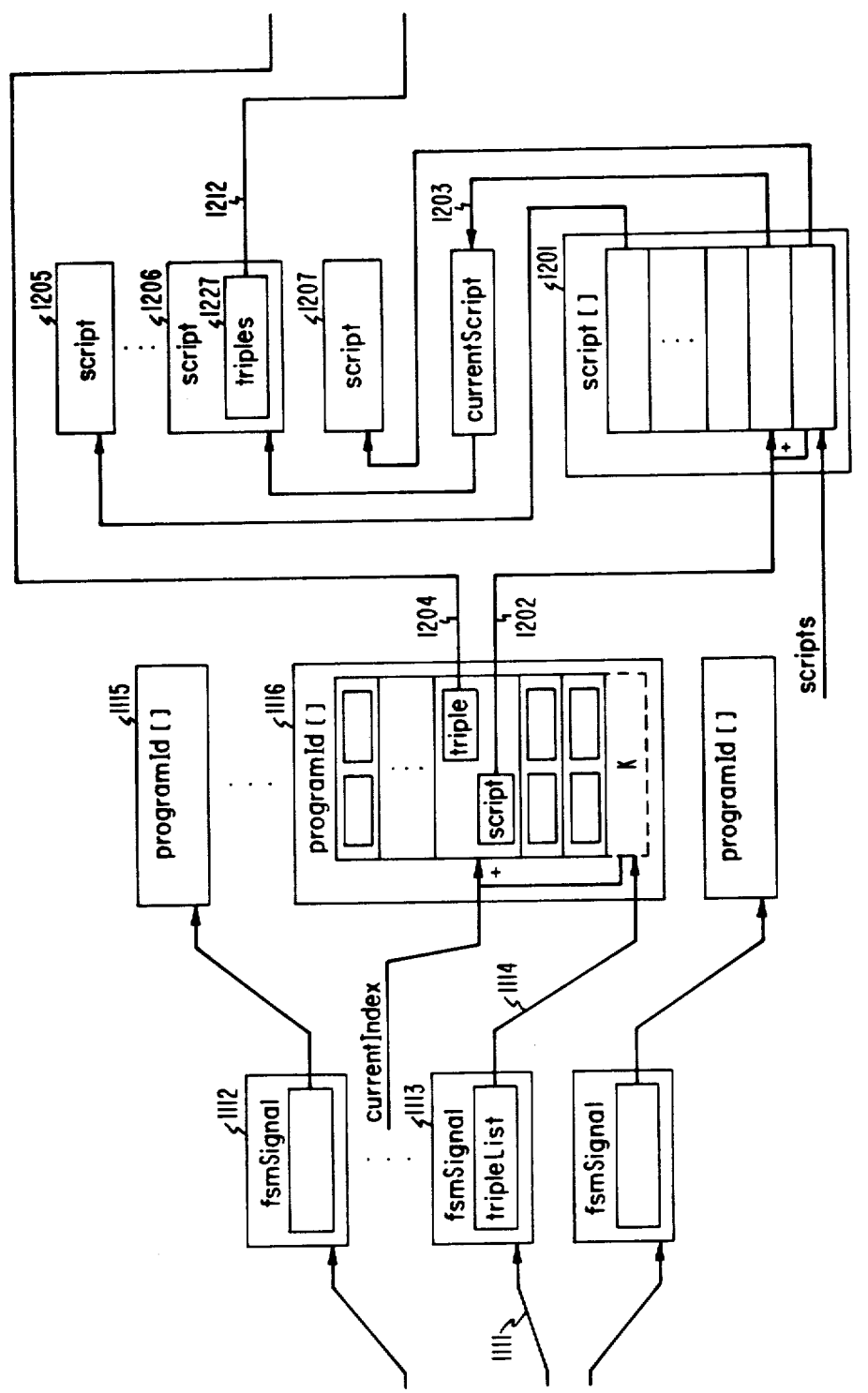
Figure 13:
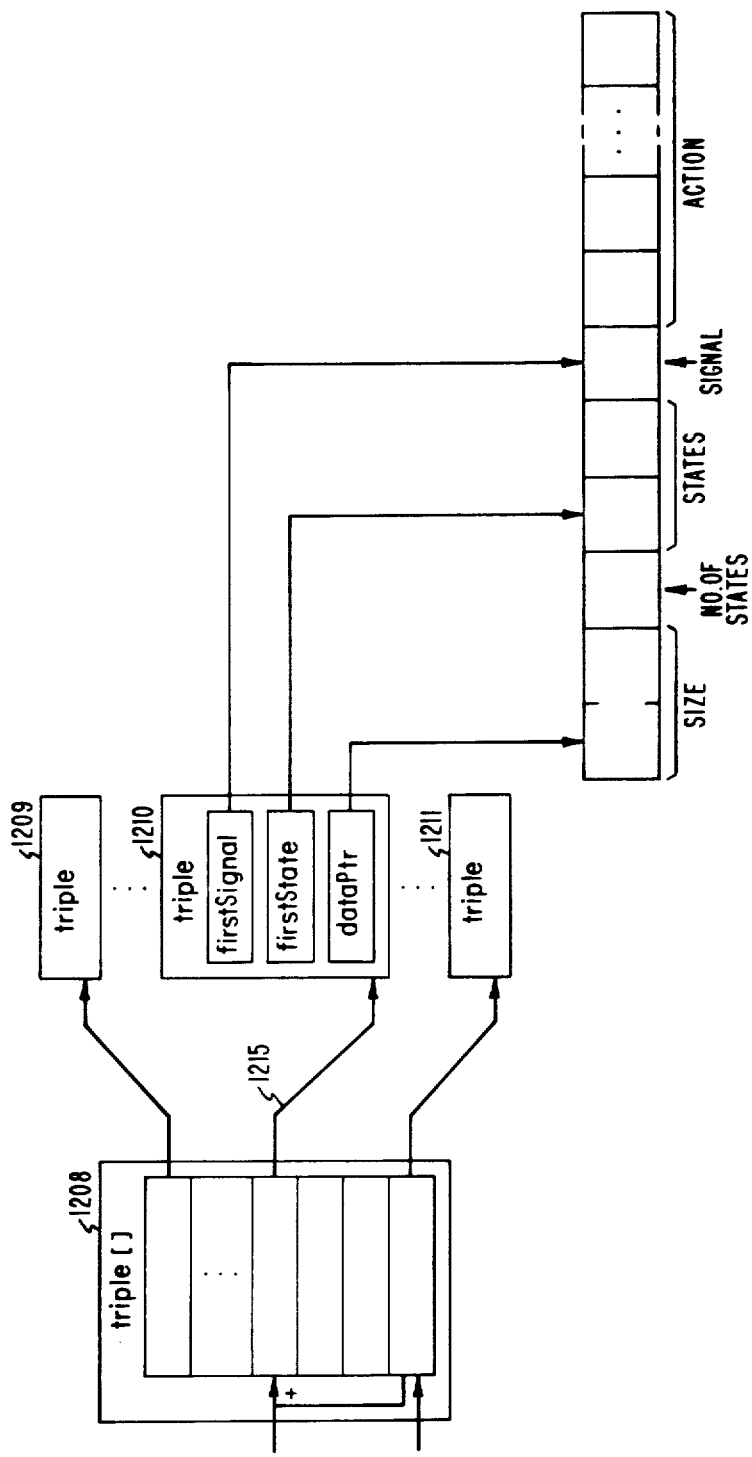

As illustrated in FIGS. 11,12, and 13, indexing is provided that allows for execution of a triple in response to a signal that corresponds to a particular event definition when the present state corresponds to the state definition. For example, origin signal 223, when received in the idle state 201, can sequentially activate triple 502 of the CF script, triple 504 of the CPI script, and triple 303 of the POT script.

Figure 10:
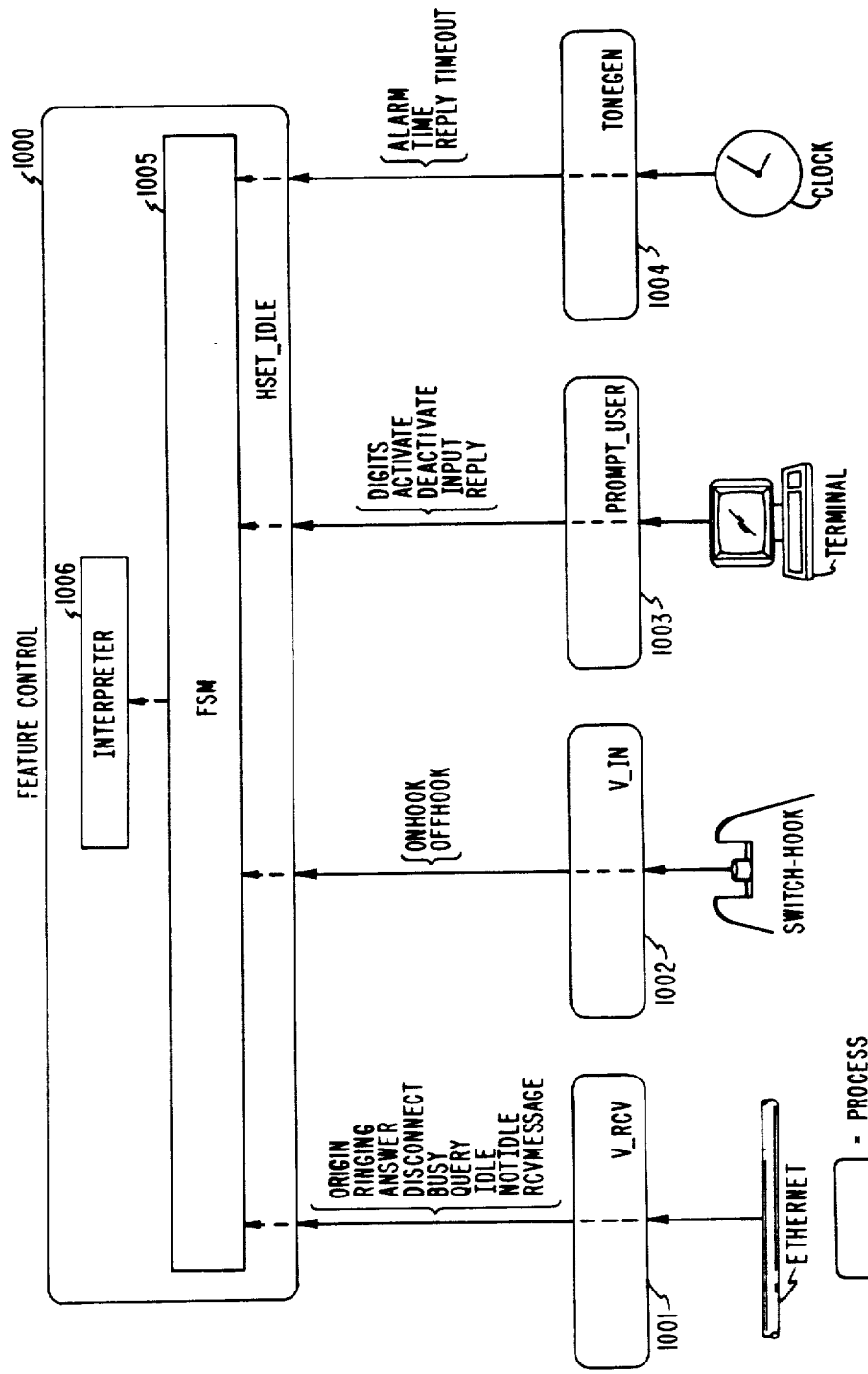
FIG. 10 illustrates in block diagram form, software processes and interprocess communication that is utilized in the control of a customer unit's computer of FIG. 1.
Figure 15:
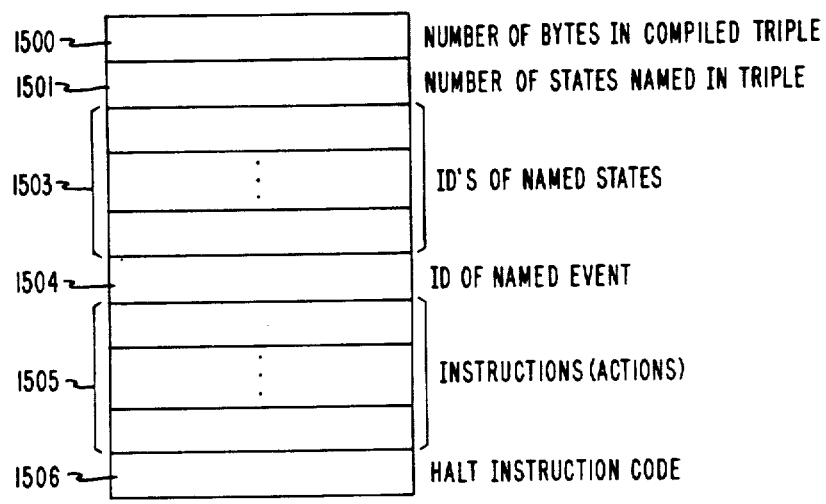
FIG. 15 illustrates the format of a compiled triple that result from compilation of the source code for a triple such as illustrated in FIG. 3.
Figure 16:
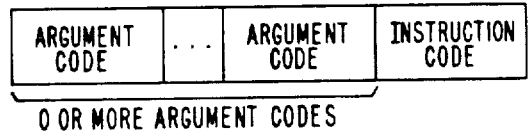
FIGS. 16 through 21 illustrate the various instruction formats used in FIG. 15.

The different processes that are executed in computer 104 to receive the compiled code from computer 101 and to activate, store, and execute this information in the logical manner illustrated in FIG. 15, are illustrated in FIG. 10. The source code for implementing the routines illustrated in FIG. 10 with the exception of interpreter 1006 is illustrated in Appendix F with the source code for interpreter 1006 being illustrated in Appendix D. The source code of Appendices D and F is listed in the:. copending application of T. L. Hansen, et al., U.S. Ser. No. 812,940 filed concurrently with the present application and which is hereby incorporated by reference into the present application.

Also illustrated in the latter figure are the signals communicated between the various processes in the customer units. For example, in the previous discussion, the origin signal 223 transmitted from customer unit 103 to customer unit 102 is received by computer 104 via bus 100 by V_RCV process 1002. The latter process then communicates the origin signal 223 to feature control process 1000 via an operating system call. The execution of these processes is controlled by an operating system that controls the operation of computer 104. The source code for the operating system is illustrated in Appendix E. The source code of Appendix E is listed in the copending application of T. L. Hansen, et al., U.S. Ser. No. 812,940 filed concurrently with the present application and which is hereby incorporated by reference into the present application.

For example, if the customer lifts his or her telephone receiver from its cradle (i.e., goes off-hook), a hardware interrupt occurs causing the operating system to send an interrupt message to V_IN process 1002. The latter process responds to the interrupt and determines that the customer has gone off-hook and then transmits the off-hook signal via an operating system call to feature control process 1000. The execution of the operating system call to transfer the off-hook signal to feature control process 1000 results in the operating system executing feature control process 1000.

Once feature control 1000 is invoked, it first determines what signal it has received, determines the present state of the customer unit, and then executes the triples in that state whose event definition matches the received signal. To illustrate how this matching is accomplished, consider the transmission of an origin message 223 via bus 100 from customer unit 103 to customer unit 102. V_RCV process 1001 receives this message and transfers the origin signal to finite state machine (FSM) 1005 of feature control 1000. FSM 1005 is responsive to the origin signal to index into logical signal tables 601 through 606 that are associated with the idle state 201. FSM 1005 then identifies origin logical signal table 602 and has the triples identified by table 602 interpreted by interpreter 1006. The manner in which the indexing is performed on actual physical tables, and the identification of the triples to be executed for a given state and signal are detailed with respect to FIGS. 11, 12 and 13.

After identifying logical signal table 602, FSM 1005 passes a pointer, which is stored in entry CF,502 of table 602, to interpreter 1006 to identify the location of the compiled triple code to be executed. The action implemented by the identified triple code is defined by triple 502 as illustrated on FIG. 5.

Two different sets of operations can result from the execution of triple 502. The first set results if $CFNUMBER variable contains a number and the calling customer unit is not the customer unit to which customer unit 102 is transferring its calls. If the conditions for the first set of operations are met, then the origin signal and the calling customer unit's number are transferred to the designated call forwarding customer unit by execution of the FORWARD primitive. Also, a notification message is printed on data terminal 106, and the STOP primitive is executed. The effect of the STOP primitive is to cause FSM 1005 to cease processing triples in logical signal table 602.

The second set of operations is performed when the conditional portion of the "if" statement of triple 502 is false, causing the "else" portion to be executed. The "else" portion of the "if" statement causes the CONTINUE primitive to be executed which results in FSM 1005 executing the remaining triples in logical signal table 602.

If the CONTINUE primitive is executed, the next triple to be executed in table 602 is triple 504 of FIG. 5 which is pointed to by the CPI,504 entry. The execution of triple 504 results in a message being printed out on terminal 106 identifying the calling customer unit. Next, the CONTINUE primitive is executed which results in the execution of triple 303 as identified by the POT,303 entry in table 602.

The execution of triple 303 results in the identification number of the calling customer unit being saved in $ORIGINATOR and $OTHERPARTY and a message being transmitted to the calling customer unit indicating that the called customer unit is entering the ringing state 208. In addition, the NEXTSTATE primitive is executed, resulting in the leave signal being internally generated, the state being changed to the ringing state, and the enter signal being internally generated within feature control 1000 by FSM 1005. FSM 1005 processes the leave and enter signals in a manner similar to the signals being received from another process such as V_RCV process 1001. Further details on the processing of the leave and enter signals is given with respect to FIG. 38 which illustrates the NEXTSTATE primitive.

The leave signal relates to the idle state 201 in the present example. Since there are no entries in the logical signal table for the leave signal associated with the idle state, no action results from this signal in the present example. The enter signal which relates to the new state, i.e., ringing state 208, causes the compiled code pointed to by entry POT,305 of logical signal table 614 to be executed. This compiled code corresponds to triple 305 illustrated in FIG. 3. The action definition of triple 305 results in the audible ringing tone being applied to handset 105. In addition, the action definition causes the CONTINUE primitive to be executed; however, since there are no more triples to be executed in logical signal table 614, no other triples are executed in response to the enter signal.

If, during the ringing state 208, handset 105 goes off-hook, this fact is detected by V_IN process 1002 and an off-hook signal 221 is transmitted to FSM 1005. The latter process identifies that it has received the off-hook signal and that it is in the ringing state and indexes into logical signal table 608. FSM 1005 accesses the pointer stored in POT,308 and passes this pointer to interpreter 1006 which executes the compiled code for triple 308 as illustrated in FIG. 3. The latter triple transmits the answer signal 213 to the calling customer unit by execution of the SEND primitive, and executes the NEXTSTATE primitive to change the state to the talking state 205. The execution of the NEXTSTATE primitive causes the leave signal to be generated for the ringing state and the enter signal to be generated for the talking state. FSM 1005 is responsive to the leave signal to direct the interpreter 1006 to execute the triple pointed to by entry POT,306 of logical signal table 615. The execution of the compiled code for triple 306 illustrated in FIG. 3 results in the ringing tone being removed from handset 105 of FIG. 1.

In response to the enter signal, FSM 1005 indexes into the logical signal tables 621 through 629 associated with the talking state and identifies the triple pointed to by the contents of the POT,320 entry for enter logical signal table 626. This pointer is passed to interpreter 1006 which executes triple 320 of FIG. 4. The latter triple causes a voice communication path to be set up between the calling customer unit and customer unit 102 by execution of the ENGAGE primitive.

If, during the talking state 205, customer unit 102 goes on-hook, this fact is detected by V_IN 1002 process and an on-hook signal is transmitted to FSM 1005. The latter is responsive to the on-hook signal to identify and pass the pointer to interpreter 1006 contained in POT,322 of logical signal table 628. The latter pointer points to the compiled code for triple 322 as illustrated in FIG. 4. Execution of this compiled code results in the execution of the SEND primitive which transmits the disconnect signal 219 to the calling customer unit and the execution of the NEXTSTATE primitive to change the state to idle 201.

The execution of the NEXTSTATE primitive causes a leave signal to be generated for the talking state 205 and an enter signal to be generated for the idle state 201. FSM 1005 is responsive to the leave signal to identify and pass the pointer to interpreter 1006 contained in logical signal table 627. The latter pointer points to the compiled code for triple 321, as illustrated on FIG. 4. Execution of the latter compiled code results in the voice communication path from customer unit 102 to the calling party being broken. Since there is no enter logical signal table associated with the idle state, the generation of the enter signal has no effect.

In order to illustrate the effect of the activation and deactivation, consider the following example. Assume customer unit 102 is in the talking state when the real-time clock indicates that it is 5:00 p.m. Tonegen process 1004 is responsive to the fact that it is 5:00 p.m. has passed to transmit a time signal to FSM 1005. The latter process is responsive to the time signal to identify time logical signal table 625 associated with the talking state. As will be described in greater detail with respect to FIGS. 23 and 24, FSM 1005 first passes the pointer pointing to the compiled code of triple 506 to interpreter 1006; and after interpreter 1006 has finished processing triple 506, FSM 1005 passes the pointer from logical signal table 625 for triple 507 to interpreter 1006 for execution. The first action of the compiled code for triple 506 is to check whether or not the time is equal to 8:00 a.m., verifying that the event time (8:00) has occurred. Since, in our present example, the time is 5:00 p.m., the event does not match and the action definition of triple 506 is not executed.

Interpreter 1006 returns control to FSM 1005 which then passes the pointer contained in CFA,507 entry of logical signal table 625 that points to triple 507 as illustrated in FIG. 5 to interpreter 1006. The latter is responsive to this pointer to start execution of the compiled code for triple 507. The first part of the compiled code for triple 507, as illustrated in FIG. 5, verifies whether or not the event matches the specified time (17:00) event before proceeding to execute the action definition portion of the triple. Since the time is 5:00 p.m., or 17:00 on a 24-hour time base, and assuming that the day is Monday through Friday, the DEACTIVATE primitive and the PRINT primitive of triple 507 are executed. The DEACTIVATE primitive causes a deactivate signal to be transmitted to FSM 1005 indicating that the CF script is to be deactivated. No actual deactivation takes place at this point in time.

When FSM 1005 receives the deactivate signal, it processes through all of the states to remove all triples that are part of CF script 500, as illustrated on FIG. 5. This process is described in greater detail with respect to FIGS. 23 through 28. In the present example, the CF script 500 does not have a triple whose event definition is responsive to the deactivate signal so the triples can simply be removed by FSM 1005, thereby completing the actual deactivation of the CF script. After removal of the triples associated with CF script 500, the logical signal tables of the idle, ringing, and talking states contain the pointers to triples as illustrated in FIG. 7. For example, in the idle state, since the reference to the CF triples has been removed, the calling party identification triple is now the first triple executed in logical signal table 702 when an origin signal is received in the idle state.

It would be obvious to one skilled in the art that the inter-feature precedence could be changed by altering the manner in which the references to the triples are stored in the logical signal tables of FIG. 6. For example, to allow the calling party identification to have precedence over the call forwarding, the CPI triples would be placed on top of the call forwarding triples in the logical signal tables. For example, in origin logical signal table 602, the order would be CPI,504; CF,502; and POT,303. Similarly, the entries in origin logical signal table 609 and origin logical signal table 621 would be changed.

Figure 9:
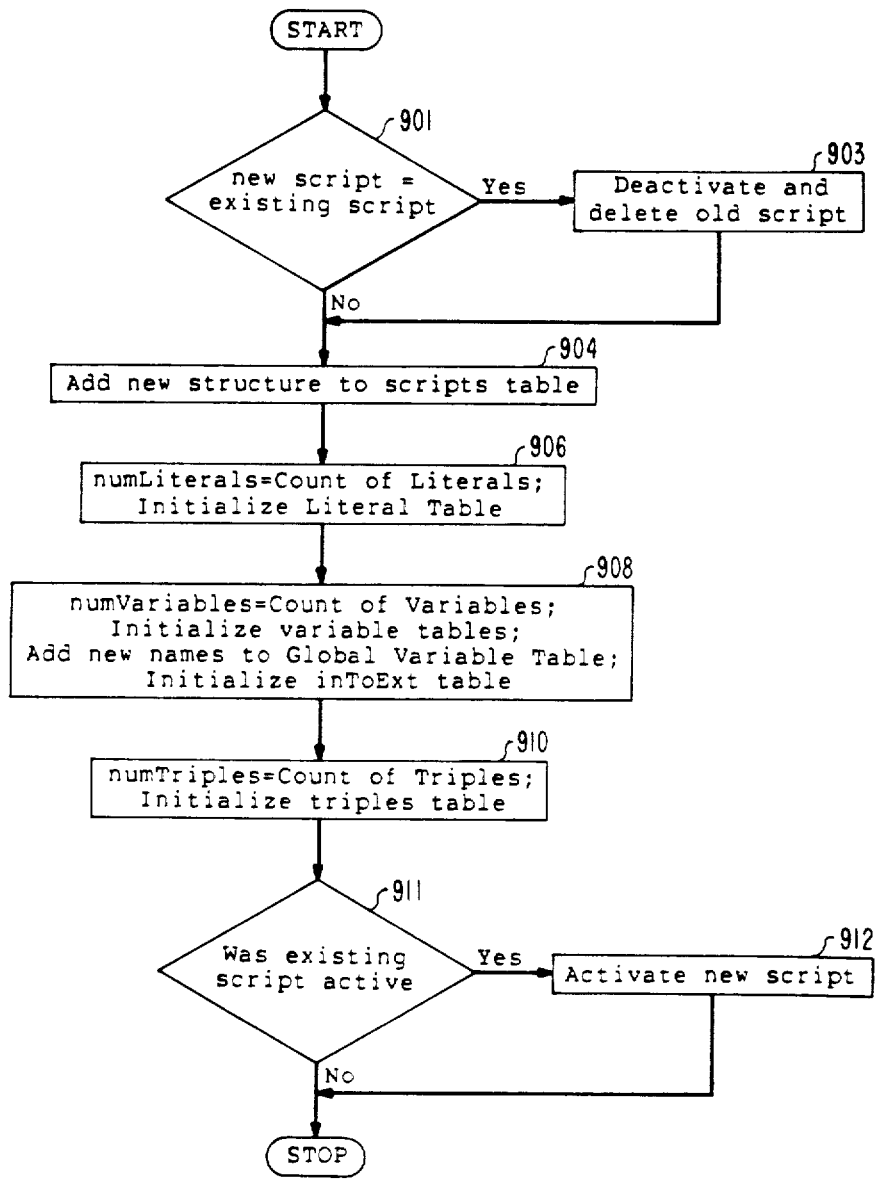
FIG. 9 illustrates in flowchart form a program routine for inserting the compiled script of FIG. 8 into the software structures of FIGS. 11, 12, and 13.

After the source NPL instructions have been compiled by computer 101 executing compiler, the compiled code is downloaded to the computer 104 where it is stored into memory 108 under control of processor 107 executing the program illustrated in FIG. 9. The format of the downloaded compiled code is illustrated in FIG. 8. Location 801 specifies the total number of bytes in the downloaded compiled script, and the number of distinct literals in the script is specified by location 802. The literal strings are downloaded in block 803 with each literal being terminated by a null character. The number of distinct variables in the script is specified by location 804, and the variable strings representing the variable names are downloaded in block 805. The number of triples in the compiled script is specified by location 806 while the actual compiled triples are located in block 807.

The program illustrated in flowchart form in FIG. 9 is responsive to the downloaded script illustrated in FIG. 8 to update the structures and tables illustrated in FIGS. 11, 12, and 13. Block 901 determines whether the new script is already present in memory 108. If the script is present, the old script is deactivated and deleted before block 904 is executed. The latter block adds a new structure into the SCRIPTS table to make room for the new script. Blocks 906 and 908 update the literal and variable tables such as literal table 2204, local variable table 2201, and global variable table 2202, respectively. Block 910 performs the necessary initialization with respect to a triples table such as 2204. Decision block 911 determines whether the existing script had been active when the new script was downloaded, and if it was, the new script is activated by passing control to block 912.

The data structures utilized by feature control process 1000 in identifying which triple is to be executed in response to a given signal are illustrated in FIGS. 11, 12, and 13. The latter figures illustrate a detailed implementation of the logical signal tables represented in FIGS. 6 and 7.

When the finite state machine, FSM 1005 illustrated in FIG. 10, receives a signal from one of the processes 1001 through 1004, FSM 1005 first utilizes the current state index stored in location 1101 and the state pointer stored in 1102 to determine a location in state table 1104 via path 1103. The value stored at a location in state table 1104 is a pointer that indirectly points to a location in FSMSignal table 1110 via path 1105, FSMSignalPTR location 1107, and path 1108. State table 1104 contains one indirect pointer for each of the possible customer units' states. Similarly, there is one FSMSignalPTR pointer in 1106 through 1107 and 1120 for each of the possible states. Each of the FSMSignal tables 1109 through 1110 and 1121 is associated with one of the possible states. Each entry in an FSMSignal table is associated with an event definition for a signal that can occur in the state associated with that table. For example, once FSM 1005 indexes to FSMSignal table 1110, FSM 1005 then utilizes the signal number that identifies the signal being processed to index to the correct location within the latter table. The location indexed to in FSMSignal table 1110 points indirectly to ProgramID table 1116 via path 1111, triple list 1113, and path 1114. Triple lists such as 1113 are also referred to as FSMSignal locations. For each of the possible signals which any of the states represented by FSMSignal tables 1109 through 1110 and 1121 can respond, there exists for each signal an FSMSignal location 1112 through 1113.

ProgramID. table 1116 is also illustrated in FIG. 12. A ProgramID table such as 1116 contains references to all of the triples that can respond to the signal that FSM 1005 is presently processing and contains references to all the triples contained in the corresponding logical table of FIGS. 6 and 7.

In order for FSM 1005 to fully process the signal, it is necessary to execute each triple associated with an entry in a table such as ProgramID table 1116 or until the STOP primitive is executed by one of the triples. In order to process all the triples represented by the entries in table 1116, FSM 1005 maintains a current index variable and starts to process these entries with the most recently activated triple. Each entry in table 1116 consists of an index into a script table, such as 1201, and an index into a triple table such as 1208. Script table 1201 is pointed to via path 1202 which is an index from the bottom of table 1201 pointed to by the SCRIPTS variable. The identified location in script table 1201 points to script list 1206 via path 1203.

Figure 14:
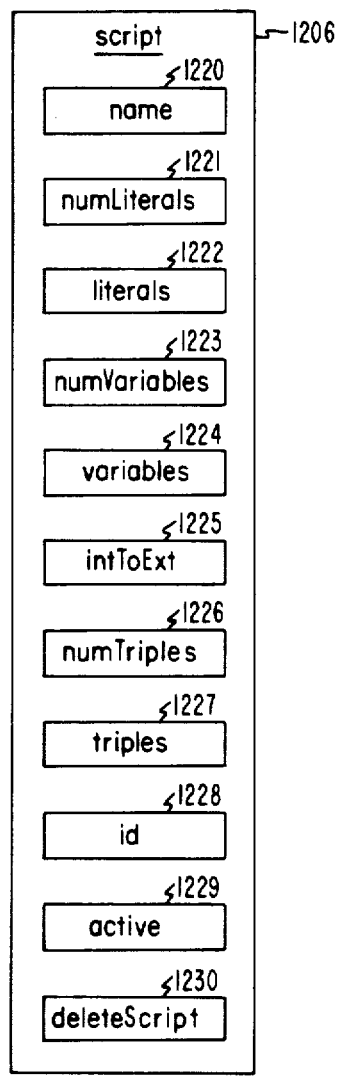
FIG. 14 illustrates block 1206 of FIG. 12 in greater detail.

Before starting to process the information identified in script list 1206, FSM 1005 stores the pointer identified in script table 1201 in the CURRENTSCRIPT variable. Script lists 1205 through 1207 contain all the information concerning the triples for a particular script that is common to the triples for that script. Within script list 1206, as illustrated in FIG. 14, the memory location designated as name 1220 contains the name of the script. The location designated as numLiterals 1221 contains the number of distinct literals that are used by all the triples in this script. The area designated as literals 1222 comprises two segments. The first segment is a table of pointers that are indexed by the literal ID field of a literal argument instruction which designates the actual literal string contained in the second segment of area 1222. This second segment comprises the literal strings. The area designated numVariables 1223 contains the number of distinct variables used by all the triples in the script. The area designated variables 1224 comprises the variable names as string variables that are indexed to by the ID field of a variable argument instruction. Variables 1224 is used during the initial downloading of the system. Area intToExt 1225 is a table of pointers that is indexed by the variable ID field of a variable argument instruction of triple and contains indexes to a global table of variable values. The area designated numTriples 1226 defines the total number of triples contained in triple array 1208 pointed to by variable 1227. Variable id 1228 is used to store the index used to index into script array 1201. The variable 1229 designates whether the script is currently active or not. Finally, the variable designated deleteScript 1230 is used when a script is to be totally removed from memory.

Triples 1227 in script list 1206 of FIG. 12 or FIG. 14 contains a pointer to triple table 1208. The latter table contains pointers which indirectly point to the compiled code for the triples of the script. Triple table 1208 is indexed into using the triple field from ProgramID table 1116 via path 1204. The location indexed by path 1204 into triple table 1208 points to triple 1210 that comprises a series of memory locations that, in turn, point to various pieces of information within the actual coded implementation of the triple. There is one coded implementation of a triple for each entry in triple table 1208 and a corresponding triple such as triples 1209 through 1211.

Once the compiled triple code pointed to by triple 1210 has been executed, interpreter 1006 illustrated in FIG. 10 once again returns control to FSM 1005. The latter indexes to the next location in ProgramID table 1116, indexes through a path similar to what was previously described, until the new code for the next triple is identified by one of the triples 1209 through 1211, and then, FSM 1005 once again passes control to interpreter 1006. This process continues until all of the triples in ProgramID table 1116 have been executed or until one of the triples executes a STOP primitive.

The compiled code format of a triple is illustrated in FIG. 15 and is encoded using numerical codes (ASCII). Location 1500 defines the number of bytes in the compiled code. The number of states specified in the state definition of the triple (i.e., the number of states to which the triple applies) is stored in location 1501 and the numerical IDs of these states are located in location 1503. Similarly, the ID of the named event is stored in location 1504. There is one compiled triple for each event specified in event definition of the source code triple. The information stored in 1501 through 1504 is utilized during the activation of a script. The instruction portion or action of the compiled code is contained in locations 1505 and 1506. Area 1505 normally comprises two distinct portions. If there are no event parameters specified in the event definition, then there is just the second portion as described in the following material.

The first portion of area 1505 is utilized to recover values that are being passed into the compiled triple code by the signal occurrence and to make the determination whether or not the event definition of the triple has been fully satisfied and thus whether or not the subsequent portion should be executed. The second portion of area 1505 contains primitives and instructions. Location 1506 contains the HALT primitive which causes interpreter 1006 to return control to FSM 1005 if a STOP or CONTINUE has not been encountered previously in the execution of area 1505. The primitives are subroutine calls to C++ functions to perform the actions indicated.

Figure 17:
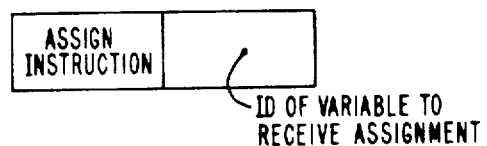
Figure 18:
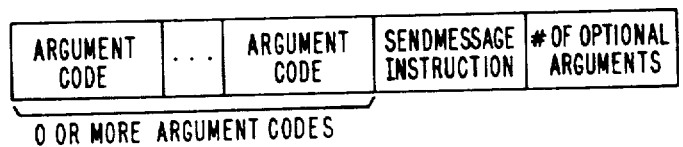

The general sequence of the codes in area 1505 consists of argument codes followed by instruction codes or a primitive call that use the preceding arguments. The exception to this normal flow of arguments and instructions and primitives is illustrated in FIGS. 17 and 18. FIG. 17 illustrates the assignment instruction where the instruction comes first followed by the internal identification code of the variable to receive the assignment. FIG. 18 illustrates the SENDMESSAGE instruction which can have an optional number of parameters to be transmitted indicated in the second field of the instruction.

Figure 19:
Figure 20:
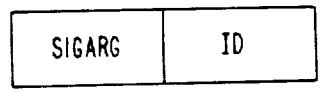

In general, the argument codes fall into the classes of literals, variables, branch-to-address arguments, or signal arguments. FIGS. 19 and 20 illustrate the format of these instructions for the literal or variable and the signal argument, respectively. When one of these arguments is encountered by interpreter 1006, it takes the following internal identification code, labeled as ID, obtains a pointer to the actual value using the ID as an index into a table, and pushes this pointer onto the interpreter stack. When the instruction or primitive using that argument is executed, it pops the stack to obtain the pointer and utilizes this pointer to pass the actual value.

Signals are tested and associated values are recovered in the following manner. The event parameters of a triple can transfer information into the compiled triple at the time the triple is executed. This information can consist of a retrieved value for a variable or can consist of a plurality of values, e.g., "input" event. FSM 1005 stores any values that must be passed into the event parameter code in the SIGNAL_ARG array. The first instructions of the compiled code for a triple retrieve these values. For an event definition such as "origin ($SOURCE)", the value recovery code simply accesses the first location of the SIGNAL_ARG array and obtains the value stored there and sets the $SOURCE variable equal to the retrieved value. In the case of an event such as "input", it is necessary to recover the first input string that was received from the terminal and then to compare this string against the data stored from the compiled triple in a literal table to determine whether or not the input event is exactly matched as it is defined in the triple. If the input event literal information does not match that which has been stored from the compiled triple, then control is returned to FSM 1005 for execution of the next triple. If the first input string that was received from the terminal matches the first argument of the input event definition, then the remainder of the code of the triple is executed. The rcvmessage, reply, and time events function in a similar manner to that of the input event. In addition, the input, rcvmessage, and reply events also can have a variable number of variable arguments whose values must be obtained from the SIGNAL_ARG array by positional correspondence at the time the triple is executed and stored in the proper variable locations. After the values have been recovered, the remainder of the triple code is executed.

Figure 21:
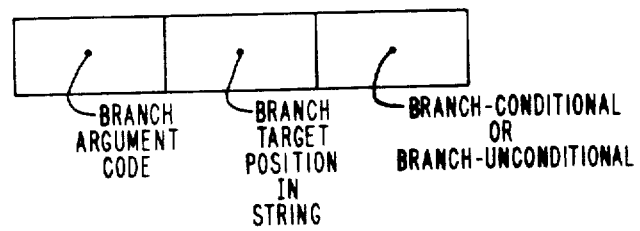

The format of a branch instruction is illustrated in FIG. 21. In the case of a conditional branch, the interpreter pops from the stack the test value which determines a branch or no branch. Tables I, II, and III give the decimal numerical codes for the event, state, and instruction codes, respectively.

TABLE I

| Event | Code |
|---|---|
| origin | 0 |
| disconnect | 1 |
| off-hook | 2 |
| on hook | 3 |
| digits | 4 |
| ringing | 5 |
| answer | 6 |
| busy | 7 |
| query | 8 |
| idle | 9 |
| notidle | 10 |
| rcvmessage | 11 |
| input | 12 |
| reply | 13 |
| alarm | 14 |
| time | 15 |
| activate | 16 |
| deactivate | 17 |
| enter | 18 |
| leave | 19 |

TABLE II

| State | Code |
|---|---|
| idle | 0 |
| ringing | 1 |
| talking | 2 |
| disconnect | 3 |
| dialing | 4 |
| busy | 5 |
| audible | 6 |
| outpulsing | 7 |

TABLE III

| Instruction | Code | Primitives | Mnemonic | Code |
|---|---|---|---|---|
| HLT | 0 | ALARM | ALM | 21 |
| BRU | 1 | CANCEL | CAN | 22 |
| BRC | 2 | APPLY | APP | 23 |
| LAR | 3 | REMOVE | RMV | 24 |
| VAR | 4 | SEND | SND | 25 |

TABLE III-continued

| Instruction | Code | Primitives | Mnemonic | Code |
|---|---|---|---|---|
| SAR | 5 | SENDMESSAGE | SNM | 26 |
| BAR | 6 | PRINT | PRI | 27 |
| EQL | 7 | DIAL | DIA | 28 |
| NEQ | 8 | FORWARD | FWD | 29 |
| GRT | 9 | ASK | ASK | 30 |
| LSS | 10 | ACTIVATE | ACT | 31 |
| GEQ | 11 | DEACTIVATE | DEA | 32 |
| LEQ | 12 | ASSIGN | ASN | 33 |
| ADD | 13 | ENGAGE | ENG | 34 |
| SUB | 14 | DISENGAGE | DIS | 35 |
| MUL | 15 | NEXTSTATE | NXT | 36 |
| DIV | 16 | PURGE | PRG | 37 |
| NEG | 17 | CONTINUE | CON | 38 |
| AND | 18 | STOP | STP | 39 |
| ORR | 19 | | | |
| NOT | 20 | | | |

Figure 22:
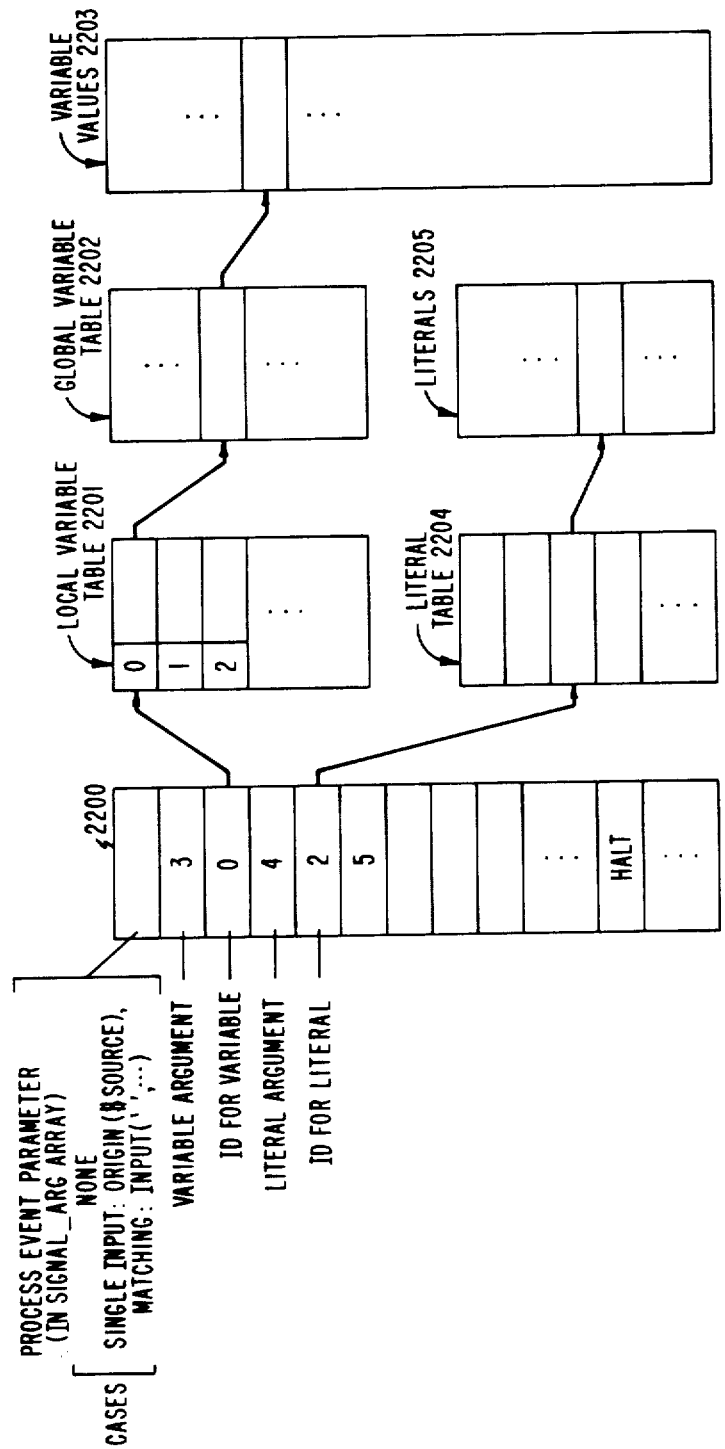
FIG. 22 illustrates in greater detail, the accessing of variable and literal values from their associated tables on the basis of information contained in a compiled triple such as the one illustrated in FIG. 15.

FIG. 22 illustrates the manner in which the literal and variable codes of a triple are utilized to gain access to the variable and literal information, respectively. The local variable table 2201, literal table 2204 also called literal 1225 in FIG. 14, and list of literals 2205 are maintained in the associated script list, such as script list 1206 of FIG. 14. List of literals 2205 is part of the compiled script. In the case of a variable, the variable code is utilized to access the local variable table 2201 also called intToExt table, such as 1225, in FIG. 14 from which an index is obtained into the global variable table 2202. The global variable table 2202 is common to all scripts within a given customer unit. From global variable table 2202, a pointer is obtained to the variable values 2203 which contains the actual character string value of the variable. Similarly, the literal code is utilized to access literal table 2204 (1222) from which a pointer is obtained to literal value 2205. All literals and variables in their associated lists are terminated with a null character to designate the end of each respective item of information.

During the downloading phase of the system operation, code within the prompt-user process 1003 is responsive to data being received from the computer 101 to be stored in the tables illustrated in FIGS. 11, 12 and 13.

Figure 23:
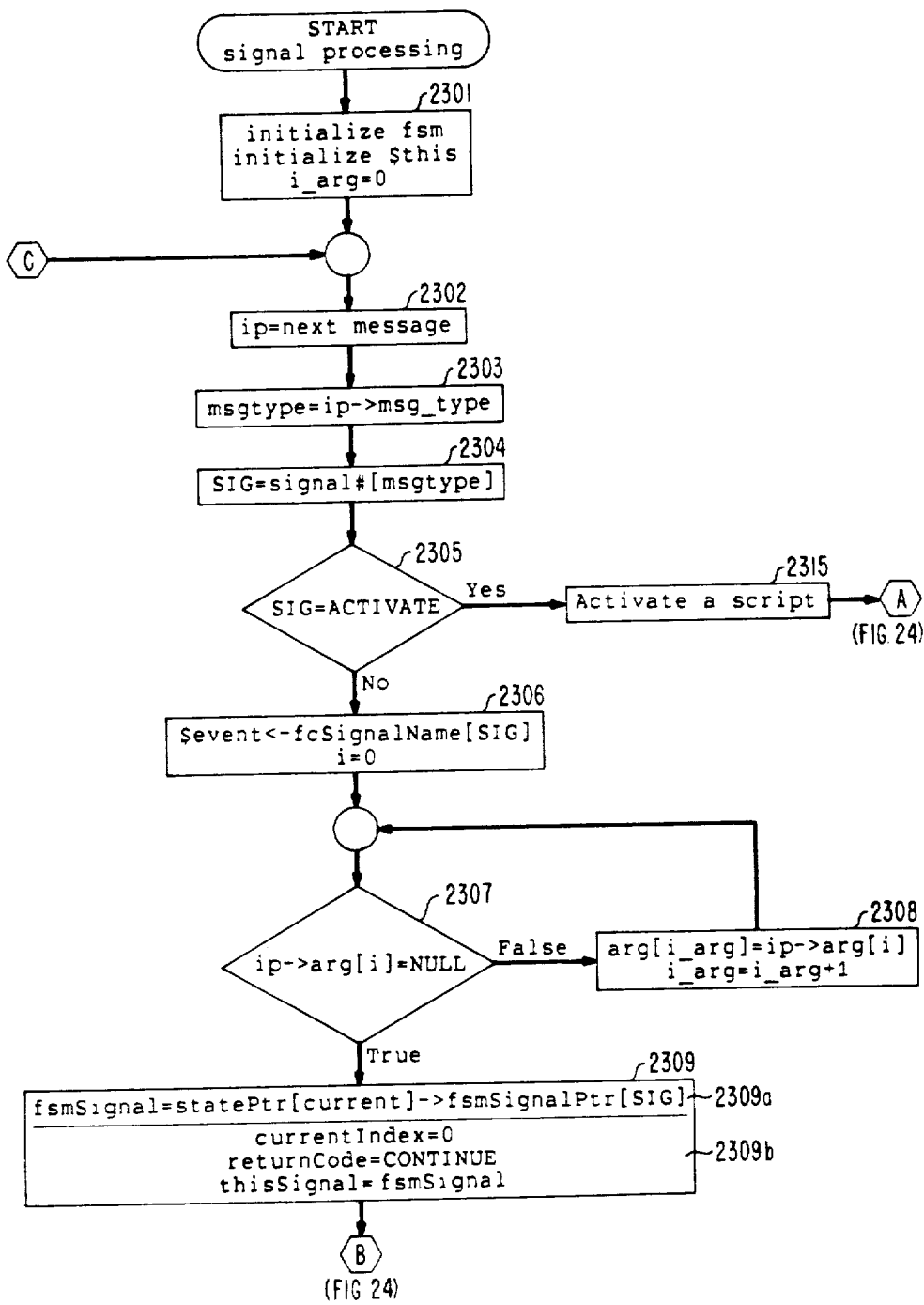
FIGS. 23 and 24 illustrate in flowchart form, FSM 1005 process of FIG. 10.
Figure 24:
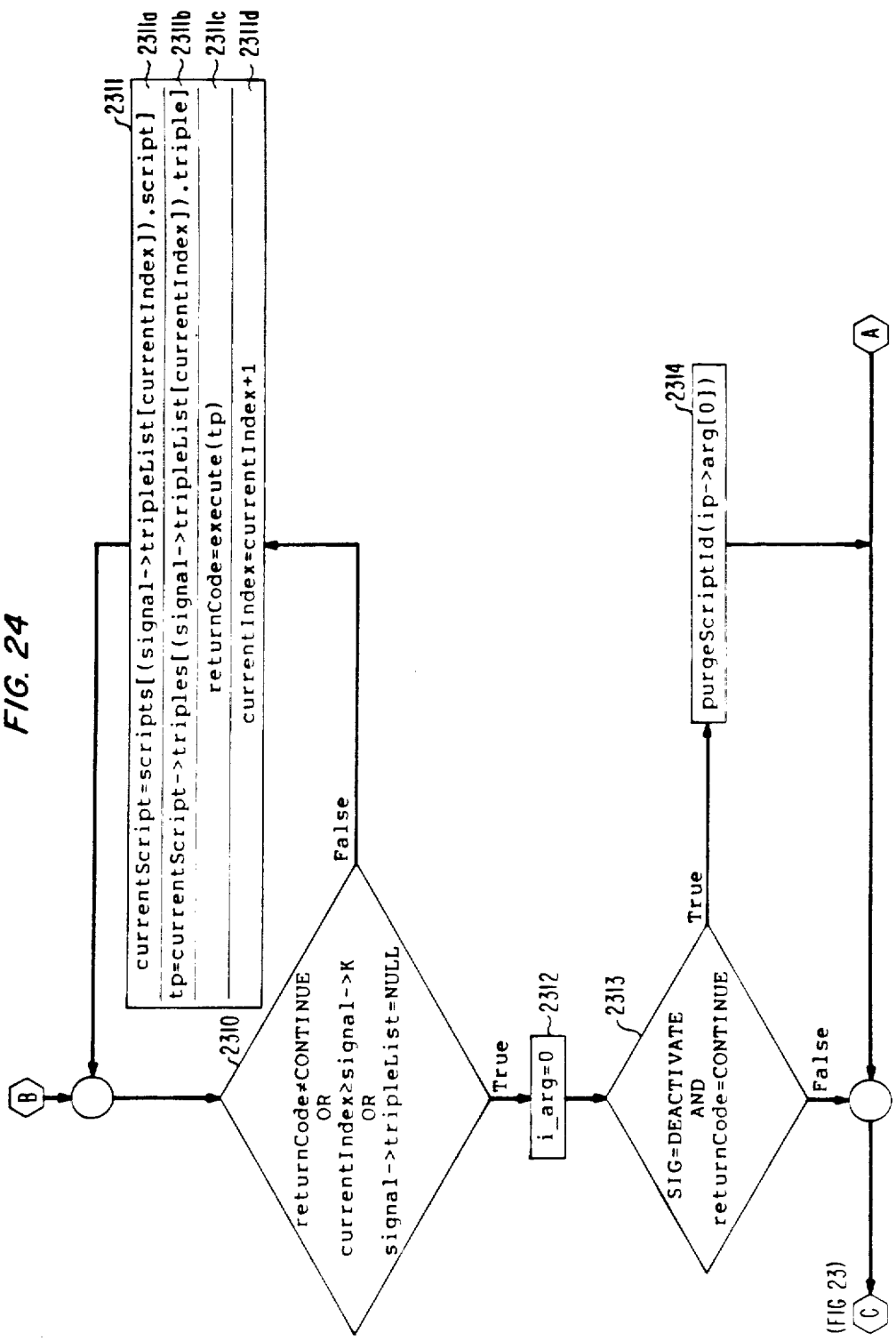

FIGS. 23 and 24 illustrate in flowchart form, a program for implementing FSM 1005. FIGS. 23 and 24 detail the logical flow of the program listed in Appendix F. The program listed in Appendix F is written in C++ which is described in detail in the book entitled, *The C++ Programming Language*, by B. Stroustrup. Once the program illustrated in FIGS. 23, and 24 has been initialized by block 2301, it repetitively executes blocks 2302 through 2315. Blocks 2313 and 2314 perform the deactivation of a script (i.e., the modification of tables and pointers in FIGS. 11, 12, and 13) when a deactivate signal is received, and block 2315 performs the activation of a script when an activate signal is received. Block 2301 first initializes certain variables internal to FSM 1005. The $THIS variable is set equal to the calling number of the customer unit and the i_arg variable is set equal to an index into a table of pointers that identify the parameters being passed with different operating system messages. The parameters comprise any string information associated with the signal.

When a message is received by FSM 1005, the ip pointer is set equal to the location of the next message to be processed from the operating system. As is well known in the art, the operating system can have a plurality of messages awaiting processing by FSM 1005 at any point in time and invokes the execution of FSM 1005 as long as there are messages to be processed. Block 2303 sets the MSGTYPE variable equal to the message type within the message by utilizing the ip pointer to point to the message type stored in the area designated by the operating system. Block 2304 utilizes the MSGTYPE index to index into the signal "#" table that contains numerical identification for each signal type. These decimal values are defined in Table IV. Once the numerical code for the signal has been determined in block 2304, decision block 2305 determines whether or not the signal is the activate signal or not. If the signal is the activate signal, then block 2315 is executed. The details of block 2315 are given with respect to FIGS. 29, 30, and 31.

TABLE IV

| Signal | Code |
|---|---|
| origin | 0 |
| disconnect | 1 |
| off-hook | 2 |
| on-hook | 3 |
| digits | 4 |
| ringing | 5 |
| answer | 6 |
| busy | 7 |
| query | 8 |
| idle | 9 |
| notidle | 10 |
| rcvmessage | 11 |
| input | 12 |
| reply | 13 |
| alarm | 14 |
| time | 15 |
| activate | 16 |
| deactivate | 17 |
| enter | 18 |
| leave | 19 |

Block 2306 is utilized to access into the table FCSIGNALNAME with the SIG variable in order to identify the event corresponding to the present signal being processed and to store the name string for the event in the $EVENT variable. Blocks 2307 and 2308 access the parameters of the operating system message and store these parameters in an array called ARG.

Block 2309a implements the paths shown in FIGS. 11 and 12 to determine which FSMSIGNAL structure to utilize such as FSMSIGNAL 1113. The latter block implements the logical paths from variables 1101 and 1102 through state table 1104, an FSMSIGNALPTR variable, such as in 1107, and FSMSIGNAL table, such as 1110. Block 2309b sets the current index to zero. The current index is used to index into a ProgramID table such as 1116. In addition, block 2309b sets the return code equal to CONTINUE. During the interpretation of the compiled code, the code for a given triple may change the return code to a STOP. In addition, block 2309a sets the THISSIGNAL variable equal to the SIGNAL variable.

Once the entry in an FSMSIGNAL structure, such as 1113, has been accessed, this entry points to a ProgramID table via a triple list, such as in 1113. Blocks 2310 and 2311 then proceed to execute the compiled code for all of the triples identified in the designated ProgramID table. The designated ProgramID contains pointers which identify for the current state of the customer unit all of the triples that can respond to the signal presently being processed.

Block 2311a is utilized to identify a script structure such as 1206 of FIG. 12 via the script portion of an entry in the ProgramID table 1116 via a script table such as 1201. The entry in the script table identified as illustrated by path 1202 determines the script containing the triple presently being processed. The identified entry in the script table is stored in the CURRENTSCRIPT variable. Block 2311b then identifies the compiled triple code 1210 to be executed via illustratively the path shown on FIGS. 12 and 13 of path 1212, path 1204, triple table 1208, and path 1215. The variable TP is set equal to the identified triple such as 1210. Block 2311c then causes the execution of the function "EXECUTE" which actuates interpreter 1006 illustrated in greater detail in FIGS. 34, 35, 36, and 37. Block 2311c passes to the interpreter the TP variable which points via the triple 1210 to the compiled triple code to be executed. The interpreter returns the value of the returned code which is either a STOP or CONTINUE. Block 2311d then increments the current index so that compiled code for the next triple in the designated ProgramID table 1116 can be executed.

After block 2311 has been executed, decision block 2310 passes control to block 2312 if any of the following conditions are true. First, is the return code equal to STOP. If the return code is equal to a CONTINUE, then block 2311 is reexecuted. However, if the return code is equal to a STOP, then the processing of the current signal ceases and block 2312 is executed. The second condition that is checked is whether the current index is greater than the number of entries in the designated ProgramID table 1116. The final condition checked is whether or not the triple just interpreted by block 2311c had executed the PURGESCRIPTID routine. Execution of the latter routine would not only have removed the executing triple from the ProgramID table, but possibly other unexecuted triples in the same script. In addition, this final condition is met if initially there are no triples that can respond to the current signal in the current state. If the removal of the unexecuted triples resulted in no other triples left in the designated ProgramID table, then the ProgramID table 1116 is removed and the triple list pointer of 1113 is set to NULL. If any of the three previous conditions are met, block 2312 is then executed setting the initial conditions for indexing into the ARG table to the correct value for subsequent execution by block 2308.

Blocks 2313 and 2314 detail the handling of a deactivate signal. The deactivate signal can have a corresponding deactivate event within the script to be deactivated, and a script, by utilizing a deactivate event, can postpone the physical deactivation or purging of the script to a later point in time. This capability is given to scripts whose work cannot be arbitrarily terminated but must go to completion. Such a script is illustrated in FIGS. 8 and 9. A script defers its deactivation to a later point in time by executing a STOP primitive within the script's triple that responds to the deactivate signal. Decision block 2313 detects execution of the STOP primitive and does not execute block 2314 which performs the purging of the script. Block 2314 performs the purging of a script by removing references to all triples contained within the script in all ProgramID tables.

Figure 25:
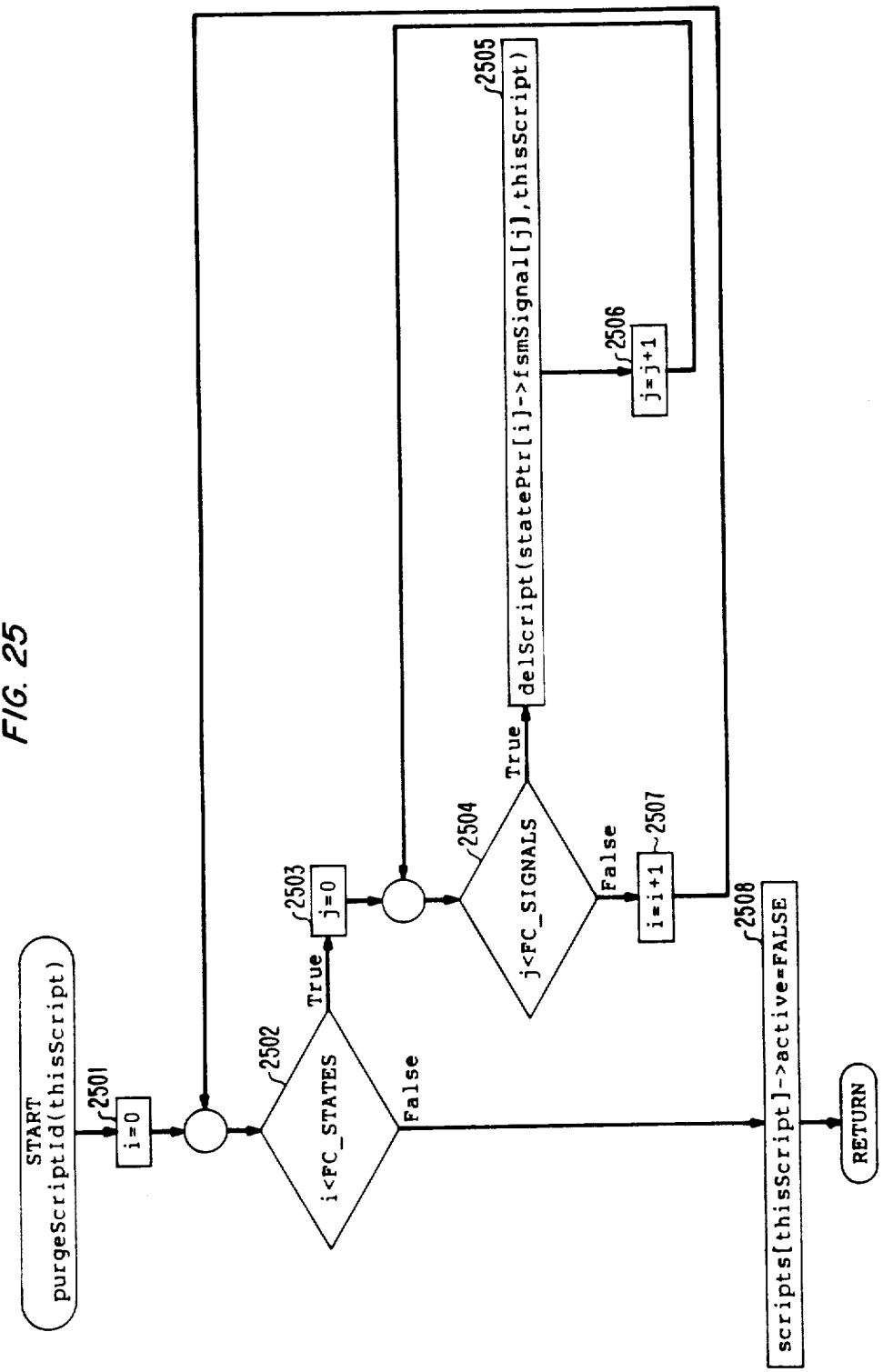
FIG. 25 illustrates in flowchart form, block 2314 of FIG 24.

Block 2314 of FIG. 24 is shown in greater detail in FIG. 25. The PURGESCRIPTID procedure functions by cycling through each state and each signal within that state to remove all of the triples associated with the script being deleted from the ProgramID table corresponding to that signal for that state. It utilizes the DELSCRIPT function referenced in block 2505 to remove these triples. The variables i and j are used to index into the states and signals, respectively. Initially, i is set equal to zero by block 2501. All of the states are then checked to see if there are any triples associated with the script being deleted as designated by the contents of the THISSCRIPT argument or parameter. Decision block 2502 determines when all states have been checked by comparing i to the total number of states as contained in the variable FC_STATES. As long as i is less than the total number of states, blocks 2503 through 2507 are executed. For each iteration through blocks 2503 through 2507, block 2503 sets the j variable equal to zero. Decision block 2504 controls the execution of the DELSCRIPT function until all the signals have been deleted.

The DELSCRIPT function is passed a pointer identifying the ProgramID table from which it is to delete all triples associated with the script being deactivated. Then DELSCRIPT function then cycles through all of the entries of the designated ProgramID array eliminating the triples associated with the script being deactivated. The i variable is stepping through the state table 1104 of FIG. 11. For each entry in table 1104, an FSM signal table, such as 1110 is identified. The j variable then steps through each entry in the identified FSM signal table with each entry identifying a ProgramID table via a triple list/FSM signal variable such as 1113.

Figure 26:
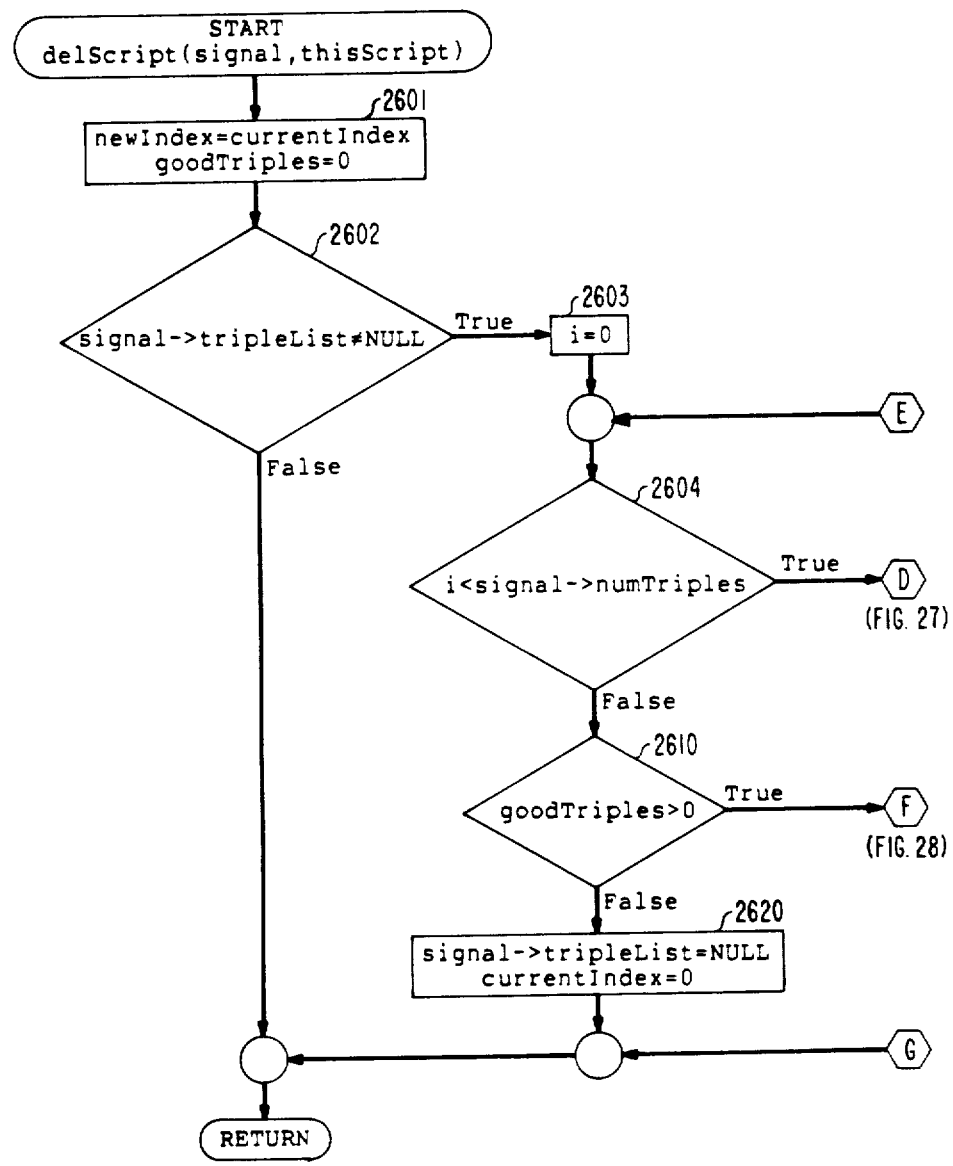
FIGS. 26, 27, and 28 illustrate in greater detail, block 2505 of FIG. 25.
Figure 27:
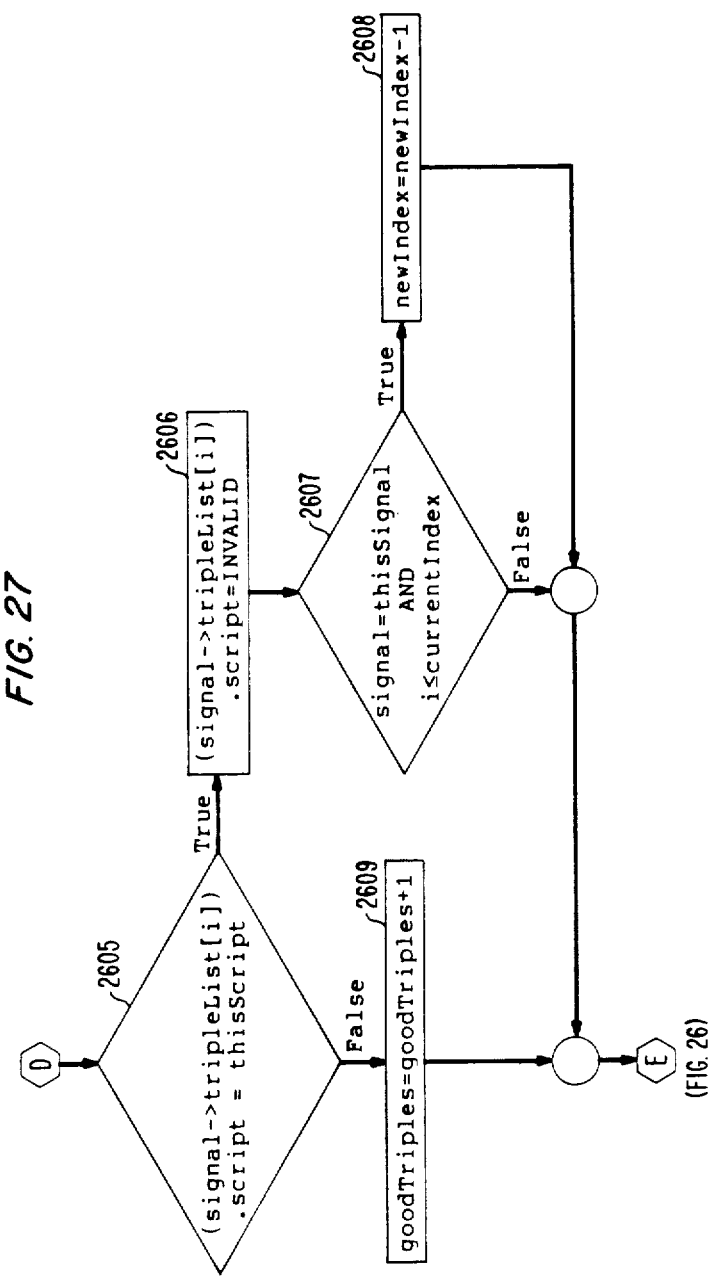
Figure 28:
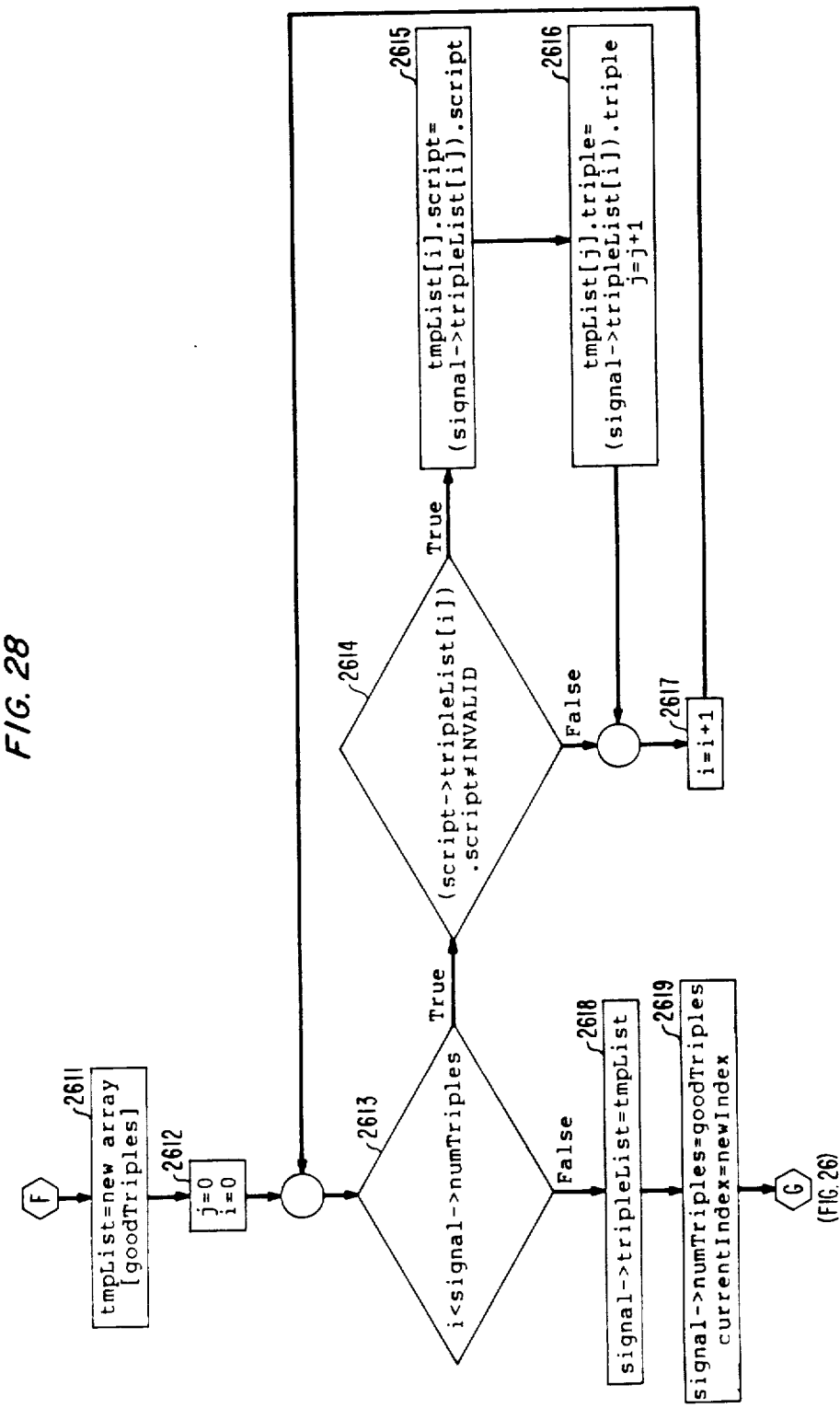

The DELSCRIPT function of block 2505 of FIG. 25 is illustrated in greater detail in flowchart form in FIGS. 26, 27, and 28. The triples associated with a script are deleted in two stages. The first stage is for blocks 2604 through 2609 to determine the new number of triples identified in the ProgramID array 1116 which is stored in GOODTRIPLES and the new value for the current index variable which is stored in NEWINDEX. The actual removal of the triples associated with the present script and signal is performed by blocks 2611 through 2619. The procedure is to create a temporary ProgramID table, transfer all of the triples to be saved from the old table and then make the temporary table the new ProgramID and identify it in a TRIPLELIST variable, such as in 1113.

Upon execution of block 2601, the NEWINDEX variable is set equal to the CURRENTINDEX variable. The CURRENTINDEX variable is equal to the index of the triple presently being processed in blocks 2310 through 2311 of FIG. 24. The variable GOODTRIPLES is initialized to zero. Since blocks 2503 through 2507 of FIG. 25 assume that every signal has a corresponding ProgramID table in each state, it is necessary to verify whether or not the particular signal being processed, indeed, does have a corresponding ProgramID table for a particular state. This determination is performed by decision block 2602. As illustrated in FIG. 11, an FSMSIGNAL table has pointers to a series of triple lists 1112 through 1113. There is one entry for every possible signal in each FSMSIGNAL table and there is a corresponding FSMSIGNAL structure/triple list for each entry. If there is not a triple responsive to a particular signal for a given state, the triple list for that signal contains a null value. If the triple list identified by a particular entry in the present FSMSIGNAL table that the PURGESCRIPTID function is processing contains a null value, then decision block 2602 returns control to the PURGESCRIPT function. If the triple list does not contain a null value, this means that the signal has a set of corresponding triples in this state and control is transferred to block 2603.

Consider now, the details of how the determination is made of the number of valid triples that is stored in variable GOODTRIPLES. Decision block 2604 determines whether or not the number of triples identified in the present ProgramID is greater than the maximum number. The maximum number of triples in a ProgramID is stored in location k such as in 1116, as illustrated in FIG. 12. If i is less than the maximum number of triples, then decision block 2605 is executed to determine whether the entry in the ProgramID block is related to the script that is being deleted. If the script index is different than the script presently being processed, which is identified by an entry in the THISSCRIPT variable, block 2609 is executed which increments the GOODTRIPLES variable by one. If the script for the triple entry presently being pointed to by i matches the THISSCRIPT variable, then block 2606 is executed which marks the entry in the ProgramID table pointed to by the i variable as invalid for later processing by blocks 2611 through 2619.

Control is then passed to decision block 2607. The latter decision block determines whether or not the triple that is to be removed is referenced lower in the ProgramID table then the current triple which is being executed and which had actually activated the DELSCRIPT function. If the ProgramID table presently being processed is that of the triple that caused the DELSCRIPT function to be executed and i is less than the current index which points to the triple being executed, then block 2608 is executed which causes the NEWINDEX variable to be decremented by one. This is done since the NEWINDEX variable was set equal to the CURRENTINDEX variable in block 2601. The contents of the NEWINDEX variable are used in block 2619 to adjust the CURRENTINDEX variable so that execution can continue from the ProgramID table after the present triple has finished being interpreted.

Once all the entries in the ProgramID table have been checked for triples that are to be retained, decision block 2610 is executed to determine if there are any triples left or if all triples in the ProgramID array were associated with the script that is being purged. If the latter condition is true, block 2620 is executed and the triple list is set equal to null value indicating that, for this particular state, there are no triples responsive to this particular signal. Then, the CURRENTINDEX is set equal to zero also so that no attempt is made later to execute another triple from this ProgramID table when control is returned to the FSM 1005.

If there are triples that were not associated with the script being purged, then blocks 2611 through 2619 of FIG. 28 are executed. Block 2611 sets a pointer TMPLIST equal to a new table having its number of entries equal to the number contained in the GOODTRIPLES variable. Blocks 2613 through 2617 then index through the ProgramID table looking for the entries that are not marked invalid. Any entry that is not marked invalid is transferred to the new array table by blocks 2615 and 2616 which insert the script and triple identifications, respectively. After all of the entries in the ProgramID have been checked, control is transferred to 2618 which sets the triple list pointer from the FSMSIGNAL table equal to the TMPLIST variable. This has the effect of making the new array table into the ProgramID table that is pointed to by the designated FSMSIGNAL table, such as 1113. Block 2619 then sets the number of triples as stored in the ProgramID table in the k location equal to the number contained in the GOODTRIPLES variable. And sets the CURRENTINDEX equal to the NEWINDEX variable.

Figure 29:
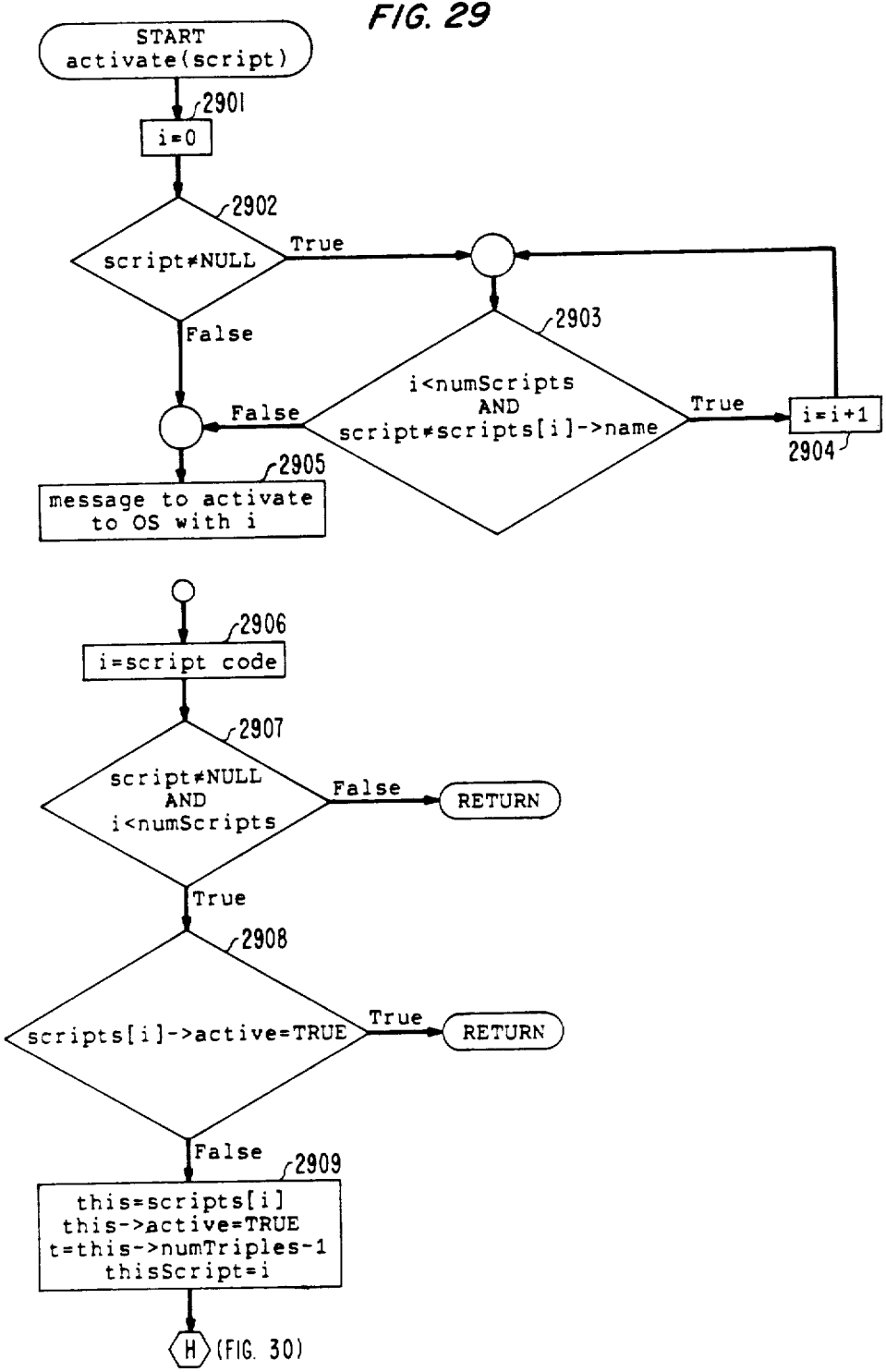
FIGS. 29, 30, and 31 illustrate in greater detail, the activation of a program script by giving additional details of block 2315 of FIG. 23.
Figure 30:
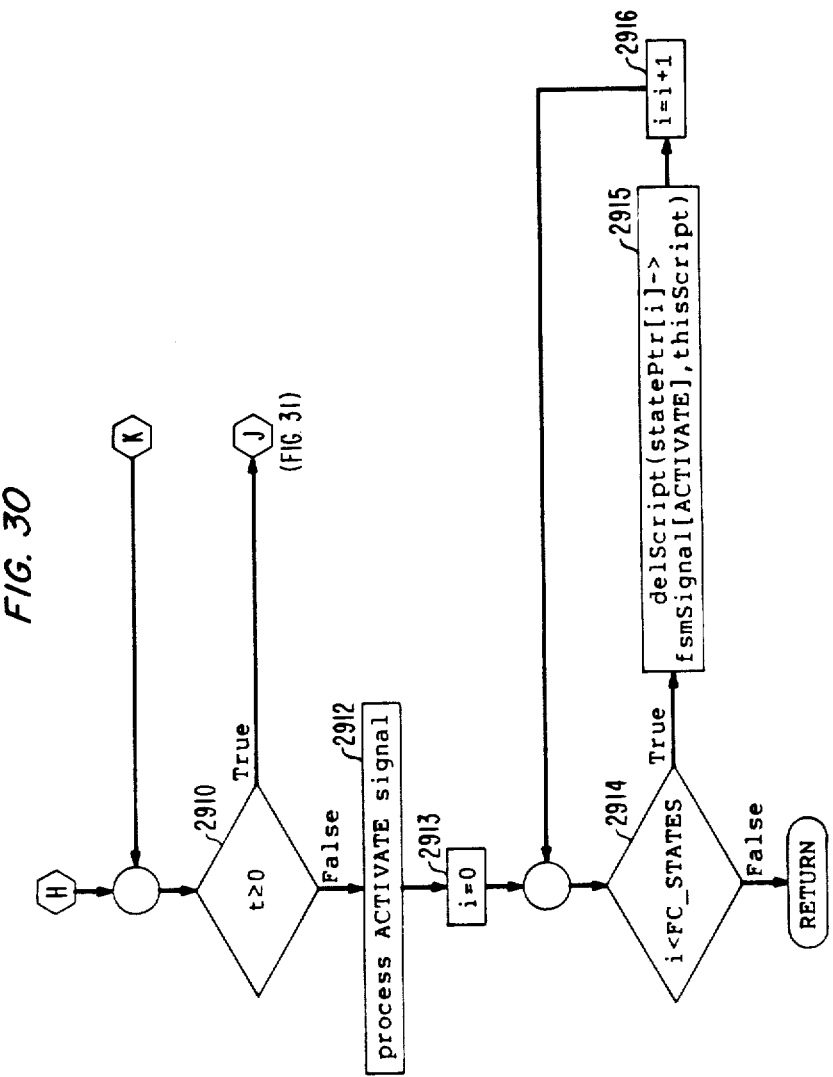
Figure 31:
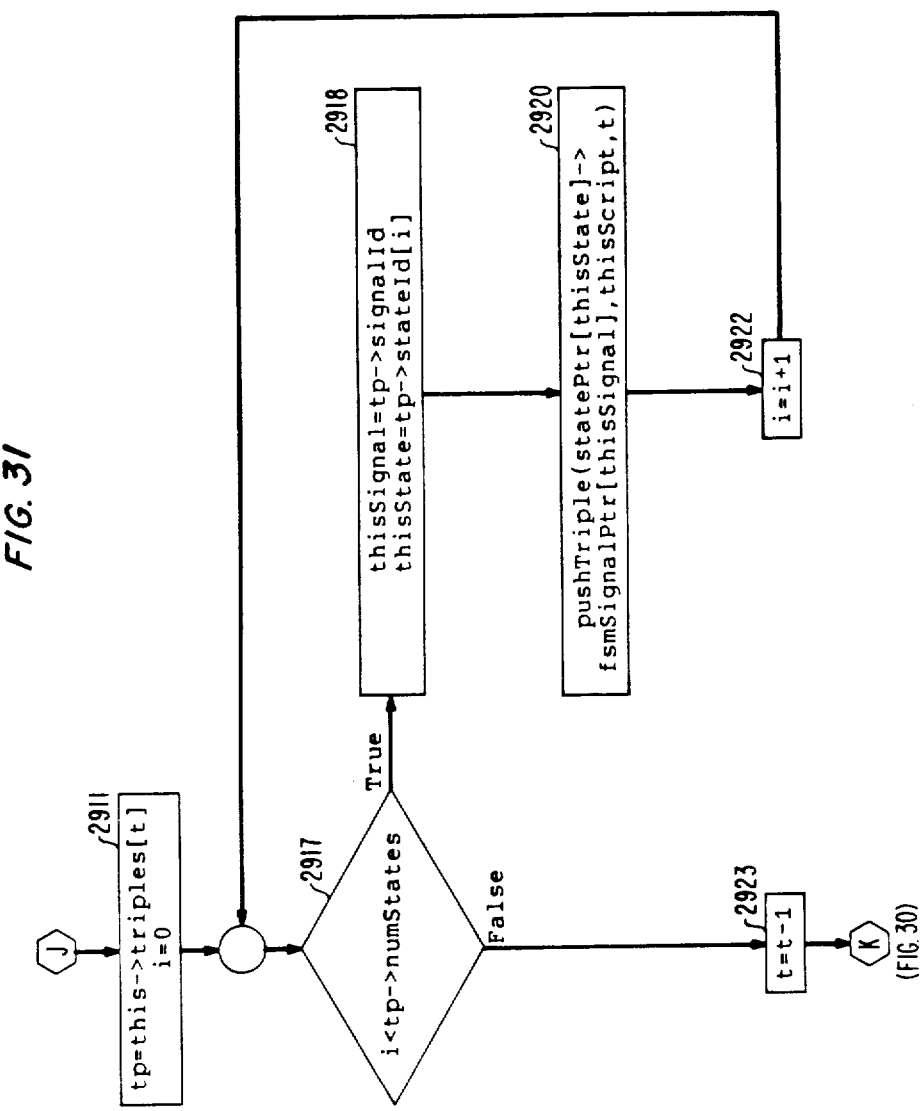

The operations performed by FSM 1005 in response to an activate signal as defined by block 2315 of FIG. 23 is illustrated in greater detail blocks 2906 through 2911 and blocks 2917 through 2923 of FIGS. 29, 30, and 31. Blocks 2901 through 2905 illustrate the details of the ACTIVATE primitive. The purpose of blocks 2901 through 2905 is to determine the numerical code for the script that is to be activated and then to send an operating system message containing this numerical code as a parameter to process control 1000. When process control 1000 receives this message, it invokes FSM 1005.

After FSM 1005 has been invoked and determines that the signal is the activate signal, control is transferred from decision block 2305 to block 2906. The latter block initializes i to the script code by obtaining the latter from the list of parameters in the message passed by the operating system. Decision block 2907 determines that the script code is valid; and, if it is, turns over control to decision block 2908. The latter decision blocks determine whether the present script has already been marked as active in the script structure or location such as 1206 by first obtaining a pointer from script table 1201 through utilizing the variable i as an index into the latter table. Block 2908 then checks the value of the ACTIVE variable 1229 of 1206. If the present script is marked inactive, then block 2909 is executed.

The purpose of the code 2909 through 2911 and blocks 2917 through 2923 is to insert into the ProgramID tables references to the triples of the script being activated. These references are only inserted into ProgramID tables that correspond to the state and the signal as designated in the state definition and event definition of each triple of the script being activated. As can be seen in FIG. 12, the address of the script table 1201 is known and the relationship of the scripts by numerical code can be used to index into table 1201. The information in the latter table is utilized in order to identify the triples of a script by processing, as an example, along path 1203, script 1206, paths 1212 and 1204, triple table 1208, path 1215, and triple 1210. Once the triple is identified, then the code shown in block 2918 can utilize the coded state and signal information within the compiled triple code itself to determine what ProgramID tables must receive a reference to the triple.

In block 2909, the THIS pointer is set equal to the contents of the script table 1201 indexed by the variable i and is then used to point into the variables for the script 1206. The THIS pointer is also used to set the ACTIVE variable, such as 1229, to TRUE. The variable t is set equal to one less than the number contained in the NUMTRIPLES variable stored in the script list. The THISSCRIPT variable is set equal to the contents of the variable i. The reason for setting t in this manner is that the first triple of a script has to have the highest priority, hence, it has to be the last triple pushed onto any particular ProgramID table.

Pointer TP points to a triple, such as 1210. As illustrated in FIG. 13, the triple contains pointers that identify the number of states and the signal that the triple associated with the triple list has in its state and event definitions. This information is used by decision blocks 2917 and 2919 and in block 2918, to determine how many states are present in the compiled code. The program illustrated in blocks 2917 through 2923 takes the compiled code for each triple and inserts references to that code by the utilization of the PUSHTRIPLE function of block 2920 into the ProgramID tables indicated by the coded states and the signal of the compiled triple itself. The variable i is used to index into the states identified in triple's state definition. Further details of this process are given with respect to FIGS. 32 and 33 which illustrates the PUSHTRIPLE function.

After all of the states have been processed for a given compiled triple, block 2923 is executed and t is decremented by one, and execution is passed to blocks 2910 and 2911. This process results in the triple table, such as 1208, being sequentially indexed through and the compiled triples indirectly pointed to by the locations of the triple table being properly identified in the required ProgramID tables. Once all of the entries in the triple table have been processed, decision block 2910 passes control to block 2912. Block 2912 executes code similar to that illustrated by blocks 2306 through 2314 of FIGS. 23 and 24. This allows the activate signal to be processed by any triples of the recently activated script which contain the activate event.

After the activate signal has been processed, i is reinitialized to zero and blocks 2914 through 2916 remove all references to triples whose event is "activate" for this particular script from the ProgramID tables by utilization of the DELSCRIPT function that was described with respect to FIGS. 26, 27, and 28. The purpose for eliminating all triples whose event is activate for the present script is so that a later activate signal will not cause these triples to perform any action since the activate event should only occur once for each script.

Figure 32:
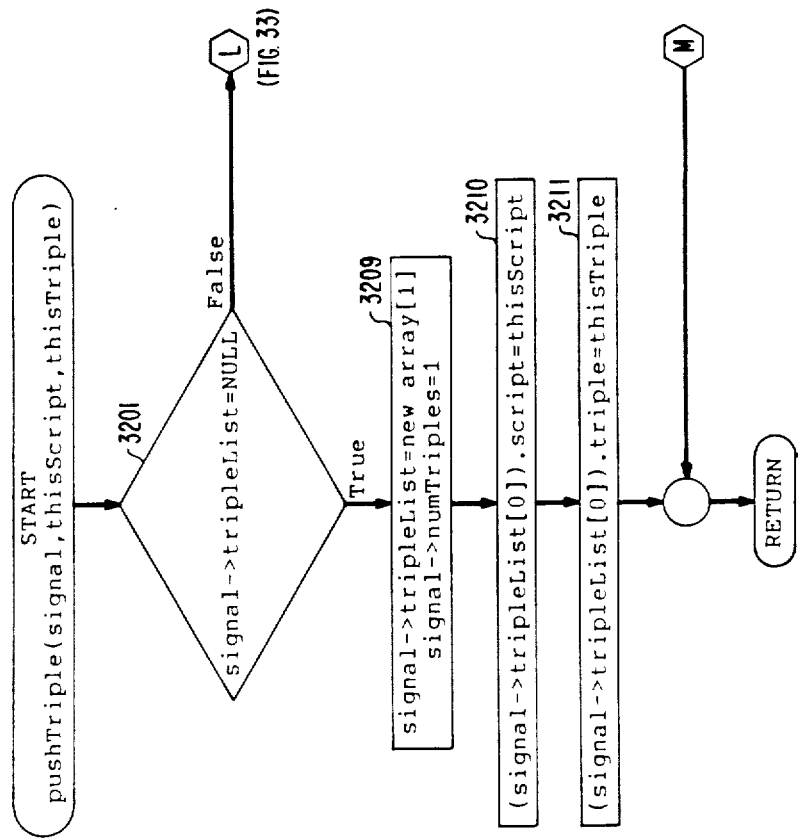
FIGS. 32 and 33 illustrate in greater detail, block 2920 of FIG. 31.
Figure 33:
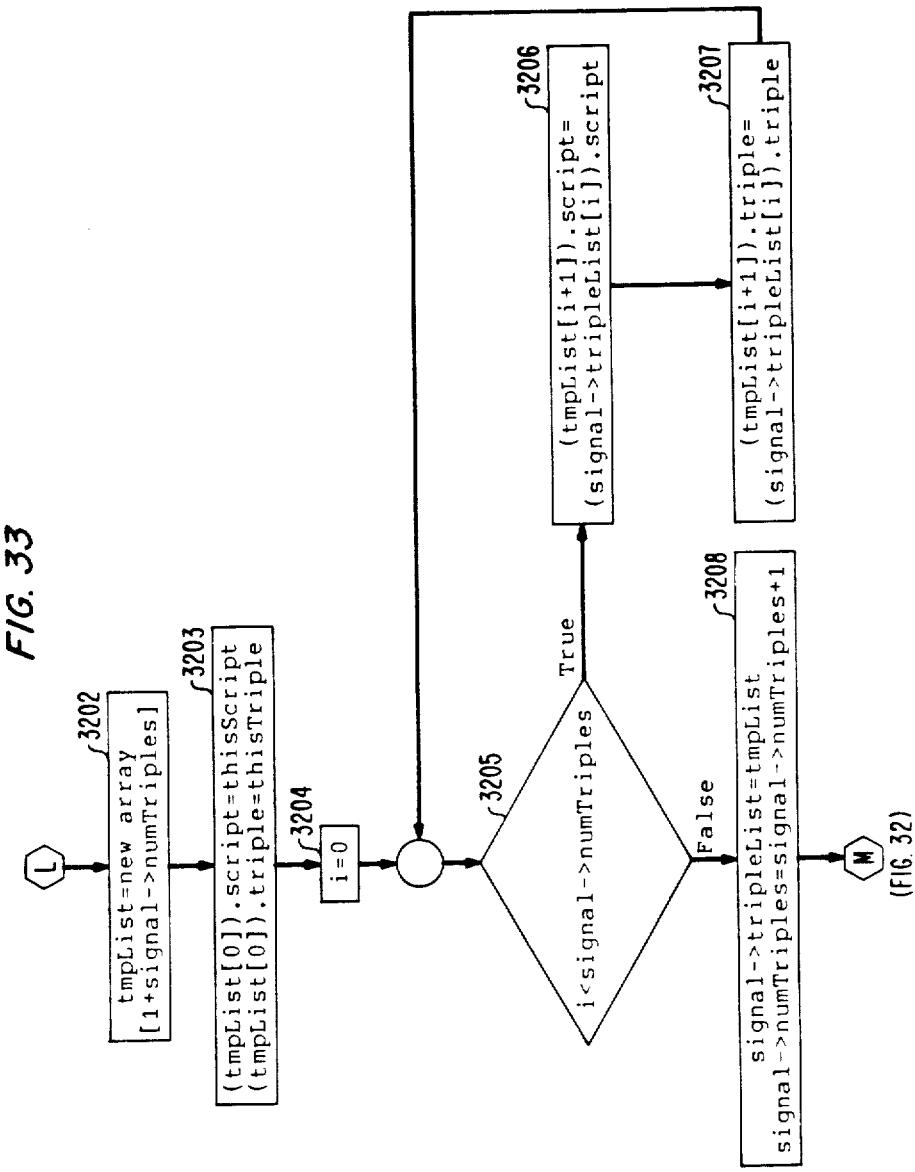
Figure 34:
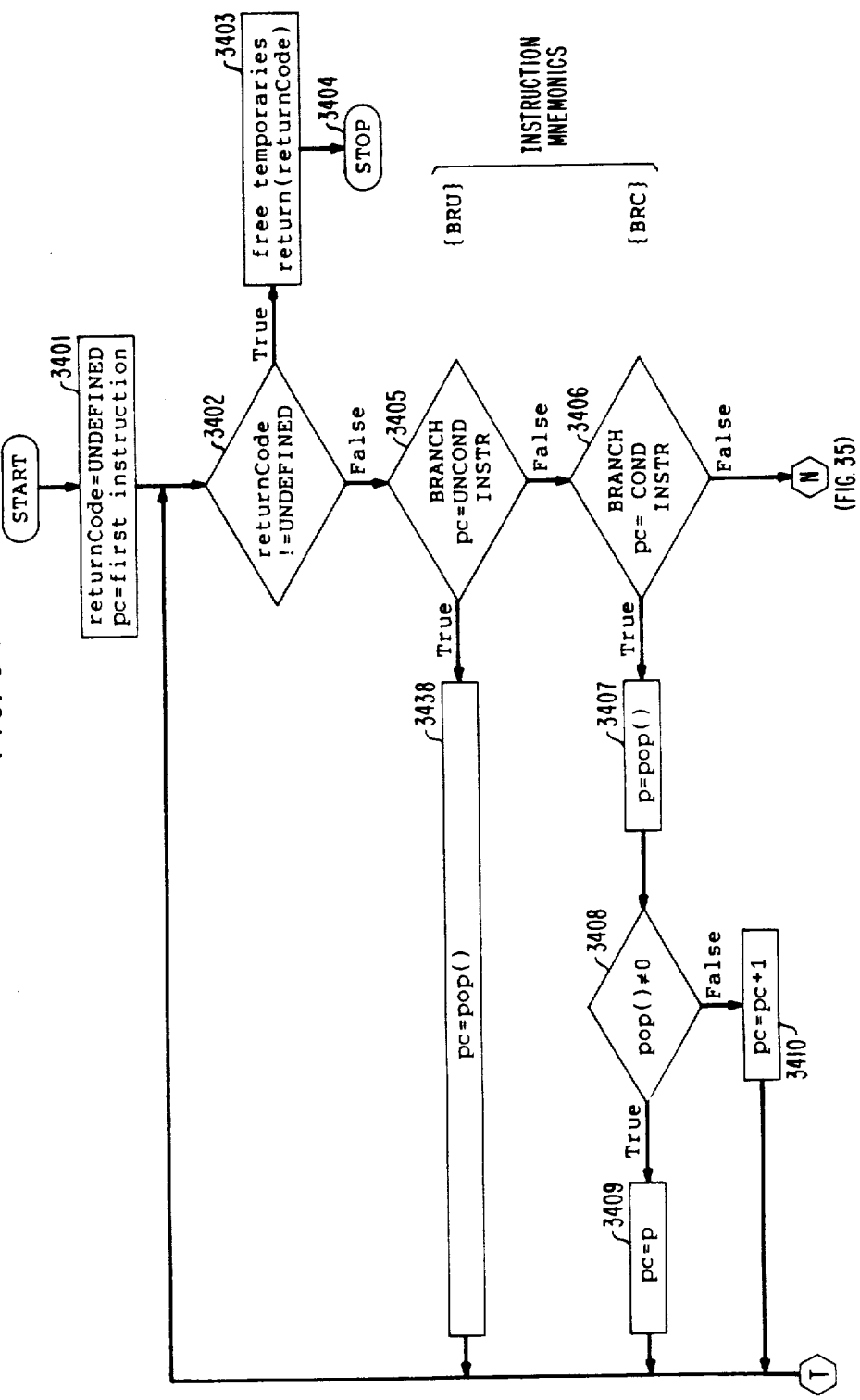
FIGS. 34 through 37 illustrate in flowchart form, interpreter 1006 of FIG. 10.
Figure 35:
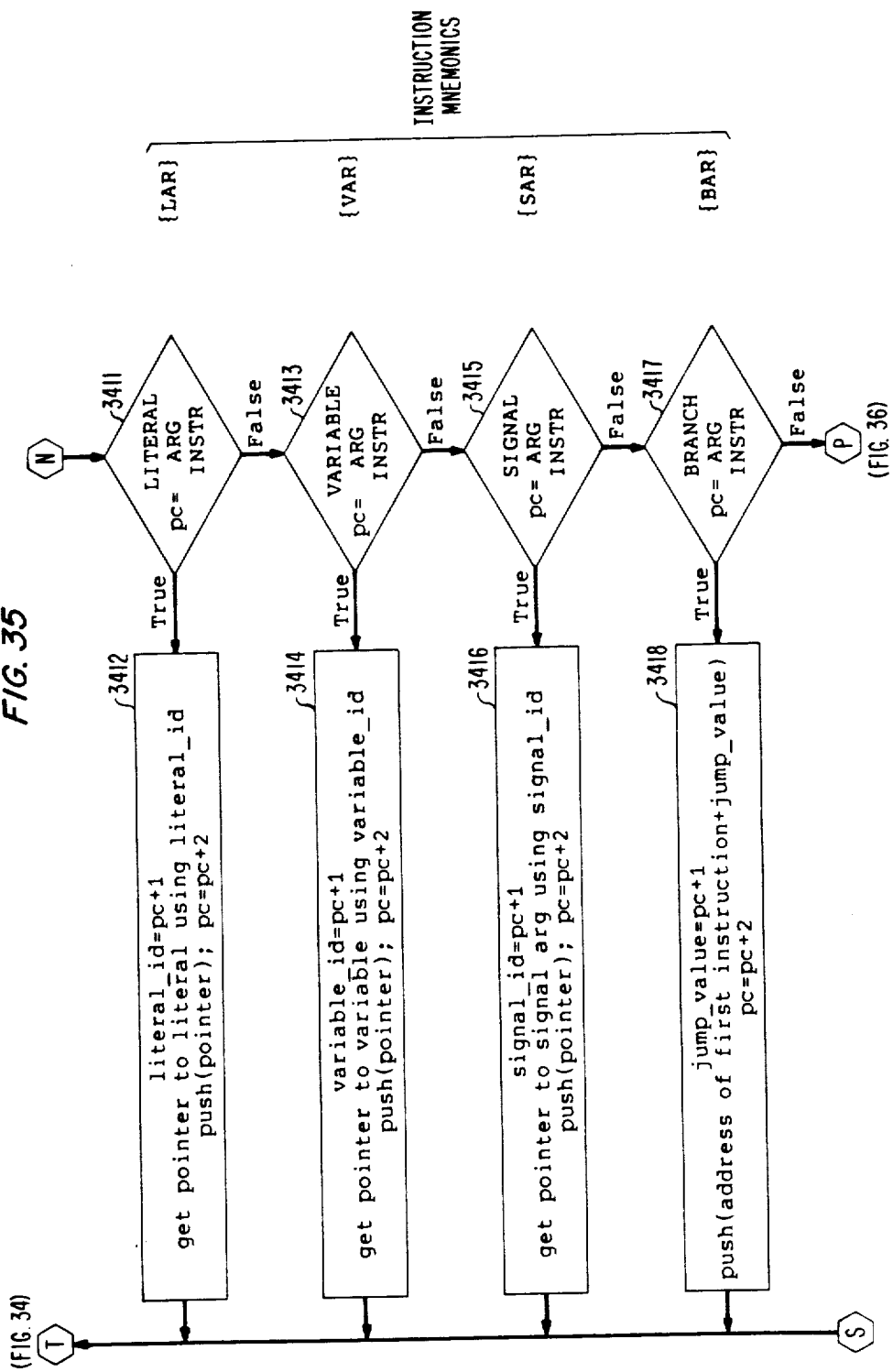
Figure 36:
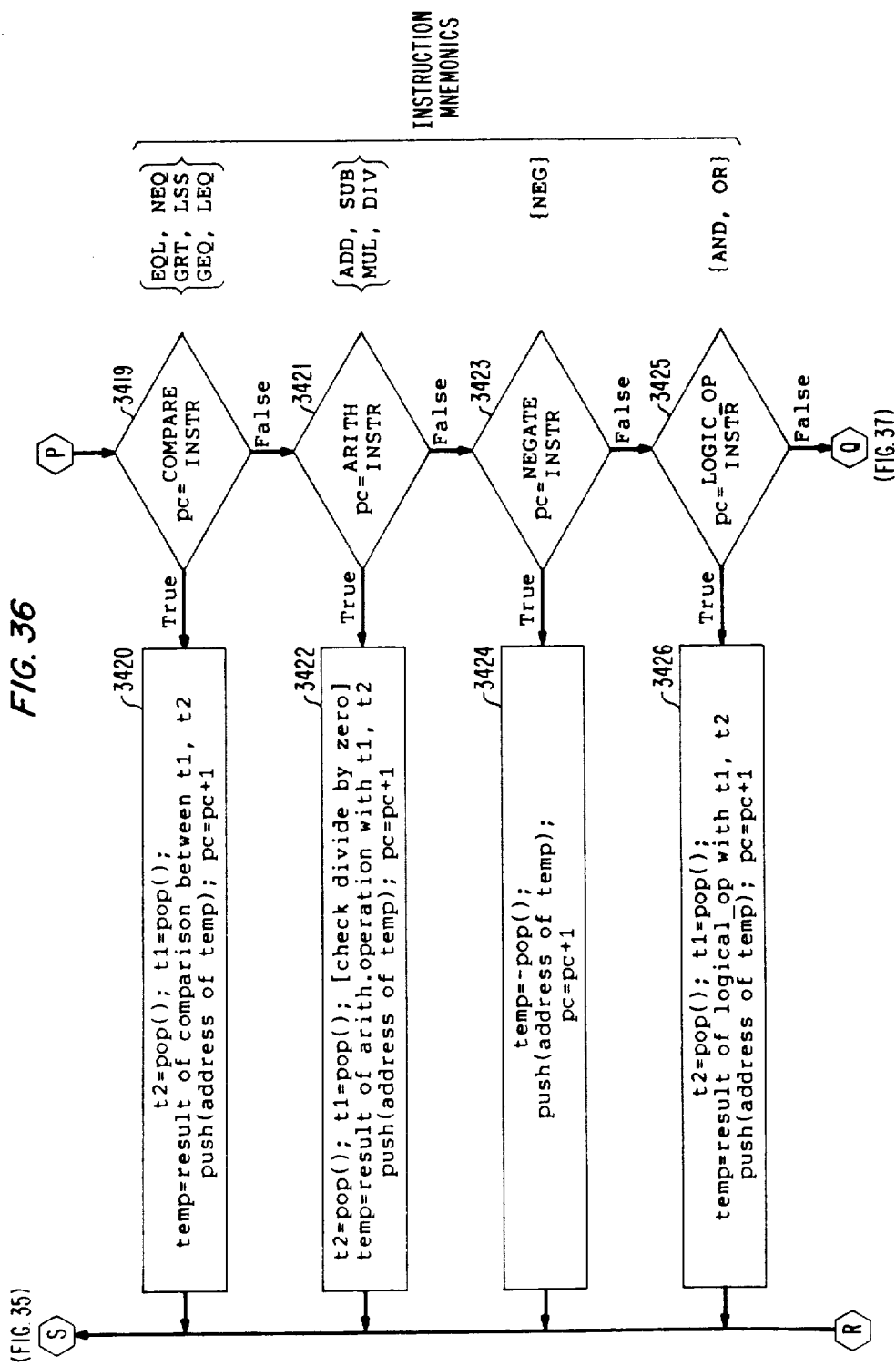
Figure 37:
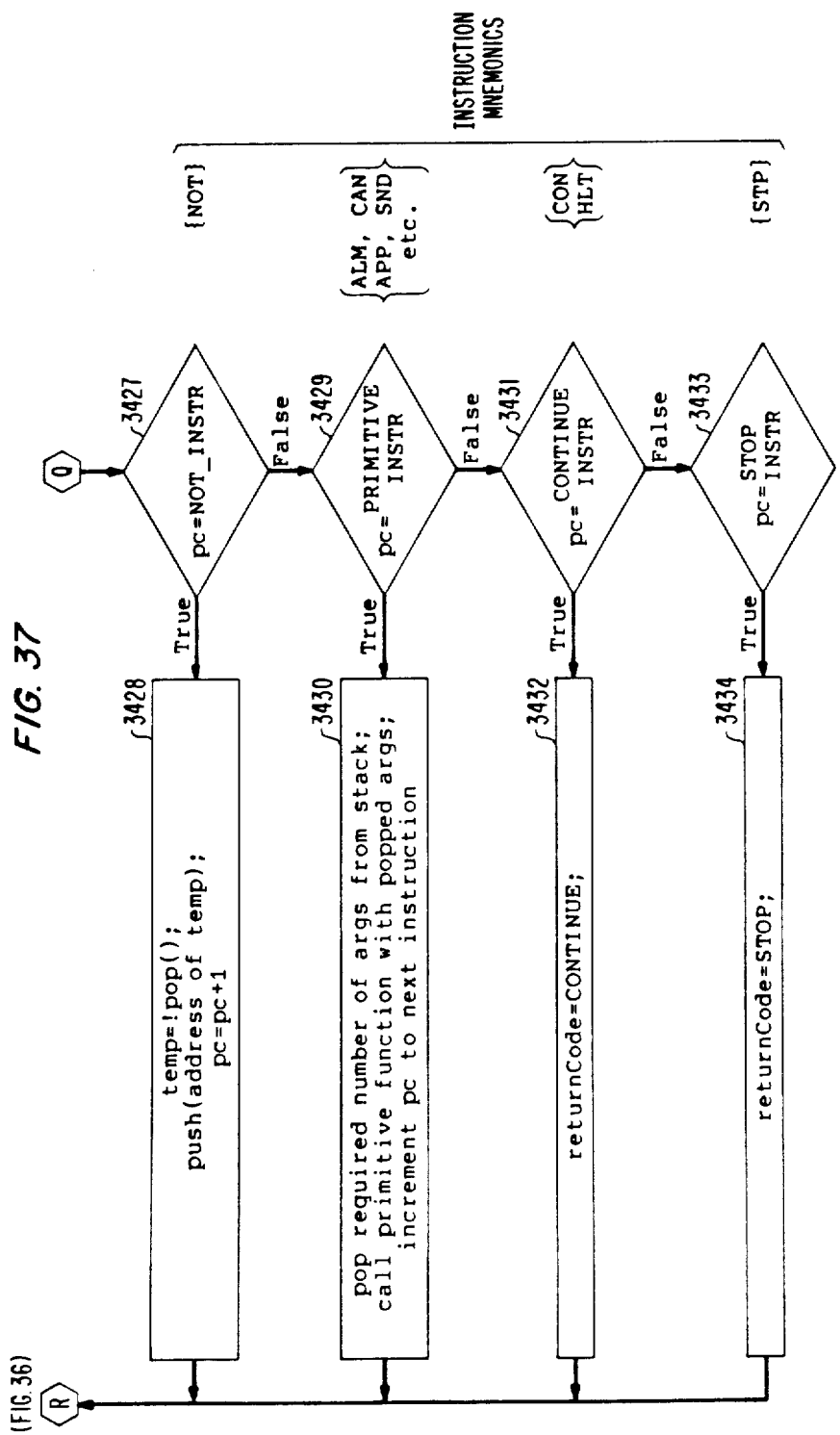

This PUSHTRIPLE function is illustrated in greater detail in FIGS. 32, and 33. When the PUSHTRIPLE function is called, two conditions can exist. The first condition is that the ProgramID table into which the triple is to be placed already exists, and the second condition is that the ProgramID table does not exist. Decision block 3201 makes the determination of which condition exists by checking to see if the designated triple list location, such as in 1113, contains a null value indicating that the ProgramID table does not exist. If the ProgramID table does exist, then block 3202 is executed which creates a new array and sets a TMPLIST pointer to identify the location of the new array. Block 3203 is then executed which inserts the script and triple identification into the first entry of the new array, thus, identifying the compiled triple code in this new array. Block 3204 sets up the initial value of the variable i.

Blocks 3205 through 3207 copy the script and triple identification information from the original ProgramID table into the new array table. Block 3206 copies the script identification information, and block 3207 copies the triple identification information. Once the contents of the ProgramID table have been completely copied into the new array table, block 3208 is executed which inserts the pointer contained in TMPLIST pointer into the triple list location, such as in 1113, thus making the new array the ProgramID table which is pointed to by an entry in the FSMSIGNAL table, such as 1110. In addition, block 3208 also inserts the number of triples that are identified by the new ProgramID table into the location designated as k in the ProgramID table.

FIGS. 34, 35, 36, and 37 illustrate the flowchart for interpreter 1006 of FIG. 10. Source code for the interpreter is illustrated in Appendix D. When control is first passed to interpreter 1006 from FSM 1005, interpreter 1006 sets the RETURNCODE variable equal to UNDEFINED and obtains the location of the first instruction to be interpreted by executing block 3401. After performing these initial functions, interpreter 1006 continually executes blocks 3402 and 3405 so on through 3434 until a HALT, STOP, or CONTINUE instruction is encountered. Once a HALT, STOP, or CONTINUE instruction is encountered, RETURNCODE is set to STOP or CONTINUE (the latter for both HALT and CONTINUE instructions) blocks 3403 and 3404 are executed and control is returned to FSM 1005 along with the RETURNCODE value. As previously noted, the HALT, STOP, or CONTINUE instructions terminate the execution of the coded instructions by resetting the RETURNCODE variable and cause control to be returned to FSM 1005 of FIG. 10.

If RETURNCODE remains equal to UNDEFINED, decision block 3405 is executed to determine whether an unconditional branch instruction is the next instruction to be executed. If the unconditional branch instruction is present, the interpreter stack is popped, and the popped value is stored into the PC variable resulting in the interpreter branching to a new position in the code determined by the popped value. The popped address was originally put on the stack by a branch argument instruction being detected by decision block 3417. Then block 3418 obtains the jump index as was illustrated in FIG. 21, and adds this index to the location of the first instruction address of the code and pushes the result onto the stack.

The execution of a conditional branch instruction is shown in blocks 3406 through 3410. Before the execution of a conditional branch, a branch argument instruction would have been executed placing onto the stack an index to where the branch is to occur. Once a conditional branch instruction is detected by decision block 3406, control is transferred to block 3407 which stores the popped branch address index into a local variable designated as "P". Next, decision block 3408 pops from the stack the address of the TEMP variable which contains the result of a comparison and/or a logical operation that had been placed on the stack by execution of a compare instruction and/or a logical operator instruction as illustrated by blocks 3419 and 3420 and 3425, 3426, 3427, and 3428. If the result of the compare and/or logical operation was true (nonzero), block 3409 is executed causing the branch to occur to the designated place in the code in a manner similar to that performed by block 3438. If the result of the compare and/or logical operation instruction was false (zero), then block 3410 is executed and the next instruction of the compiled code is executed.

If a literal argument instruction is encountered, decision block 3411 transfers control to block 3412. The latter block first obtains the literal ID field from the instruction whose format is illustrated in FIG. 19. The literal ID is utilized to access a literal table containing pointers to a list of literal strings both of which are contained in the script list, such as script list 1206 of FIG. 12. Once the pointer is obtained, it is pushed onto the interpreter stack. Similarly, if a variable argument instruction is encountered, decision block 3413 transfers control to block 3414. Block 3414 functions similarly to 3412 with the exception that the ID field is utilized to index into a local variable table to obtain a pointer to the global variable table. The latter pointer into the global variable table is pushed onto the stack by block 3414. Also, blocks 3415 and 3416 function similarly to blocks 3411 and 3412 in obtaining a pointer to the signal argument from a list of signal arguments maintained on a global basis.

Blocks 3419 and 3420 function to implement the various compare operations by first popping the two values to be compared from the stack and then storing the result of this comparison into a temporary variable. A pointer to this temporary variable is then pushed onto the stack by block 3420. Functions are provided for comparisons based on equal, not equal, greater than, less than, greater than/equal, and less than/equal. Note, that the interpreter may use a number of temporary variables which are freed when the interpreter executes block 3403.

Similarly, blocks 3421 and 3422 function to perform the arithmetic operations of addition, subtraction, multiplication, and division. Blocks 3423 and 3424 function similarly to the arithmetic instructions except that the unary negation function is performed on only one variable. Also, a logical opcode instruction as illustrated by blocks 3425 and 3426 is handled in a manner similar to that of the arithmetic instructions by blocks 3421 and 3422. Similarly, the NOT instruction is handled in a manner similar to the NEGATE instruction and is illustrated in blocks 3427 and 3428.

The execution of primitives, such as SEND, is illustrated by blocks 3429 and 3430. Once a primitive is detected, then the operations shown in block 3430 are performed. Most of the primitives have either no parameters or a fixed number of parameters. Pointers to these parameters have been placed onto the stack by earlier argument instructions and are simply popped off of the stack and passed to the primitive function. However, two types of primitive instructions, ASSIGN and SENDMESSAGE, have a different format. An ASSIGN primitive format is illustrated in FIG. 17. When the ASSIGN instruction is encountered, block 3430 accesses the second field of the instruction to obtain the ID of the variable in the compiled code to set that variable equal to the top value on the stack. The SENDMESSAGE format is illustrated in FIG. 18. First the SENDMESSAGE instruction is encountered and then block 3430 accesses the second field of the instruction illustrated in FIG. 18 to obtain the number of optional parameters to be passed in addition to the two parameters always implied by this instruction. Block 3430 uses this number of optional parameters to determine how many additional arguments to pop from the stack.

The HALT and CONTINUE primitives are implemented by blocks 3431 and 3432. Once the HALT or CONTINUE is detected, control is passed to block 3432 which sets the RETURNCODE equal to CONTINUE. Similarly, when the STOP instruction is detected by decision block 3433, control is passed to 3434 which sets the RETURNCODE equal to stop.

Figure 38:
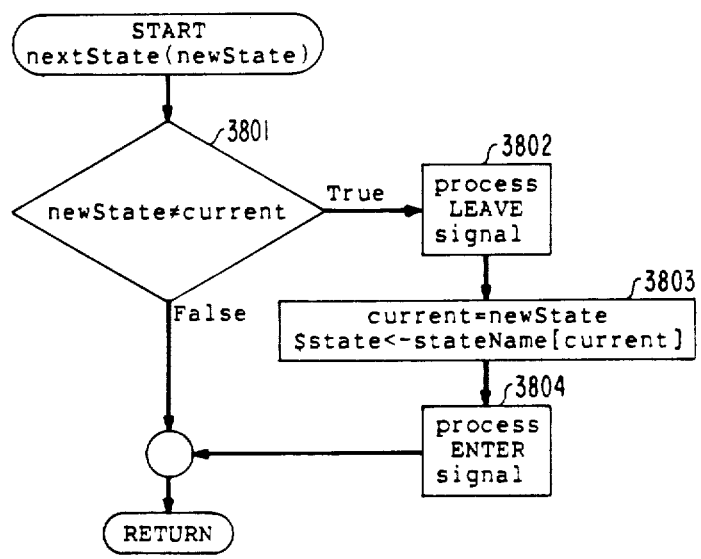
FIG. 38 illustrates, in flowchart form, the NEXT-STATE primitive and, in particular, illustrates the processing of the leave and enter signals.
Figure 39:
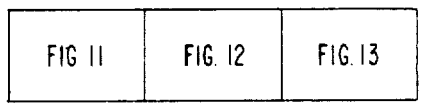
FIG. 39 illustrates how FIGS. 11, 12, and 13 may advantageously be combined.

The NEXTSTATE primitive is illustrated in greater detail in flowchart form, in FIG. 38. Upon invoking the NEXTSTATE primitive, block 3801 first verifies that the state is being modified and, if it is, block 3802 is executed. The latter block sets the $EVENT variable equal to the string "leave" and executes code similar to that illustrated in blocks 2309 through 2312 of FIGS. 23 and 24. This results in the leave signal being processed in the normal manner. After this has been accomplished, block 3803 is executed to change the $STATE variable equal to the string representation for the numerical state code contained in the newState argument and to change the CURRENT variable 1101 to index the entry for the new state in state table 1104. Finally, block 3804 is executed which causes the $EVENT variable to be set equal to the string "enter" and code similar to that illustrated in blocks 2309 through 2312 of FIGS. 23 and 24 is executed resulting in the enter signal being processed for the new state.

The PODS of FIGS. 40 and 41 illustrates in greater detail, the manner in which a script controls its own deactivation. In addition, the PODS script illustrates the provision of data services for the system illustrated in FIG. 1. When the POT, PODS, CPI, CFA, and CF scripts are compiled and downloaded, they are inserted into the logical signal tables illustrated in FIG. 7 such that a logical signal table containing a triple for each script would have a CF triple on the top, followed by a CFA triple, a CPI triple, a PODS triple, and finally, a POT triple. When the PODS script is initially activated, triple 4001 is executed in response to an activate signal which results in the $DATA and $DEACTIVATE variables being set equal to false. The $DATA variable indicates whether or not a data call is presently in progress; and the $DEACTIVATE variable indicates whether or not the script is to be purged when the idle state is entered. The purpose of a data call is to allow a customer to transmit a message that consists of a plurality of packets from the customer's data terminal to another customer's data terminal. However, it would be obvious to one skilled in the art to extend this script such that the transfer was from a customer unit's computer to another customer unit's computer. Once the customer unit has established the data call to the other customer's data terminal, this data call remains operational until the customer disconnects the data call by inputing the word "disconnect".

Consider now, the operation of the PODS script illustrated in FIG. 40 in providing the previously described data call. The customer using, for example, customer unit 102 initially sets up the call by typing a sequence of digits designating the customer unit that is to be called. In response to the entry of digits during the idle state, triple 4014 is executed resulting in the $DATA variable being set equal to true the $ORIGINATOR variable being set equal to the $THIS variable. The SENDMESSAGE primitive is then used to send an origin signal to the party being called, and the NEXTSTATE primitive is utilized to enter the outpulsing state.

During the setup of a voice call, the customer would go off-hook in the idle state and would be placed in the dialing state. While in the dialing state for a voice call, the customer would enter a sequence of digits and this would result in only a voice path being set up. Thus, the system distinguishes between a data call and a voice call by the fact that a data call receives the digits designating the called party during the idle state, whereas the voice call receives digits during the dialing state. The called party distinguishes between the origination of a data call and a voice call by the fact that a SENDMESSAGE is utilized to send the origin string in a message for a data call whereas the SEND primitive is used to send the origin message for a voice call.

Once in the outpulsing state, customer unit 102 leaves by the occurrence of the busy signal, input signal, or the receipt of a ringing message which results in the entry of the idle state, idle state, or audible state, respectively. Triples 4017 and 4013 illustrate the action definitions performed upon the occurrence of the busy or input signals, respectively. Triple 311, as illustrated in FIG. 3, defines action taken upon receipt of the ringing message signal. When this occurs, the NEXTSTATE primitive is executed moving the customer unit to the audible state.

Upon entry into the audible state, triple 4016 is executed resulting in a message being printed out on terminal 106 indicating that the other party has been alerted. While in the audible state, the customer unit can transfer to the idle state either by the occurrence of the input signal with the string "disconnect", or the occurrence of the busy signal from the called customer unit resulting in the execution of triples 4012 and 4017, respectively. When the called customer unit accepts the data call, the latter unit transmits a message to the calling customer unit utilizing the SEND primitive which sends an answer message. In response to the event of the answer message being received by the calling unit, triple 316 of FIG. 3 is executed resulting in customer unit 102 being transferred to the talking state.

Upon entering the talking state, triple 4010 is executed resulting in a message being printed out that a connection has been made to the identified called customer unit, and since there is a CONTINUE primitive ending the action definition of triple 4010, control is passed to triple 320 of the POT script as illustrated in FIG. 4. The execution of triple 320 causes a voice path to be set up in addition to the data path between the calling and called customer units. The talking state can be exited from by the execution of either triple 4011 or 4012. Both of these triples transfer the calling customer unit from the talking state to the idle state. The voice path is removed by triple 321 as illustrated in FIG. 4 which is responsive to the leave event in the talking state to execute the DISENGAGE primitive.

Consider the establishment of a data call from the point of view of the called customer unit. Upon occurrence of the rcvmessage event having an origin string, triple 4006 is executed assuming the called customer unit is in the idle state otherwise, triple 4005 is executed and a busy signal is sent back to the calling customer unit. The action definition of triple 4006 utilizes the SEND primitive to transmit the ringing signal back to the calling customer unit indicating that the called customer unit is entering the ringing state and initializes the $DATA, $ORIGINATOR, $OTHERPARTY variables.

Upon entering the ringing state, triple 4007 is executed in the called customer unit and a message is printed out on the associated terminal indicating the party who is calling. The state can be changed to the idle state if the calling party terminates the call set up which results in the execution of triple 4008. The customer at the called customer unit can establish the call by utilizing the INPUT primitive to send in the word "connect" resulting in the execution of triple 4009 resulting in the action definition sending an answer signal to the calling customer unit, and changing the state to talking. Upon entering the talking state, triple 4010 is executed as illustrated in FIG. 40, and in addition, triple 320 as illustrated in FIG. 4 is executed resulting in a voice path as well as a data path being set up. The talking state is terminated at the called customer unit in the same manner as that previously described from the point of view of the calling customer unit.

Consider now, in greater detail, the manner in which the PODS script as illustrated in FIG. 40 delays its deactivation after the deactivate primitive has been executed specifying that the PODS script is to be deactivated after the data call is completed. It is only necessary to delay the deactivation if there is presently a data call in progress. Hence, the state will not be the idle state. Upon the occurrence of the deactivate event and the state not being the idle state, triple 4002 is executed resulting in the $DEACTIVATE variable being set equal to true and then the execution of the STOP primitive. As previously described with respect to FIGS. 23 and 24, the script indicates to FSM 1005 that it will handle its own deactivation by execution of the STOP primitive. Once the data call is completed, and the state is transferred to be the idle state, triple 4003 is executed. Since the $DEACTIVATE variable is true, the "then" portion of the "if" statement will be executed, resulting the PURGE primitive being executed which removes the PODS script from the logical signal tables as illustrated in FIGS. 6 and 7 and, of course, also from the actual physical tables.

In order to further illustrate the manner in which the operations of interpreter 1006 are performed, and in particular, the operations concerned with recovering values for parameters and matching for the event definition, Appendix B is provided. In Appendix B, a script is illustrated that provides the service of allowing data messages to be transmitted from one customer unit to another customer unit. This appendix illustrates this script both in the form of source NPL statements and in the form of compiled code. A brief explanation of the operation of the compiled code is included.

It is to be understood that the above-described embodiment is merely illustrative of the principles of the invention and that other arrangements may be devised by those skilled in the art without departing from the spirit and scope of the invention. In particular, it would be obvious to one skill in the art to have the functions performed by computer 101 performed by each customer unit's computer for that customer unit using known software techniques. In addition, it would be further obvious to have all functions performed by the computers illustrated in FIG. 1 performed by one computer using known software techniques.

This appendix details the syntax and the semantics of the NPL language and is included to aid in the understanding of the scripts illustrated in FIGS. 5 and 6 and the data gram script illustrated in Appendix B. It would be obvious to one skilled in the art to extend the basic syntax illustrated in this appendix to include different real-time processes other than telecommunications and also to include any special data communication type functions that might be desirable.

1. PROGRAMMER-DEFINED IDENTIFIERS

The syntax of programmer-defined identifiers is shown in Table 1. The symbol alphanumeric-sequence in Table 1 denotes a letter followed by zero or more letters, digits, or underscore characters.

TABLE 1

| Syntax of programmer-defined identifiers | |
| --- | --- |
| variable | $alphanumeric-sequence |
| string: | "characters" |
| name: | alphanumeric-sequence |
| number: | digits |
| alarm: | @alphanumeric-sequence |
| question: | ?alphanumeric-sequence |
| time: | [digit] ~digit:digit~digit |

1.1 Variables

Variables are "declared" by their appearance in a triple, and are automatically initialized with a null value. A variable is typeless—it may be assigned the value of any NPL identifier interchangeably. However, the following variables may not be assigned values, since they are predefined as indicated:

| | |
|---|---|
| $state | the name of the local station's current state |
| $event | the name of the local station's current event |
| $this | the four-digit address of the local station |
| $time | the current clock time of the local station |

A variable can be accessed by all the scripts activated in the local station.

1.2 Strings

Strings are used to represent input/output messages and the addresses of subscriber stations. If an output message string contains a variable, the variable will be replaced by its current value when the string is printed on the local station's CRT. Output strings may include the following escape sequences with the indicated result:

| | |
|---|---|
| \n | a newline is printed on the CRT |
| \t | a tab is printed on the CRT |
| \g | the CRT's bell is sounded |
| \" | the " character is printed on the CRT |
| \\ | the \ character is printed on the CRT |

A single backslash (\) may appear in a string at the end of one source code line to indicate continuation of the string to the following line; any leading blanks or tabs on the following line will not be considered part of the string.

1.3 Names

Names are used primarily for script identification. They may also be used for programmer-defined constants such as true and false. Note that constant names have no inherent value.

1.4 Numbers

Numbers represent nonnegative values unless they are preceded by a minus (−) sign, in which case they indicate negative values. (A leading plus sign [+] must not be used to indicate a nonnegative value, since the NPL compiler will threat this as a syntax error.) Only integer-valued numbers are supported in NPL. Note that a string—not a number—is used to denote a subscriber station address.

1.5 Alarms

Alarms are used to identify timers for call features that perform processing related to the passage of time. An alarm is set with the alarm primitive (section 6.2), and its expiration is detected as an alarm vent (section 5).

1.6 Questions

Questions are labels that link program prompts for subscriber input with the subscriber's subsequent responses to those prompts. A question is defined with the ask primitive (section 6.2), and is used to match a response with its associated promptly when a reply event (section 5) occurs.

1.7 Times

Times denote clock readings in the local station. A 24-hour ("military") clock representation is assumed—no "am" or "pm" designation may appear. Any time identifier signifying a time of day earlier than 10:00 must not have a leading zero (in the "tens place").

2. TONES AND SIGNALS

Table 2 shows NPL keywords for tones that can be produced at the local station, and characterizes the subscriber information that each keyword denotes.

TABLE 2

| NPL tone keywords | |
|---|---|
| Tone | Meaning |
| dialtone | indicates that digits may be entered |
| busytone | indicates the called station is "busy" |
| audible | indicates the called station is "ringing" |
| silence | indicates the called station has "hung up" |
| ringing | indicates that a call has been received |

Note, silence replaces dialtone when all the digits of a station address have been entered and the return key has been depressed on the local station's keyboard. An "error" tone is not supported but it would be obvious to one skilled in the art to provide such a tone.

Signals may be sent from the local station to indicate its status or to request service from another station. The keywords for signals defined in NPL are shown in Table 3, along with the messages they denote to other stations.

TABLE 3

| NPL signal keywords | |
|---|---|
| Signal | Meaning |
| origin | requests to set up a call to another station |
| query | requests the status of another station |
| busy | indicates the local station is "busy" |
| ringing | indicates the local station is "ringing" |
| answer | indicates the local station has "answered" |
| disconnect | indicates the local station has "hung up" |
| idle | indicates the local station is "idle" |
| notidle | indicates the local station is not "idle" |

NPL does not have keywords for "offhook" and "onhook" signals, because they are generated automatically within the system, and need not to be "sent" explicitly from the local station to itself. However, NPL does not include event keywords to denote the "receipt" of these signals in the local station (see section 5).

3. ARITHMETIC, RELATIONAL, AND LOGICAL OPERATORS

NPL arithmetic, relational, and logical operators are used to form conditional tests and arithmetic expressions. Thus, they may appear only in the action definitions of triples.

The binary arithmetic operators are +, −, *, and /. NPL supports only integer-valued arithmetic; division truncates any fractional part. There is a unary − in NPL, but no unary + is provided. The only NPL identifiers valid as operands in arithmetic expressions are numbers and variables representing number values. The relational operators of NPL are

| = | != | > | >= | < | <= |
|---|----|---|----|---|----|

(Note that difference between the equality operator of NPL and that of the programming language "C".) Any of the NPL identifiers may be used as operands in expressions involving = or !=, but numbers and number-valued variables are the only identifiers compatible with the other relational operators.

The operators and, or, and not are provided for the formation of logical expressions. The unary negation operator not converts a non-zero or "true" operand into 0, and a zero or "false" operand into 1. Numbers and number-valued variables are the only identifiers valid as operands for the logical operators.

The following table summarizes the rules for precedence and associativity of NPL operators. Operators on the same line have the same precedence, and rows are in order of decreasing precedence. Note that NPL operators have precedence and associativity identical to their "C" counterparts. Parentheses may be used to force a higher precedence for expressions involving any of the NPL operators.

| Precedence | Operator | Associativity |
|---|---|---|
| highest | − not | right to left |
| ↑ | * / | left to right |
| ↑ | + − | left to right |
| ↑ | < <= > >= | left to right |
| ↓ | = != | left to right |
| ↓ | and | left to right |
| ↓ | or | left to right |
| lowest | < − | right to left |

4. STATE SPECIFICATIONS

NPL state definitions are constructed using keywords that denote states (current service conditions) of the local station. Table 4 shows the NPL state keywords and the local station conditions they represent.

TABLE 4

| State | NPL state keywords Meaning |
|---|---|
| idle | "onhook" and ringing tone is not being produced |
| dialing | "offhook" and dialtone is heard in the handset |
| outpulsing | "offhook" and awaiting a response to an origin |
| busy | "offhook" and busytone is heard in the handset |
| audible | "offhook" and audible is heard in the handset |
| talking | "offhook" and a voice connection is established |
| disconnect | "offhook" and silence is heard in the handset |
| ringing | "onhook" and ringing tone is being produced |

NPL provides two state specification operators for including multiple states in one triple: or indicates a union of states, and not denotes the complement of a state relative to the set of eight NPL states. The not operator may be combined with the or operator to specify the complement of a union of states, in which case the NPL compiler expects the state union expression to be enclosed in parentheses. Complementation of a single state does not require parentheses.

A state specification may consist solely of the keyword abbreviation all to represent evey state of the local station. A state complement or union using all is treated by the compiler as an error.

The following are examples of valid state specifications:

state: talking
state: outpulsing or audible
state: not idle
state: not (idle or dialing or ringing)
state: all

5. EVENT SPECIFICATIONS

NPL event specifications are formed from keywords denoting the events thay may trigger actions at the local station. A fixed-format argument list may appear with an event keyword, to retrieve information associated with the corresponding system event, or to specify a restriction on the event conditions for which an action is triggered. Any event keyword may be used without an argument list if it is desired to "catch" a system event unconditionally without collecting more information.

Four event keywords never have an argument list, because they represent local station events that do not carry any additional information:

offhook the handsett has been removed from its switchhook onhook the handset has been returned to its switchhook leave the previous "current state" has just been left enter the successor "current state" has just been entered Two other event keywords are also used without arguments, because their context determines the conditions for which their associated actions are triggered:
activate
deactivate The activate (deactivate) event keyword denotes that the local station has received a message to activate (deactivate) a particular script. If the message names the script in which activate (deactivate) is triggered. The activate event keyword is used in a script triple to set up conditions that must exit before the execution of the script's other triples. The deactive event keyword is used in a script triple to trigger any cleanup activities that must be performed before the script's deactivation. The activate (deactivate) event keyword is a companion to the activate (deactivate) primitive (section 6.2).

Each of the following event keywords denotes that the local station has received the NPL signal of the same name (see Table 3). The address of the station that sent the signal is automatically assigned to source-variable.

origin[(source-variable)]
query[(source-variable)]
busy[(source-variable)]
ringing[(source-variable)]
answer[(source-variable)]
disconnect[(source-variable)]
idle[(source-variable)]
notidle[(source-variable)] The digits event keyword denotes that the local station has collected a valid station address dialed by a subscriber. The address is saved in address-variable.

digits 8 (address-variable)]

Each of the remaining event keywords triggers an action only when the indicated system event occurs and a tag carried with the system event matches an argument provided with the event keyword.

The alarm event keyword denotes that a programmer-defined alarm has "timed out" in the local station. An alarm identifier or variable alarm-tag is matched against the identity of the alarm that expired.
alarm[(alarm-tag)]

The alarm event keyword is a companion to the alarm primitive (section 6.2).

The time event keyword signifies that the local station's internal clock has advanced by one minute. A time identifier or variable time-tag is matched against the new clock reading.
time[(time-tag)]
Note that time triggers its action once each minute if time-tag is the predefined variable $time (section 1.1).

The input event keyword denotes that a subscriber has typed an input message string (command at the local station's keyboard. A string identifier or variable input-tag is matched against the subscriber,s input message string. If there is a match, each other-input variable as assigned in turn with the next blank-separated string typed on the same input line.
input[(input-tag{, other-input})]

The reply event keyword denotes that a subscriber has typed a reply to a prompt for information. A question identifier or variable question-tag is matched against the question label for the prompt that was displayed. If there is a match, the first string in the subscriber's reply is assigned to reply-variable, and each other reply variable is assigned in turn with the next blank-separated string typed on the same input line.
reply[(question-tag, reply-variable {,other-reply})]
The reply event keyword is a companion to the ask primitive (section 6.2).

The rcvmessage event keyword denotes that the local station has received a message string sent from another station. A string identifier or variable message-tag is matched against the message string that was received. If there is a match, source-variable is assigned the address of the station that sent the message, and each other-message variable is assigned in turn with an additional message string that may have been received.
rcvmessage [(source-variable, message-tag {, other-message})]
The rcvmessage event keyboard is a companion to the sendmessage primitive (section 6.2).

A triple's action can be triggered by more than one event if the event specification operator or is used in the triple to denote a union of events. NPL has no event specification operator for complementation.

The following are examples of valid event specifications:
event: input (:#:, $CFnumber)
event: origin ($source) or query ($source)
event: reply (?CFforward, $CFreply)
event: time (8:00)
event: rcvmessage ($source, "pickup denied")

6. ACTION SPECIFICATIONS

An action specification consists of zero or more assignment statements, primitives, or conditional statements, followed by zero or one directive. At least one of these components must be present in evey action specification.

6.1 Assignment

The NPL assignment statement has the following syntax:
variable <—expression
The variable must be a programmer-defined variable, while expression may be a variable, a nonvariable identifier (alarm, string, number, etc.), a state keyword, a tone keyword, a signal keyword, or combinations of these formed into a valid arithmetic, relational, or logical expression.

6.2 Primitives

NPL primitives do not return values—they are simply interfaces to lower-level routines that perform specific tasks. The arguments provided with primitives must follow a fixed format with respect to type and order of appearance.

```
apply ( tone [ , duration ] )
remove ( tone )
```

The apply primitive causes tone to be generated at the local station either continuously or for an interval given (in tenths of a second) by the optional duration expression. The remove primitive stops tone from being generated at the local station. If tone is already (not currently) being produced, the apply (remove) primitive is ignored. A tone keyword (see Table 2) or a variable may be used to represent tone.
send (station-address, signal)
The send primitive transmits signal from the local station to another station-address. A signal keyword (see Table 3) or a variable may be used to represent signal; station-address may be a string identifier or a variable.
print (output)
The print primitive displays an output string on the local station's CRT screen. The primitive interprets escape sequences and evaluates variables that are contained in output (see section 1.2). A string identifier or a variable may be used to represent output.

```
engage ( station-address )
disengage
```

The engage (disengage) primitive sets up (takes down) a one-way voice connection from the local station to another station-address. If a voice connection is already (not currently) established from the local station, the engage (disengage) primitive is ignored. A string identifier or a variable may be used to represent station-address; disengage needs no argument, since in Phase Zero only one voice connection may be set up from a station at a given time. Note that the local station and the remote station must each execute an engage (disengage) primitive to establish (dismantle) a two-way voice connection between them.
dial (station-address)
The dial primitive automatically originates a call from the local station to another station-address. The primitive is useful for originating a call when the local station is not in the dialing state, or for dialing a station-address saved previously (e.g. by a "last number redial" call feature). A string identifier or a variable may be used to represent station-address.
forward (destination-address, source-address, signal)
The forward primitive passes to destination-address an origin or query signal received at the local station from source-address. Any signal other than origin or query produces an error when forward is executed. A signal keyword (see Table 3) or a variable may be used to represent signal; destination-address and source-address may each be a string identifier or a variable.
alarm (alarm-tag, duration)

The alarm primitive creates an alarm called alarm-tag that is set to "time out" after an interval specified (in tenths of a second) by the duration expression. Multiple alarm primitives that use the same alarm-tag will cause independent timers to be created, each of which is identified by alarm-tag. An alarm identifiers or a variable may be used to represent alarm-tag.

ask (question-tag, prompt, duration)

The ask primitive prints prompt on the local station's CRT to ask the subscriber for an input response. The prompt is displayed for an interval specified (in tenths of a second) by the duration expression. A question-tag labels prompt so it can be associated with its subscriber response later. A question identifier or a variable may be used to represent question-tag; prompt may be a string identifier or a variable. The ask primitive interprets escape sequences and evaluates variables that are contained in prompt (see section 1.2).

cancel (alarm-or-question-tag)

The cancel primitive revokes an alarm or a subscriber prompt identified by alarm-or-questin-tag. If alarm-or-question-tag is not currently set/displayed, the cancel primitive is ignored. An alarm identifier, a question identifier, or a variable may be used to represent alarm-or-question-tag. If alarm-or-question-tag identifies an alarm, cancel rescinds all existing alarms associated with alarm-or-question-tag.

sendmessage (station-address, message-tag {, other-message})

The sendmessage primitive communicates a programmer-defined message-tag and each instance of other-message from the local station to another station-address. A string identifier or a variable may be used to represent each of station-address, message-tag, and other-message.

activate (script)
deactivate (script)

The activate (deactivate) primitive activates (deactivates) the triples of script in the local station. If script is not stored in the local station, activate (deactivate) produces a message indicating script's absence; if script is already active (stored but not currently active), activate (deactivate) is ignored. If activatge is executred and script contains a triple matching the local station's current state and event, the triple is not a candidate for execution until the next time the same state and event occur. If deactivate is executed and script contains a triple specifying the deactivate event keyword (section 5) and the current state along with the stop directive (section 6.3), then script can be deactivated only by a purge directive (section 6.3) in script; otherwise, script is deactivated directly by the deactivate primitive. A name identifier or a variable may be used to represent script.

6.3 Directives

A directive may appear only as the last executable statement in an action specification. The directives nextstate was described with respect to FIG. D and continue and stop were described with respect to FIG. 15.

```
nextstate ( state )
continue
stop
```

A state keyword (see Table 4) or a variable may be used to represent state. If state is the same as the current state, the FSM controller will not execute triples that specify the leave or enter events (see section 2). One other directive plays a limited role in NPL:

purge

The purge directive causes an unconditional deactivation of its containing script. It is essential in any script having a triple that specifies the deactivate event keyword (section 5) with the stop directive, since it is the only mechanism for finally deactivating such a script. The purge directive must be used with care to avoid the confusion that could arise from the unexpected deactivation of a script.

6.4 Conditionals

NPL conditional statements have the following syntax:

```
if ( expression )
    then action specification
    [ else [ action specification ] ]
endif
```

The conditional test expression must have either a "true" (logical nonzero) or a "false" (logical zero) evaluation, and must be enclosed in parentheses. Note that a conditional is defined recursively: an action specification may itself contain other conditionals, as well as assignments, primitives, and directives.

An example of a datagram script is given in this appendix to further clarify the operations of interpreter 1006. The datagram script allows for the transmission of data messages from one customer unit to another customer unit. The datagram script is first given in the form of NPL statements and then the compiled code is illustrated. Within the compiled code, the mnemonics for the various instructions are illustrated rather than the actual compiled code to allow ease of comprehension. The actual compiled code would have numerical values in accordance with Table III.

The first portion of the compiled format of the script up to the part labeled "first triple" is stored in a script list such as script list 1206 of FIG. 12. The second triple demonstrates the matching that is performed within the coded part of a triple to determine if the input event matches the present signal being received. The test to ascertain whether or not the input matches ":" or not is performed by the first 5 bytes of the instruction part of the second triple. .for the customer input string is not ":", then a jump is made to the twenty-first byte which is a HALT instruction that sets RETURNCODE equal to CONTINUE and returns control to FSM 1005. Instruction bytes 0 and 1 obtain the literal argument for the ":" string which is accessed by literal id "2" and places a pointer to this literal argument on the stack. The next two instruction bytes obtain the pointer to the first signal argument for the input event definition and push this on the stack also. Instruction byte 4 pops the, two pointers from the stack, obtains the values pointed to by those two pointers, and compares those values. If the first input event signal argument contains a ":", a "1" is pushed onto the stack by this fifth instruction byte, otherwise, a "0" is pushed onto the stack. Instruction byte 5 pushes an address index having a decimal value of 21 which designates the last instruction, HALT, of the triple. If the jump is not performed to the HALT instruction, then instruction bytes 8 and 9 are interpreted to obtain the pointer to the second signal argument of the input event which is the information to be stored in the $DATASGRAM variable. Instruction bytes 10 and 11 are interpreted to obtain a pointer to be $DATAGRAM variable to assign the information of the second signal argument in the input event to this variable which is in the global variable table. The remainder of the instruction bytes of the second triple then obtain the parameters for the SENDMESSAGE primitive which is executed by instruction bytes 18 and 19. Instruction byte 20 causes the RETURNCODE to be set equal to STOP and returns control to the interpreter. The compiled instructions for the third triple illustrate the use of the "if" conditional in conjunction with the STOP and CONTINUE primitives.

|     |     | NPL STATEMENTS |
| --- | --- | --- |
| script: | datagram | |
| state: | all | |
| event: | activate | |
| action: | print ("Enter ':' to send datagram\n") | |
| state: | talking | |
| event: | input (":", $datagram) | |
| action: | sendmessage ($otherparty, "datagram", $datagram) | |
|     | stop | |
| state: | talking | |
| event: | rcvmessage ($source, "datagram", $datagram) | |
| action: | if ($source = $otherparty) | |
|     | then print ("\greceived from $source at $time: $datagram\ n") | |
|     | stop | |
|     | else continue | |
|     | endif | |

|     |     | COMPILED FORMAT OF "datagram.n" SCRIPT |
| --- | --- | --- |
|     | 001 | number of bytes in remainder of script: |
| \   | 112 | ((octal) 1 << 7) + (octal) 112 = (decimal) 202 |
|     | 005 | number of literals in script = (decimal) 5 |
| id  | literal strings (represented character-by-character) | |
| 0   | datagram\0 | |
| 1   | Enter ':'to send datagram \ n\ 0 | |
| 2   | :\0 | |
| 3   | datagram\0 | |
| 4   | greceived from \ 2 at \ 3 :\ o\ n \0 | |
|     | 004 | number of variables in script = (decimal) 4 |
| id  | variable string (represented character-by-character) | |
| 0   | $datagram\ 0 | |
| 1   | $otherparty\ 0 | |
| 2   | $source\ 0 | |
| 3   | $time\ 0 | |
|     | 003 | number of triples in script = (decimal) 3 |

|     |     | FIRST TRIPLE |
| --- | --- | --- |
|     | 000 | total number of bytes in this triple: |
|     | 021 | ((octal) 0 << 7) + (octal) 21 = (decimal) 17 |
|     | 010 | number of states = (decimal) 8 |
|     | 000 | id for idle state |
|     | 001 | id for ringing state |
|     | 002 | id for talking state |
|     | 003 | id for disconnect state |
|     | 004 | id for dialing state |
|     | 005 | id for busy state |
|     | 006 | id for audible state |
|     | 007 | id for outpulsing state |
|     | 020 | id for activate event |
| pc  | instruction | |
| 0   | LAR 001 | push pointer to literal 3 on stack |
| 2   | PRI | call print with popped stack item |
| 3   | STP | returnCode = STOP; exit interpreter loop |
| 4   | HLT | returnCode = CONTINUE; exit interpreter loop |

|     |     | SECOND TRIPLE |
| --- | --- | --- |
|     | 000 | total number of bytes in this triple: |
|     | 033 | ((octal) 0 << 7) + (octal) 33 = (decimal) 27 |
|     | 001 | number of states = (decimal) 1 |
|     | 002 | id for talking state |
|     | 014 | id for input event |
| pc  | instruction | |
| 0   | LAR 002 | push pointer to literal 2 on stack |
| 2   | SAR 000 | push pointer to signal argument 0 on stack |
| 4   | NEQ | push result of [pop() != pop()] on stack |
| 5   | BAR 025 | push pc address (decimal) 21 on stack |
| 7   | BRC | conditionally jump to address popped from stack |
| 8   | SAR 001 | push pointer to signal argument 1 on stack |
| 10  | ASN 000 | assign popped stack item to variable 0 |
| 12  | VAR 001 | push pointer to variable 1 on stack |
| 14  | LAR 003 | push pointer to literal 3 on stack |
| 16  | VAR 000 | push pointer to variable 0 on stack |
| 18  | SNM 001 | call sendmessage with 3 popped stack items |
| 20  | STP | returnCode = STOP; exit interpreter loop |
| 21  | HLT | returnCode = CONTINUE; exit interpreter loop |

|     |     | THIRD TRIPLE |
| --- | --- | --- |
|     | 000 | total number of bytes in this triple: |
|     | 047 | ((octal) 0 << 7) + (octal) 47 = (decimal) 39 |
|     | 001 | number of states = (decimal) 1 |
|     | 002 | id for talking state |
|     | 013 | id for rcvmessage event |
| pc  | instruction | |
| 0   | LAR 003 | push pointer to literal 3 on stack |
| 2   | SAR 001 | push pointer to signal argument 1 on stack |
| 4   | NEQ | push result of [pop() != pop()] on stack |
| 5   | BAR 041 | push pc address (decimal) 33 on stack |
| 7   | BRC | conditionally jump to address popped from stack |
| 8   | SAR 000 | push pointer to signal argument 0 on stack |
| 10  | ASN 002 | assign popped stack item to variable 2 |
| 12  | SAR 002 | push pointer to signal argument 2 on stack |
| 14  | ASN 000 | assign popped stack item to variable 0 |
| 16  | VAR 002 | push pointer to variable 2 on stack |
| 18  | VAR 001 | push pointer to variable 1 on stack |
| 20  | EQL | push result of [pop() = = pop()] on stack |
| 21  | NOT | push result of [!pop()] on stack |
| 22  | BAR 040 | push pc address (decimal) 32 on stack |
| 24  | BRC | conditionally jump to address popped from stack |
| 25  | LAR 004 | push pointer to literal 4 on stack |
| 27  | PRI | call print with popped stack item |
| 28  | STP | returnCode = STOP; exit interpreter loop |
| 29  | BAR 041 | push pc address (decimal) 33 on stack |
| 31  | BRU | unconditionally jump to address popped from stack |
| 32  | CON | returnCode = CONTINUE; exit interpreter loop |
| 33  | HLT | returnCode − CONTINUE; exit interpreter loop |

What is claimed is:

1. A telecommunication switching system for the communication of voice and data among a plurality of customer interface units and said system assuming a plurality of states and generating a plurality of signals, comprising:

means responsive to a first program routine for controlling the communication functions of said telecommunication switching system to provide a first set of services by being responsive to said plurality of states and said plurality of signals from said telecommunication switching system;

means defined by a second program routine for compiling source code instructions for a new service for said telecommunication switching system;

said controlling means comprises means defined by a third program routine for updating said first program routine with the compiled source code instructions thereby modifying said first set of services and adding said new service; and means defined by a fourth program routine for activating the updated portion of said first program routine thereby providing said new service on said telecommunication switching system.

2. The telecommunication switching system of claim 1 wherein said activting means comprises means defined by a set of instructions for enabling said compiled source code instructions of said updataed portion that provide said new service to said first program routine without interfering with said first program routine's real-time control of said telecommunication system.

3. The telecommuncation switching system of claim 2 wherein said controlling means comprises a first processor for executing said first program routine; and said compiling means comprises a second processor for executing said second program routine.

4. The telecommunication switching system of claim 1 wherein said fourth program routine comprises a plurality of groups of instructions each of which is responsive to a predefined system state and signal to execute and said activating means comprises:

means defined by a first group of instructions of said fourth program routine responsive to a first system time signal for enabling the updated portion of said first program routine.

5. The telecommunication switching system of claim 4 wherein said controlling means further comprises means defined by a fifth program routine for deactivating said updated portion of said first program in response to a second system time signal.

6. The telecommunication switching system of claim 5 wherein said fifth program routine comprises a plurality of groups of instructions each actuated by a predefined system state and signal and said deactivation means comprises:

means defined by a first group of instructions of said fifth program routine responsive to said second system time signal for generating a deactivate signal indicating that said updated portion of said first program routine is to be deactivated; and said updated portion of said first program routine further comprises a plurality of groups of instructions each actuated by a predefined state and signal and one of said groups of instructions of said updated portion of said first program routine responsive to said deactivate signal for disabling said updated portion of said first program.

7. The telecommunication switching system of claim 1 wherein said first program routine comprises a plurality of groups of instructions each of which executes in response to a predefined system state and signal and said controlling means further comprises:

means defined by a first set of instructions of said first program routine for generating a leave signal upon the pending transition from the present state of said system to another system state; and means defined by a second group of instructions of said first program routine responsive to said leave signal and the present state for performing common operations terminating said present state before leaving said present state.

8. The telecommunication switching system of claim 7 wherein said performing means further comprises means defined by one of the instructions of said second group of instructions of said first program routine for allowing other of said groups of instructions in said first program routine and in said updated portion of said first program routine to respond to said leave signal and said present state.

9. The telecommunication switching system of claim 7 wherein said means defined by said first set of instructions of said first program routine further comprises means for generating an enter signal upon said other system state being entered from said present system state; and said controlling means further comprises means defined by a third group of instructions of said first program routine responsive to said enter signal and said other state for executing common operations to enable entry into said other state.

10. The telecommunication switching system of claim 9 wherein said means for executing common operations further comprises means defined by one of said third group of instructions for allowing other groups of instructions of said first program routine to respond to said enter signal and said other state.

11. A computer system for controlling a real-time process assuming a plurality of states and generating a plurality of signals, comprisinig:

means responsive to a first program routine for controlling functions of said process to provide a first set of services by being responsive to said plurality of states and said plurality of signals from said process;

means defined by a second program routine for compiling source code instructions for a new service for said process;

said controlling means comprises means defined by a third program routine for updating said first program with the compiled source code instructions thereby modifying said first set of services and adding said new service; and means defined by a third program routine for activating the updated portion of said first program routine thereby providing said new service for said process.

12. The computer system of claim 11 wherein said updating means comprises means defined by a set of instructions for enabling said compiled source code instructions of said updated portion that provide new service to said first program routine without interfering with said first program routine's real-time control of said process.

13. The computer system of claim 12 wherein said controlling means further comprises a first processor for executing said first program routine; and said compiling means comprises a second processor for executing said second program routine.

14. The computer system of claim 11 wherein said third program routine comprises a plurality of groups of instructions each of which is actuated in response to a predefined system state and predefined process signal and said activating means comprises:

means defined by a first group of instructions of said third program routine responsive to a first system time signal for enabling the updated portion of said updated first program routine.

15. The computer system of claim 14 wherein said controlling means further comprises means defined by a fourth program routine for deactivating said updated portion of said first program in response to a second system time signal.

16. The computer system of claim 15 wherein said fourth program routine comprises a plurality of groups of instructions each responsive to a predefined system state and signal to execute and said deactivation means comprises:

means defined by a first group of instructions of said fourth program routine responsive to said second system time signal for generating a deactivate signal indicating that said updated portions of said first program is to be deactivated; and said updated portion of said first program further comprises a plurality of groups of instruction each responsive to a predefined state and signal to execute and one of said groups of instructions of said updated portion of said first program responsive to said deactivate signal for disabling said updated portion of said first program.

17. The computer system of claim 11 wherein said first program comprises a plurality of groups of instructions each of which is actuated in response to a predefined system state and signal and said controlling means further comprises:

means defined by a first set of instructions of said first program routine for generating a leave signal upon the pending transition of the present state of said system to a second system state; and means defined by a second group of instructions of said first program routine responsive to said leave signal and the present state for performng common exit operations to termiante said present state.

18. The computer system of claim 16 wherein said means for performing said common exit operations further comprises means defined by one of the instructions of said second group of instructions of said first program routine for allowing other of said groups of instructions in said first program routine and in said updated portion of said first program routine to respond to said leave signal and said present state.

19. The computer system of claim 17 wherein said means defined by said first set of instructions of said first program routine further comprises means for generating an enter signal upon said second system state being entered from said present system state; and said controlling means further comprises means defined by a third group of instructions of said first program routine responsive to said enter signal and said other state for performing common operations to enable entry into said second state.

20. The computer system of claim 18 wherein said means for performing said common exit operations of the entry operation further comprises means defined by one of said third group of instructions for allowing other grops of instructions to respond to said enter signal and said second state.

21. A method for controllig a real-time process assuming a plurality of states and generating a plurality of signals by a control computer executing a program, comprising:

controlling said real-time process by said control computer responding to a first program routine to provide a first set of functions by being responsive to said plurality of states and said plurality of signals from said real-time process;

compiling source code instructions for a new function for said process;

updating said first program routine with the compiled source code instructions defining said additional services by said control computer system executing a third program routine thereby modifying said first set of functions and adding said new function; and activating the updated portion of said first program routine by said control computer executing a fourth program routine thereby providing said new function for said process.

22. The method of claim 21 wherein said updating step further comprises the step of adding a set of instructions defining said additional functions to said first program routine, without interfering with said control computer's execution of said first program routine to perform real-time control of said real-time process.

23. The method of claim 22 wherein said control computer comprises a first and a second processor means and said step of controlling comprises the step of executing said first program routine by said first processor; and said step of compiling comprises the step of executing said second program routine by said second processor means.

24. A method for programming and controlling a voice and data telecommunication system having a source code entry unit and having a plurality of system states and a plurality of system signals to provide a plurality of services each performing a predefined voice or data service by a series of operations with said system controlled by a first processor executing a program having basic sets of groups of instructions with each group implementing one of a plurality of operations of an individual service each of said groups of instructions, execution is in response to a predefined system state and a predefined system signal and a second processor executing a program for the compilation of source code instructions written in a nonprocedural language, said method comprising the steps of:

controlling said sytem by said firt processor executing each of said basic groups of instructions to perform the individual operation upon the present system state and system signal being in each of said groups of instructions' predefined state and signal, respectively;

entering a source code program that defines an additional service via said entry unit;

compiling the entered source code into an additional set of groups of instructions each to control said first processor to perform said additional service;

transferring said additional set of groups of instructions from said second processor to said first processor;

updating said basic groups of instructions with said additional groups of instructions in a predefined preference relationship that defines the execution sequence for a plurality of groups of instructions by said first processor thereby modifying said old services and adding said new service; and activating said additional groups of instructions by said first processor.

25. The method of claim 24 wherein said first processor further comprises a plurality of control structures each corresponding to an individual system state and individual system signal, and said method further comprises the steps of:

referencing individually in each of said plurality of control structures one of the groups of instructions that respond to identical system state and system signal corresponding to each of said plurality of control structures in accordance with said predefined preference relationship;

identifying one of said control structures in response to the present system state and the occurrence of one of said system signals;

executing the group of instructions having the highest preference referenced by the identified control structure to perform an operation of a first one of said services operations in said telecommunication system;

executing the group of instructions having the second highest preference referenced by said identified control structure in response to the execution of one of the highest preference group of instructions thereby performing an operation of a second one of said services; and inhibiting the execution of the group of instructions having third highest preference upon execution of one of the second highest preference group of instructions thereby inhibiting an operation of a third one of said services.

26. The method of claim 25 further comprises the steps of:

deactivating the set of program instructions containing said second preference group of instructions; and executing the third preference group of instructions referenced by said identified control structure to perform the operation of said third one of said services in said telecommunication system in response to said system signal and upon said set of program instructions containing said second preference group of instructions being deactivated.

27. The method of claim 26 wherein said step of deactivation comprises the step of removing from said plurality of control structures all references to said second preference group of instructions' set of groups of instructions.

28. The method of claim 26 wherein each of said control structures is associated with one of said system states and each of said control structures comprises a plurality of tables each associated with one of said system signals occurring in the system state of the associated control structure, said updating step comprises the steps of:

determining the one of said tables that corresponds to the state and signal that actuates the execution of each additional group of instructions; and storing into the determined one of said tables a reference for each of the additional groups of instructions for which the determination occurred.

29. The method of claim 28 wherein said step of deactivation comprises the steps of:

generating a deactivate signal;

searching for another one of said tables contained within said control structures that contains a group of instructions responsive to said deactivate signal;

storing a variable signal in said processor indicating that said second preference group of instructions' set of groups of instructions is to be deactivated in another one of said system states; and stopping the further processing of said deactivate signal by a group of instructions of said other one of said table thereby inhibiting the deactivation of said set of instructions associated with said second preference group of instructions.

30. The method of claim 29 wherein said deactivation step further comprises the steps of:

changing the state of said system from the present state of a new state; and purging said set of instructions containing said second preference group of instructions containing said other system state and upon said variable signal indicating that said second preference group of instructions' set of groups of instructions is to be deactivated.

31. The method of claim 25 wherein each of said control structures is associated with one of said system states and each of said control structure comprises a plurality of tables each associated with one of said system signals occurring in the system state of the associated control structure, said referencing step comprises the steps of:

determining the one of said tables that corresponds to the system state and system signal for each individual group of instructions; and storing into the determined one of said tables a reference for each individual group of instructions in a prefrence relationship to all previously stored references of other groups of instructions stored in the determined one of said tables.

32. The method of claim 31 wherein said step of allowing comprises the step of obtaining the reference to the second highest preference group of instructions from the table containing said first highest prefrence group of instructions contained in the control structure of the present system state; and executing the second highest preference group of instructions.

33. The method of claim 32 wherein said inhibiting step comprises the step of:

ceasing to process said system signal upon execution of one of said second highest group of instructions by preventing the determination of the reference to said third highest preference group of instructions of said table.

34. The method of claim 24 further comprises the steps of:

changing from the present system state to another system state by the execution of an instruction of a first one of said groups of instructions;

generating a leave signal to define preparation to exit from said present state;

performing common exit operations terminating said present state before leaving said present state by the execution of a second one of said groups of instructions in response to ssaid leave signal and said system being in said present state;

generating another signal to define preparation to enter into said other state; and performing common entrance operations to start said other state upon entering said other state by execution of a third one of said groups of instructions actuated by said enter signal and said system being in said other state.

35. The method of claim 34 wherein said processor further comprises a plurality of control structures, and said method further comprises the steps of:

referencing individually in each of a plurality of control structures ones of the groups of instructions that respond to identical system state and system signal corresponding to each of said plurality of control structures in accordance with said predefined preference relationship;

said step of preforming said common exit operations further comprises the steps of identifying one of said control structures in response to the present system state and said leave signal; and actuating said second one of said groups of instructions to perform said common exit operations.

36. The method of claim 35 wherein said step of performing said common entrance operations further comprises the step of identifying another one of said control structures in response to the other system state and the entry signal; and actuating said third one of said groups of instructions to perform said common entrance operations.

* * * * *

UNITED STATES PATENT AND TRADEMARK OFFICE
CERTIFICATE OF CORRECTION

PATENT NO. : 4,747,127
DATED : May 24, 1988
INVENTOR(S) : Terris L. Hansen, et al.

It is certified that error appears in the above-identified patent and that said Letters Patent is hereby corrected as shown below:

Column 45, line 7, "said updated portions" should read "said updated portion",

Column 46, line 30 "groups of instructions" should read "groups of instructions'", Column 46, line 36 "by said firt processor" should read "by said first processor", Column 46, line 64, "control structures one" should read "control structures ones", Column 48, line 2, "of instructions containing said" should be "of instructions upon entering said", Column 48, line 47, "response to ssaid leave" should read "response to said leave".

Signed and Sealed this

Second Day of March, 1993

Attest:

STEPHEN G. KUNIN

*Attesting Officer*     *Acting Commissioner of Patents and Trademarks*